US005159546A

United States Patent [19]

Inoue et al.

[11] Patent Number: 5,159,546

[45] Date of Patent: Oct. 27, 1992

[54] DEVICE AND METHOD FOR CONTROLLING SELECTION IN A USER INTERFACE EMPLOYING A DISPLAY

[75] Inventors: Ryuzi Inoue; Takao Ohtake, both of Kanagawa, Japan

[73] Assignee: Fuji Xerox, Co., Ltd., Tokyo, Japan

[21] Appl. No.: 337,211

[22] Filed: Apr. 12, 1989

[30] Foreign Application Priority Data

Apr. 26, 1988 [JP] Japan .............................. 63-103711

[51] Int. Cl.$^5$ ............................................ G05B 19/04

[52] U.S. Cl. .................................. 364/146; 364/188; 364/189; 355/200

[58] Field of Search ............... 364/146, 188, 189, 900; 340/718, 752, 754; 355/206, 214, 200

[56] References Cited

U.S. PATENT DOCUMENTS

| | | | |
|---|---|---|---|
| Re. 32,253 | 9/1986 | Bartulis et al. | 364/900 |
| 4,300,829 | 11/1981 | Braswell et al. | 355/209 |
| 4,475,806 | 10/1984 | Daughton et al. | 355/209 |
| 4,699,501 | 10/1987 | Watanabe et al. | 355/200 |

*Primary Examiner*—Jerry Smith
*Assistant Examiner*—Paul Gordon
*Attorney, Agent, or Firm*—Finnegan, Henderson, Farabow, Garrett and Dunner

[57] ABSTRACT

A device and method of controlling a duplicator with a user interface. A display, located on top of the duplicator, displays cascading menus (cascades) of various modes and selections available to the user at a given time. Cascades are selectively displayed depending on which combinations of optional devices are present in the duplicator. The method allows a large amount of information to be displayed on a relatively small display, thus eliminating display clutter. Keys on the display have different meanings depending on the current display picture.

15 Claims, 56 Drawing Sheets

FIG. 5(a)
| NO | SLAVE NAME | TX, RX BETWEEN SYSTEM: Tx DATA (max) (SYS→SLAVE) | Rx DATA (max) (SLAVE→SYS) | NEXT SLAVE Tx DATA (min) | NEXT SLAVE Tx TIMING ti (ms) |
|---|---|---|---|---|---|
| 1 | UI | 7 | 15 | 2 | 26.0 |
| 2 | OPTICAL | 6 | 4 | 2 | 11.6 |
| 3 | INPUT | 5 | 4 | 2 | 10.4 |
| 4 | MARKING | 8 | 6 | 2 | 16.4 |
| 5 | OUTPUT | 6 | 4 | 2 | 11.6 |
| 6 | IEL | 6 | 6 | 2 | 14.0 |
| 7 | SPARE | 5 | 4 | 2 | 10.4 |
| TOTAL AMOUNT OF COMMUNICATION | | 43 + 43 = 86 BYTE | | COMMUNICATION PERIOD | 100.4ms |
FIG. 5(b)
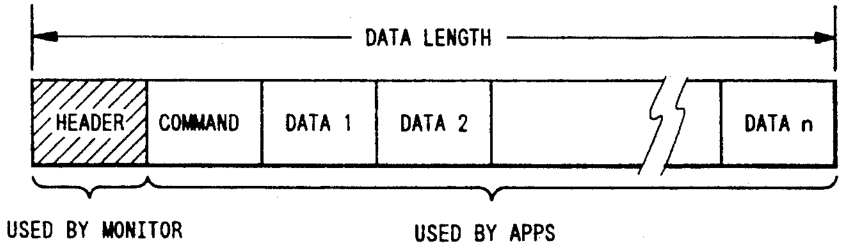
FIG. 5(c)
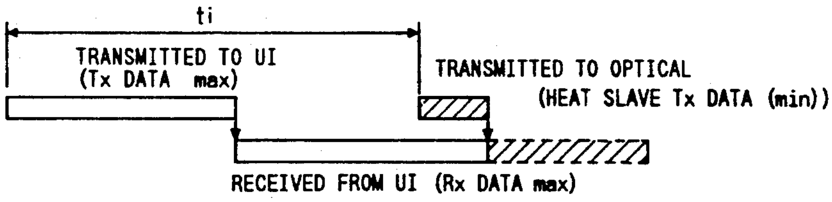

FIG. 32(i)

| ADDRESS MAP | DATA STRUCTURE NAME | CELL NAME | CELL VALUE | REPRESENTATION |
|---|---|---|---|---|
| A0C | ELEM. | JOB. INDI. CELL | 0 | BLANK |
| | | | 1 | JOB MEMORY |
| A0D | ELEM. | EDIT. INDI. CELL | 0 | BLANK |
| | | | 1 | EDIT / SYNTH |
| A0E | ELEM. | REDCTION. INDI. CELL | 0 | BLANK |
| | | | 1 | FINE ADJ. OF EQUAL SIZE |
| A0F | ELEM. | FRAME ERASE. INDI. CELL | 0 | BLANK |
| | | | 1 | FRAME ERASURE |
| A11 | ELEM. | OVER. SIZE. INDI. CELL | 0 | BLANK |
| | | | 1 | SPECIAL DOCUMENT |
| A12 | ELEM. | MARGIN. INDI. CELL | 0 | BLANK |
| | | | 1 | BINDING MARGIN |
| A13 | ELEM. | COLOR. INDI. CELL | 0 | BLANK |
| | | | 1 | COLOR |
| A14 | ELEM. | AISHI. INDI. CELL | 0 | BLANK |
| | | | 1 | INTERLEAVE |
| A15 | ELEM. | ORIENTATION. INDI. CELL | 0 | BLANK |
| | | | 1 | DISCHARGE SURFACE |
| | | | | |
| | | | | |
| A1B | ELEM. | SORTER. OP. INDI. CELL | 0 | BLANK |
| | | | 1 | SORTER |
| | | | | |
| | | | | |

FIG. 32(j)

| ADDRESS MAP | DATA STRUCTURE NAME | CELL NAME | CELL VALUE | REPRESENTATION |
|---|---|---|---|---|
| A1E | PRESET. CASC. | TRAY. TECH. CELL1 | | LIST NO. 2 |
| A1F | | TRAY. TECH. CELL2 | | 〃 3 |
| A20 | | TRAY. TECH. CELL3 | | 〃 4 |
| A21 | | TRAY. TECH. CELL4 | — | 〃 5 |
| A22 | | TRAY. TECH. CELL5 | | 〃 6 |
| A23 | | TRAY. TECH. CELL6 | | 〃 7 |
| | | | | |
| A1D | | TRAY. POS. CELL | — | USED FOR ONLY SOFT |
| A1C | | TRAY. CASC. CELL | 1 ~ 6 | |
| | | | LIST NO. 1 | BLANK |
| | | | 2 | AUTO |
| | | | 3 | LOW |
| | | | 4 | MID |
| | | | 5 | UP |
| | | | 6 | LARGE CAP. |
| | | | 7 | MAN. INSRT |
| | | | | |
| A88 | BLINK. VAR | BIG. BRINK. CELL | — | LARGE CAP. |
| A8A | BLINK. VAR | UPPER. BRINK. CELL | — | UP |
| A8C | BLINK. VAR | CENTER. BRINK. CELL | — | MID |
| A8E | BLINK. VAR | LOWER. BRINK. CELL | — | LOW |
| AAE | BLINK. VAR | MSI. BRINK. CELL | — | MAN. INSRT |

FIG. 32(k)

| ADDRESS MAP | DATA STRUCTURE NAME | CELL NAME | CELL VALUE | REPRESENTATION |
|---|---|---|---|---|
| A26 | PRESET. CASC | SIZE. TECH. CELL1 | — | LIST NO. 6 |
| A27 | | SIZE. TECH. CELL2 | | 〃 12 |
| A28 | | SIZE. TECH. CELL3 | | 〃 11 |
| A29 | | SIZE. TECH. CELL4 | | 〃 6 |
| | | | | |
| A25 | | SIZE. POS. CELL | — | USED FOR ONLY SOFT |
| A24 | | SIZE. CASC. CELL | 1 ~ 4 | |
| | | | LIST NO. 1 | |
| | | | 2 | A 6 |
| | | | 3 | B 6 |
| | | | 4 | A 5 |
| | | | 5 | B 5 |
| | | | 6 | A 4 |
| | | | 7 | |
| | | | 8 | 13" |
| | | | 9 | LEGAL |
| | | | 10 | SPECILA B4 |
| | | | 11 | B 4 |
| | | | 12 | A 3 |
| | | | 13 | 17" |
| | | | 14 | B 3 |
| | | | 15 | A 2 |
| | | | 16 | SPECIAL |

FIG. 32(1)

| ADDRESS MAP | DATA STRUCTURE NAME | CELL NAME | CELL VALUE | REPRESENTATION |
|---|---|---|---|---|
| A2E | PRESET. CASC. | MUKI. TECH. CELL1 | — | LIST NO. 3 |
| A2F | | MUKI. TECH. CELL2 | | 〃 2 |
| A30 | | MUKI. TECH. CELL3 | | 〃 1 |
| A31 | | MUKI. TECH. CELL4 | | |
| A2D | | MUKI. POS. CELL | — | USED FOR ONLY SOFT |
| A2C | | MUKI. CASC. CELL | 1<br>2<br>3 | |
| | | | LIST NO. 1 | BLANK |
| | | | 2 |  |
| | | | 3 |  |
| | | | |  |
| A33 | CASAR CASC. | MAG. CELL | 1 | EQUAL SIZE |
| | | | 2 | AUTO |
| | | | 3 | FIX / ARBITRARY |
| | | | | |
| A34 | CASAR CASC. | DUPLEX. CELL | 1 | SINGLE |
| | | | 2 | SINGLE → DOUBLE |
| | | | 3 | DOUBLE → DOUBLE |
| | | | 4 | DOUBLE → SINGLE |
| | | | | |
| A35 | CASAR CASC. | NOUDO. CELL | 1 | AUTO |
| | | | 2 | HI DENSE / LO DENSE |
| | | | | |
| | | | | |

FIG. 32(m)

| ADDRESS MAP | DATA STRUCTURE NAME | CELL NAME | CELL VALUE | REPRESENTATION |
|---|---|---|---|---|
| A38 | PRESET. CASC. | SORTER. TECH. CELL1 | — | LIST NO. 2 |
| A39 | | SORTER. TECH. CELL2 | | 〃 3 |
| A3A | | SORTER. TECH. CELL3 | | 〃 4 |
| | | | | |
| A37 | | SORTER. POS. CELL | — | USED ONLY FOR SOFT |
| A36 | | SORTER. CASC. CELL | 1 ~ 3 | 1 ~ 3 |
| | | | LIST NO. 1 | BLANK |
| | | | 2 | COPY RECEIVE |
| | | | 3 | PAPER COLLATION |
| | | | 4 | STACK |
| | | | | |
| A3C | NUMERIC VAR. | BAIRITSU. CELL | 50 ~ 200 | 50 ~ 200 |
| A3E | ELEM. | PARCENT. INDL. CELL | 0 | BLANK |
| | | | 1 | % |
| | | | | |

FIG. 38(a)

| SCAN \ DATA | 0 | 1 | 2 | 3 | 4 | 5 | 6 | 7 |
|---|---|---|---|---|---|---|---|---|
| 0 | 1 | 2 | 3 | 4 | 5 | 6 | 7 | 8 |
| 1 | 9 | 0 | C | P | START | STOP | INTERRUPT | AC |
| 2 | POWER SAVE | EMPTY | INFOR-MATION | BASIC COPING | MORE FEATURE | EMPTY | ADVANCED FEATURE | REVIEW SELECTION |
| 3 | # 1 UP | # 2 UP | # 3 UP | # 4 UP | # 5 UP | # 5 DOWN | DUAL LANGUAGE | EMPTY |
| 4 | # 1 DOWN | # 2 DOWN | # 3 DOWN | # 4 DOWN | | | | |
| 5 | | | | | | | | |
| 6 | | | | | | | | |
| 7 | | | | | | | | |

FIG. 38(b)

| SCAN \ DATA | 0 | 1 | 2 | 3 | 4 | 5 | 6 | 7 |
|---|---|---|---|---|---|---|---|---|
| 0 | INTER-RUPT | POWER SAVE | BASIC COPING | MORE FEATURE | ADVANCED FEATURE | | | |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |

FIG. 40

| ADDRESS SEEN FROM CPU | | CRT C MEMORY ADDRESS | CRT PICTURE | |
|---|---|---|---|---|
| V-RAM H | V-RAM L | | | |
| 4000 | 4001 | 0 | 1st ROW 1st COLUMN | 1st V-RAM |
| 4002 | 4003 | 1 | 1st ROW 2nd COLUMN | |
| 4004 | 4005 | 2 | 1st ROW 3rd COLUMN | |
| ⋮ | ⋮ | ⋮ | ⋮ ⋮ | |
| 4076 | 4077 | 3B | 1st ROW 60th COLUMN | |
| 4078 | 4079 | 3C | 2nd ROW 1st COLUMN | |
| ⋮ | ⋮ | ⋮ | ⋮ ⋮ | |
| 4706 | 4707 | 383 | 15th ROW 60th COLUMN | |
| ⋮ | ⋮ | ⋮ | NON-DISPLAY | |
| 47FE | 47FF | 3FF | | |
| 4800 | 4801 | 400 | 1st ROW 1st COLUMN | 2nd V-RAM |
| 4802 | 4803 | 401 | 1st ROW 2nd COLUMN | |
| ⋮ | ⋮ | ⋮ | ⋮ ⋮ | |
| 4F06 | 4F07 | 783 | 15th ROW 60th COLUMN | |
| ⋮ | ⋮ | ⋮ | NON-DISPLAY | |
| 4FFE | 4FFF | 7FF | | |

DEVICE AND METHOD FOR CONTROLLING SELECTION IN A USER INTERFACE EMPLOYING A DISPLAY

BACKGROUND OF THE INVENTION

1 Field of the Invention

This invention generally relates to a storage device for duplicators, facsimile equipment, printers, etc. in which a display is used as a user interface to select functions and to set conditions for carrying out the functions and more particularly to a device and method for controlling a selection in a display picture to control a duplicator in accordance with optional devices equipped for additional functions.

2. Description of the Related Art

Storage devices for duplicators include computers to make full use of high level control and data processing techniques. A wide variety of functions are available, requiring many different operations for selecting functions and then for setting conditions for carrying out the functions selected. Operators must learn many complex operations; consequently, they may fail to follow the correct procedure and may misoperate the controls more often when they use the apparatus. In order to provide the operators with less complex operating procedures, a console panel has been employed. A console panel is provided with operating means, such as various key switches, ten-key switches, and the like, for selecting the operations. The console panel is also provided with display lamps and displays for indicating selections made through key operation, setting conditions, and operation guides.

Most conventional user interfaces have been of a console panel type in which keys, LEDs, liquid crystal displays, etc., are provided, including, for example, those of a backlit type having message displays. backlit console panel has a display board with fixed messages disposed at predetermined positions, which are selectively backlit by means of a lamp or the like so that the backlit message can be read. In a console panel having a message display, the panel is formed of liquid crystal display elements to display various messages at any time without having to provide a large display area. The type of console panels to be employed depend on factors such as complexity of the system and operability of the duplicator. FIG. 45 illustrates one such console panel employed in a duplicator proposed by Applicants in Japanese Patent Applications Nos. 62-278653 and 62-278655. The top of console panel 701 has a menu display board 702 in which respective functions of the panel units (703 to 708) are displayed by means of characters.

A switch 709 and two display lamps 710 are disposed on a panel 703 so that the sorting mode (stack mode and paper collation mode) can be selected when the sorter is connected. On a function selecting panel 704 are provided a switch 711 for editing or correcting/affirming a picture image, a switch 712 for storing to a job memory, a switch 713 for consecutive-page duplication, an edge erasure function, binding margin function and various other modes of duplication, a switch 714 for specifying double sided copy, and display lamps 710 for indicating ON or OFF states of selections made by these switches. On top of a monochromatic color highlight panel 705 are four display lamps 715 indicative of types (colors) of color developer, and on the remainder of panel 705 are located four switches 716 to 719 and display lamps 710 for indicating which of these switches are set. These switches include a marking color switch 716, partial color conversion switch 717, consecutive duplication color synthesis switch 718, and a monochromatic color switch 719.

On a copy density panel 706 are positioned a display lamp 710 indicative of which of five levels of copy density has been selected and a shift key 720, 721 for selecting one of these levels of copy density. Pressing upper shift key 720 causes lower copy density and pressing lower shift key 721 causes lower copy density and pressing lower shift key 721 causes higher copy density. Thus, the panel is adapted to select 16 different levels of copy density. Below copy density panel 706 is an automatic density adjusting switch 723 which, when operated, illuminates automatic density-indicating lamp 722 and sets an automatic density adjusting mode.

A magnification and paper selecting panel 707 unit has on the left thereof a unit for setting and indicating magnification and on the right thereof a unit for selecting paper. On the unit for setting and indicating the magnification are disposed shift keys 724 and 725 for setting arbitrary magnifications and a magnification indicator 723 beside which is a magnification key 726 for selecting predetermined fixed magnifications, a magnification display board 727 for the key 726, and a display lamp 710. The unit for selecting copy paper is provided with eight types of display boards 728 indicative of sizes of paper of kinds of paper and shift keys 729, 730 for selecting one of these sizes or kinds. Also, a display lamp 710 is disposed on the left of the eight types of display boards 728 for indicating which type of paper or which size of paper has been selected. Further, below the magnification and paper selecting panel 707 is positioned an automatic paper/magnification selecting switch 731 for selecting a combination of the present magnifications and sizes of the paper.

On a display panel 708 located to the right of magnification and paper selection panel 707 are symbols 732 and a liquid crystal display unit 733 of this duplicator. Symbols 732 illuminate to indicate state of selection of a paper-feeding tray and location of paper jamming while liquid display unit 733 displays various for indicating selection of functions and conditions of carrying out the functions selected.

Also, below display panel 708 are various keys or buttons. These include an all-clear button 734 for resetting the duplicator to a basic condition, i.e., priority mode, a ten-key pad 735 for inputting numerical values specifying diagnostic procedures when performing diagnosis of the duplicator, an interrupt button 736 for interrupting the copying cooperation currently being carried out successively to allow an urgent copy, a stop clear button 737 that is used as a clear button when setting the number of sheets to be copied, or setting a bin of the sorter or aborting copy operation, a start button 738 for starting a copying operation, a selection key 739 for moving the cursor to select messages displayed on a liquid crystal display unit 733, and a setting key 740 for setting the function specified by the cursor.

The console panel thus far described has two separate areas, i.e., one for basic operations such as paper selection and setting of copy density, the other for more advanced feature operation such as function selection and monochromatic color enhancement. In addition, backing up the more important operations by displaying the sentences with both Chinese characters and "kana"

(Japanese phonetic symbols) reduces the chance of misoperation in the panel operation. Duplicators can be configured in a large number of possible combinations, for example, a type in which the basic machine is provided with a variety of functions, or a type in which a sorter and an automatic document delivery device are provided as optional devices and also including a paper tray and an IC card device. Accordingly, functions available depend on the respective combinations, which differ in the number of switches disposed on the console panel for selecting functions and in methods of signal processing within the apparatus. The number of display lamps and displays will differ correspondingly. Therefore, console panels are designed to have different layout and sizes of the switches and the displays in accordance with size of the duplicators.

Storage devices for duplicators, etc., are vitally important for office work. In an environment where office space is growing more costly, they are strongly expected to be compact in size and to occupy less area so that office space is effectively utilized. Also, with increasing utilization of duplicators, there is an increasing tendency to satisfy a variety of user requirements for higher performance and multiple functions. However, the console panel places limitations on implementation of compact duplicator size. That is, in the console panel, the growing number of functions will increase the contents of displays and operations, requiring a larger space for a larger number of keys as well as an increased number of displays and larger sizes thereof. Thus, restricting the panel space causes increased layout density of display means and operation means, causing not only difficulty in reading displays but also complexity of operation.

Thus, Applicants have proposed a storage apparatus in which the user interface utilizes a display for a compact overall size and improved operability. Since a storage apparatus having multiple functions has a larger number of selection trees, implementing the display in a compact size will necessarily divide up the display picture for forming selection mode pictures to select functions if the functions are to be selected with high degree of freedom. In such an arrangement of a display, some selection may become valid or invalid depending on the optional devices incorporated. For example, a duplicator can have a sorter and a finisher as optional output devices in three possible combinations, i.e., a sorter is incorporated, a finisher is incorporated, or neither is incorporated. Likewise, input devices include DADF (duplex auto document feeder) and RDH (recycle document handler) as optional devices and paper trays include an MSI (multi sheet inserter) and an HCF (high capacity feeder). In addition, the paper tray may sometimes be provided with both MSI and HCF. Some functions will be available and some other functions will be unavailable, depending on whether or not these optional devices are incorporated, and the content of functions available will also be different. Duplicators having multiple functions may have more than ten categories corresponding to these optional devices, the combinations of which can range from several thousand to tens of thousands. Therefore providing selection mode picture for all the possible combinations would require an extremely large memory capacity for display pictures. Displaying all the functions as a selection including the optional devices not incorporated would make it inconvenient for the operators to distinguish the functions as well as causing problems in handling the case when functions as well as causing problems in handling the case when functions not available are selected by chance. Additionally, some optional devices are selectively incorporated as in the aforementioned input devices and some can be incorporated together, as in the paper tray, and displaying all the functions including these in a single picture is impractical.

The present invention overcomes the aforementioned drawbacks. An object of the invention is to provide a method of controlling selections of a user interface that can display a selection mode picture that reflects actually incorporated optional devices and that will not allow keying of unavailable selections.

SUMMARY OF THE INVENTION

In a device and method for controlling a selection of a user interface utilizing a display according to the present invention, as shown in FIG. 1, there is a storage apparatus in which a display 1002 is used as a user interface 1001 for selectively displaying a plurality of pictures and for inputting desired functions and setting conditions for carrying out the selected function through a keyboard 1003. An optional device 1004 mounted on the basic machine is provided with an information generating means 1005 for generating an information signal indicating the attached optional device. When the information signal is not available, the selections corresponding to the optional device 1004 are not displayed and key-input corresponding to the device 1004 is invalidated. For this purpose, a table 1006 for controlling the display of a selection corresponding to the respective optional device and a table 1007 for controlling the input of key codes are provided. Tables 1006 and 1007 are renewed when information indicative of the presence of respective optional devices is present and when the power is on.

In a device and method for controlling selection of a user interface using a display according to the present invention, a table for controlling display of the selections and a table for inputting the key codes are provided. These table are renewed according to the presence of signals indicating the respective optional devices upon power-on. Thus, display can be controlled, by referring to the table, to prevent unavailable functions from being selected by the operator when displaying the selection. Moreover, processing the key codes by referring to the table containing the signals indicative of presence of the optional devices can invalidate the unavailable selection even if the operator selects such unavailable functions.

BRIEF DESCRIPTION OF THE DRAWINGS

FIG. 5(*a*) is a table illustrating byte lengths and transmission times for data in a serial communication;

FIG. 5(*b*) is a diagram illustrating a transfer data structure;

FIG. 5(*c*) is a timing diagram for the serial communication of FIGS. 5(*a*) and 5(*b*);

FIG. 38(*a*) is a diagram showing an example of setting map of a key board scan;

FIG. 38(*b*) is a diagram showing an example of setting map of an LED scan;

FIG. 40 is a diagram showing an example of various corresponding addresses of the V-RAM;

DESCRIPTION OF THE PREFERRED EMBODIMENTS

In a first preferred embodiment, a duplicator is described as one type of storage apparatus. A table of contents of the description is presented below, in which (I) to (II) summarize a general arrangement of a duplicator incorporating the teachings of the present invention, and (III) describes an embodiment of the present invention within the framework of the arrangement discussed in (I) and (II).

(I) Summary of the Apparatus:
(I-1) Arrangement of the Apparatus
(I-2) Functions and Features of the System
(I-3) Structure of the System
(I-4) Serial Communication Method
(I-5) Dividing into States
(II) Specific Arrangement of the Respective Units:
(II-1) Optical System
(II-2) Systems Associated with the Belt
(II-3) Paper Transferring System
(II-4) Automatic Document Advancing Device
(II-5) Sorter
(III User Interface (U/I):
(III-1) General Arrangement of the User Interface
(III-2) Arrangement of the Control System
(III-3) Selection Control
(III-4) Structure of a Display Picture
(III-5) A Key/LED Board and a Display-Displaying Circuit

(I) Summary of the Apparatus

I-1) Arrangement of the Apparatus

Figure 1:
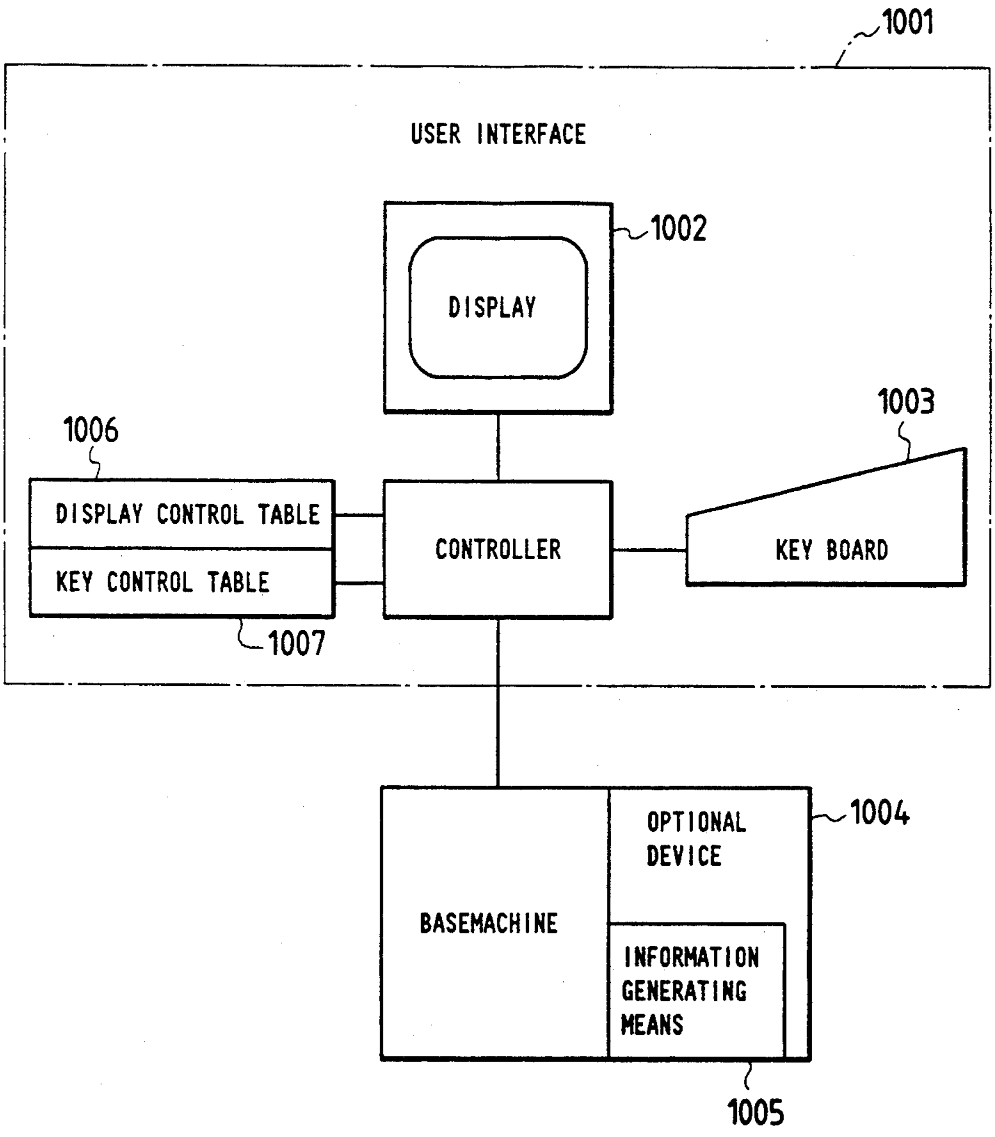
FIG. 1 is a diagram illustrating an embodiment of a user interface selection control device to which a display according to the present invention is applied.
Figure 2A:
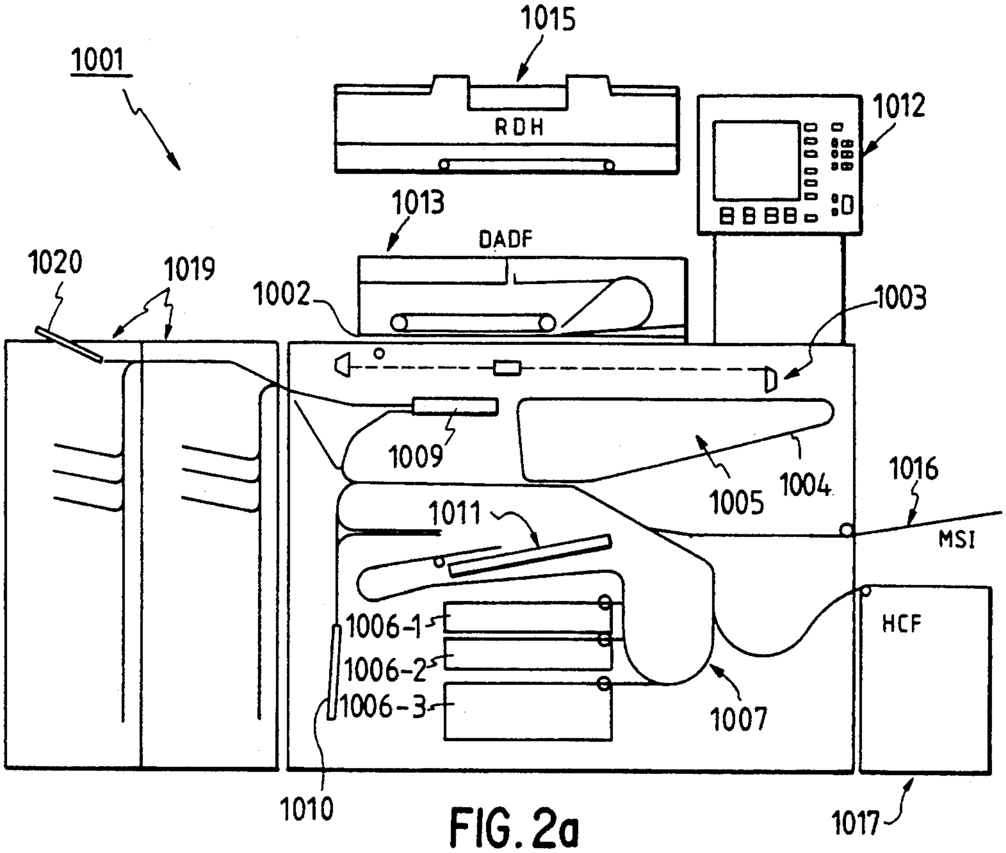
FIGS. 2*a* and 2*b* are diagrams showing an overall general arrangement of an apparatus incorporating the teachings of the present invention.
Figure 2B:
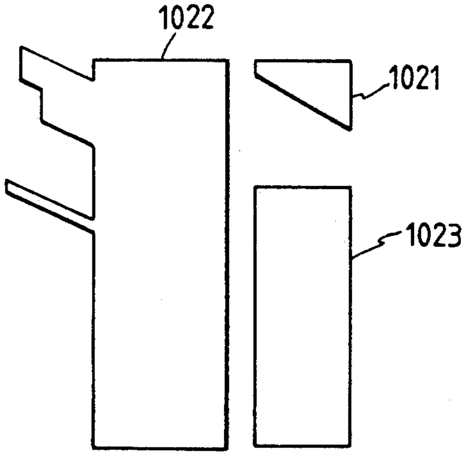

FIGS. 2*a* and 2*b* illustrate an example of a general construction of a duplicator to which the present invention is applied.

A duplicator to which the present invention is applied may have more than one optional device included in one base machine 1001. Base machine 1001 comprises a platen glass 1002 on which a document is placed, an optical system 1003 and a marking system 1005 under the platen glass 1002. In the meantime, the base machine 1001 is provided with an upper tray 1006-1, a middle tray 1006-2, and a lower tray 1006-3, all of which can be drawn to the front, thereby improving operability and space-saving when installing the duplicator in an office while also implementing a neat design of the duplicator so that the trays do not protrude from the base machine. Also, inverters 1009 and 1010 and a duplex tray 1011 are disposed in the paper transferring system 1007, which transfers the paper in the paper-feeding tray. Above the base machine 1001 is mounted a user interface (U/I) 1012 formed of a CRT display, and above platen glass 1002 is provided a DADF (duplex auto document feeder) 1013. User interface 1012 is of a stand or upright type and can have a card device mounted thereunder.

The following are optional devices for base machine 1001. The DADF 1013 can be replaced by any one of the RDH 1015 (recycling document handler: a device for returning the document to the document feeding position to automatically feed the document in a repetitive fashion), or an ordinary ADF (autodocument feeder), a platen having an editor pad (a coordinate input device), and a platen cover. An MSI (multi-sheet inserter: a manual insert tray) 1016 and HCF (high capacity feeder) 1017 can be provided on the supply side of the paper transferring system 1007, while one or more sorters 1019 can be disposed o the take up side of the paper transferring system.

If DADF 1013 is present, a simple catch tray 1020 or the sorter 1019 may be mounted. If RDH 1015 is mounted, an offset catch tray 1021 on which each set of copy is piled and a finisher 1022, which staples each set of copy, may be mounted, and further, a folder 1023 having paper-folding function may be mounted.

(I-2) Functions and Features of the System:

(A) Functions

The present invention includes a variety of functions provided by considering users' needs. The copying operation is automated from beginning to end and the aforementioned user interface 1012 displays the selection of the functions, selection of the execution conditions, and other menus, etc., on the CRT display, thus permitting every user to operate the apparatus easily.

One major function is the display picture, which is selectively displayed on the CRT display to divide the copy modes into a basic copy, a more feature, and an advanced feature, thereby displaying selection of functions and settings of execution conditions of the functions. A cascade (cursor) is moved on the display picture by means of a key input to selectively specify the functions or enable input of execution conditions.

Functions of the duplicators to which the present invention is applied include a fundamental function, an automation function, an optional function, a display function, and a diagnosis function.

The fundamental function, which incorporates a three-stage tray as previously described, allows use of regular sizes of paper, such as A6 to A2 and B6 to B3, as well as irregular sizes of paper. The fundamental function permits seven-stages of fixed magnifying factors, adjustment of an arbitrary magnification in 1% increments and magnification of a fine adjustment in 0.15% increments in the range from 99 to 101%. Further, a fixed seven-stage magnification mode and a photograph mode include a density selection function, a duplex function, a left and right independent page offset function, and a billing function.

The auto function includes paper selection for automatically selecting the size of paper in accordance with the document, a magnification factor selection while paper is specified, a density control, a start performed upon fuser-ready after power is switched on, and a clear and a power-save performed some time after the copy operation is over.

The optional functions include synthesized copy, interrupt, preheat mode, a clear of the settings of the number of sheets of paper, an all-clear for returning to the auto mode, information for illustrating functions, a P-key for allowing use of an IC card, maximum-lock return of the document for restricting the setting of sheets and full job recovery for using DADF, purge for discharging non-jamming paper, copying of an entire area of the document without edge erasure, an editor for partially copying the document and for copying with deletion of some part of the document, a job program for reading and processing each job, an interleaving feature for inserting a sheet of white paper between respective copies, and inside erase/frame erase for a book style copy.

The display function utilizes the CRT display for jam display, indication of the remaining number of sheets of paper, the remaining amount of toner, indication of full tank of recovered toner, indication of waiting time for warming up of the fuser, and display of the messages providing the operator with information on conflicts between selected functions and conditions of the machine.

The diagnosis function includes an initialization of non-volatile RAM (NVRAM), an input check, an output check, a history file of the number of jams and the number of sheets of paper fed, trimming of initial values for marking and process code for a sensitive material belt, a register gate ON timer, and a configuration setting.

Optionally, the MSI, the HCF, colors (red, blue, green, brown) for second developing, and an editor can suitably be provided.

(B) Features

The entire system of the present invention having the aforementioned functions, has the following features:

a) Implementation of electric power savings

A high speed, high performance duplicator is implemented with a power consumption of 1.5 kVA. Thus, the control system is such that the respective operation modes may be performed with a total power consumption of 1.5 kVA, the respective functions being assigned electric power in such a way that the total power will not exceed 1.5 kVA. Also an energy system table from which one can understand a route of energy delivery is provided for supervising and verifying the energy system.

b) Low cost

Expensive parts are factory-made for improvement of technology and standardization of parts. Also, an improved life of the picture material reduces hardware costs. Reducing the cost of toner reduces picture material cost c) Improvement of raliability Potentially defective parts are reduced, resulting in a longer system life. The input/output conditions of the respective parameters are clearly defined. Furthermore, technical problems resulting from insufficient design considerations have been reduced. Thus, the duplicator requires little power and little maintenance.

d) Implementation of high picture quality

In the present apparatus, a microcarrier made of ferrite is used as a toner particle for fine pictures as part of a method in which a picture is developed using a repulsion magnetic field. A highly sensitive all-color organic sensitized belt formed of organic sensitized material in multi-layers is used as a light sensitive material and, further, half-tone is realized in pictorial mode in which the set point is fully utilized. By these arrangements, copy generation is improved and black points are reduced, resulting in high quality pictures much better than conventional pictures.

e) Improved operability

The apparatus has a full auto mode in which copy operation in a specified mode is effective upon activation of a start key after only setting the document in place and then inputting the number of copies. Also, the apparatus is arranged so that various mode settings can be selected in response to a user requirement. These mode settings including setting of the copy modes with the aid of a picture that has been divided into the basic copy, the more feature, and advanced feature. This interface is effected by means of the CRT display and a small number of keys and LEDs disposed around the CRT display, thereby permitting mode setting using easy-to-read display menus and simple operations. Additionally, storing the copy modes and execution conditions thereof to a non-volatile memory or an IC card permits automated execution of required operations.

(C) Example of Discrimination

In a duplicator to which the present invention is applied, a program stored in an IC card determines the functions of the duplicator. Thus, changing the program in the IC card, from card to card, permits discrimination with respect to usage of the duplicator. This discrimination will further be illustrated by examples.

A first example is a case where a plurality of companies use a single duplicator installed in a multi-tenant building or a duplicator is used by a plurality of different departments within a company or a factory. The latter case is needed to allow budget supervision. A copilizer or the like has been used conventionally for supervising use of the duplicator by the respective departments.

Assume that this duplicator is a relatively high-level system in which the base machine in FIG. 2 is provided with an IC card device, DADF 1013, sorter 1019, user interface 1012, the feeding tray (1006-1 to 1006-3), and duplex tray 1011. Some users may used the DADF 1013 and sorter 1019 and other users may not need any additional devices.

If these users need to share the cost of the duplicator in terms of volume of copy, those users who copy only small quantities will not want a duplicator with costly optional devices in contrast to those who may want to use the duplicator to copy large quantities.

In such a case, IC cards compatible with the requirements of selected groups of users are provided so those who want to copy large quantities are charged more for additional functions. For example, a bearer of an IC card of the highest level is able to conveniently use DADF 1013, sorter 1019, feeding tray (1006-1 to 1006-3) and duplex tray 1011 for improved efficiency of clerical work. Those who do not need the sorting function can have IC cards without the sorting program and which only allow use of catch tray 1020, thereby reducing the cost of copying.

A second example is a self-service copy shop using the IC cards. The shop contains a plurality of duplicators to which the IC card devices 1022 are mounted. A client requests an IC card in accordance with a service he wants and applies the IC card to a duplicator that he prefers to make self-serve copies. A client who is not accustomed to the duplicator can ask for an IC card in which a display function illustrating how to operate the duplicator is stored as a program. Thus, the client is able to obtain a display of various operation information on U/I 1012 to carry out the copying operation without confusion. Whether or not DADF 1013 can be used, or whether or not multi-color storage can be carried out, may be specified by the IC cards. Also, it is possible to restrict models of duplicators, thereby supervising the clients in accordance with copy charge.

Conditions of copy work, such as the number of copies made or the sizes of copy paper may be stored in the IC cards, thus making it easier to charge for the service and also making it possible to offer steady clients more favorable service such as discount service.

A third example of the user of IC cards is a service in which programs for the specific users are stored in the IC cards. For example, patent and other law firms often have to make a copy with a relatively large enlargement factor, such as 200%, because they wish to study a patent publication, which has been reduced from its original size through a photoengraving process.

Also, in preparing drawings to submit before government offices, original drawings are reduced or enlarged in small increments to meet the requirements of the government offices. Departments of the city hall or ward offices that require copies of resident cards prepare duplicates of original documents or abstracts of residence cards, deleting the descriptions of persons not actually claimed and picture information that should be confidential for protecting personal privacy. Thus, some users wish to use the duplicators in a manner quite different from others. If the duplicator is to incorporate functions to fulfill all these requirements, then the console will necessarily be complex and the ROM in the duplicator will be large. Thus, providing IC cards on a specific user basis and enabling the user to set the cards into the machine permits implementation of a duplicator having functions that are most suited to that specific suer.

With patent bureaus, for example, purchasing an IC card for exclusive use will permit selection of a reduction or enlargement factor of 200% as well as several ordinary kinds of reductions and enlargements, such as a fixed magnification factor. Further, for example, reduction and enlargement may be set with an increment of 1% within a range in which an incremental size adjustment is required. Further, the department which issues the residential cards will be able to specify, by operating a ten-key switch, categories of residential card, columns, and items of the cards that should be deleted on the display (such as a liquid crystal display unit etc.). Thereafter, pushing a start button permits copying of a required portion from the original document or editing an storage of only necessary portions of the card.

(I-3) Structure of the System

Figure 3:
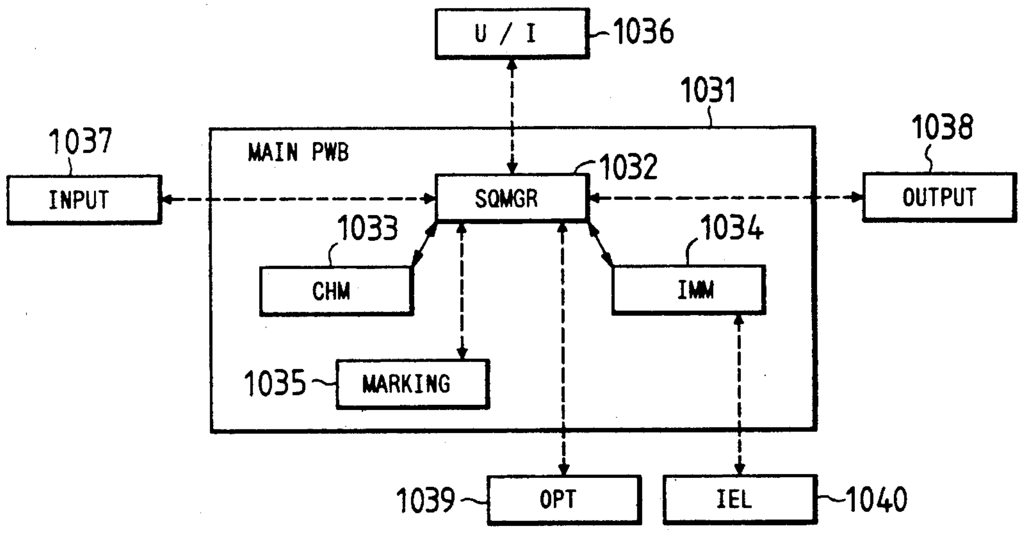
FIG. 3 is a diagram showing a system arrangement of a control system.
Figure 4:
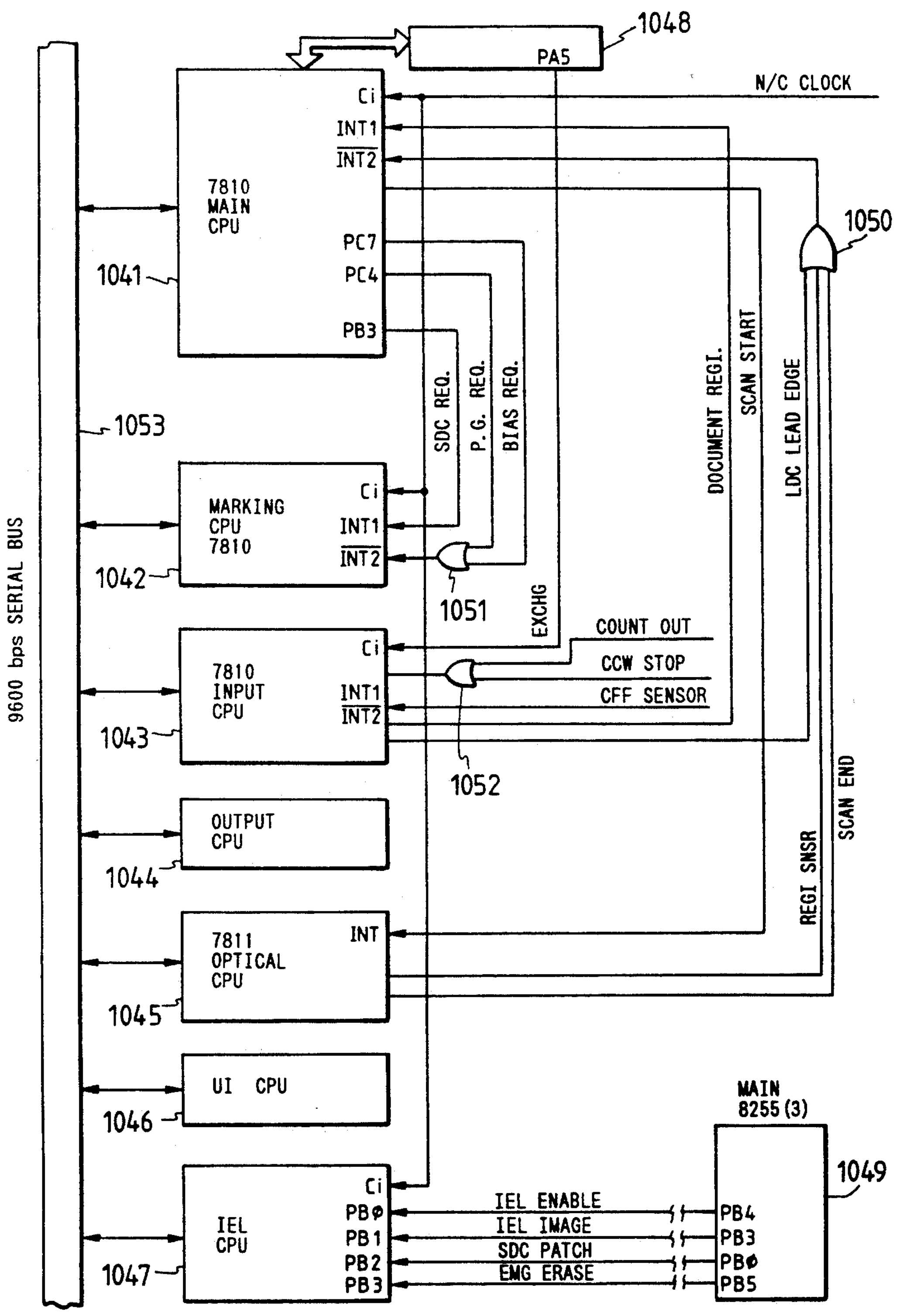
FIG. 4 is a diagram illustrating a hardware arrangement of a CPU.

FIG. 3 is a diagram illustrating an arrangement of the subsystem of a duplicator to which the present invention is applied. FIG. 4 is a diagram for showing a hardware arrangement employing CPUs.

The duplicator to which the present invention is applied consists of nine subsystems including SQMGR (sequence manager) subsystem 1032 on main circuit board 1031, CHM subsystem 1033, IMM subsystem 1034, marking subsystem 1035, and five subsystems around the four systems including U/I subsystem 1036, INPUT subsystem 1037, OUTPUT subsystem 1038, OPT subsystem 1039, and IEL subsystem 1040. Since CHM subsystem 1033, IMM subsystem 1034 and SQMGR subsystem 1032 are controlled by the software of main CPU 1041 shown in FIG. 4, subsystems 1033 and 1034 are connected with SQMGR subsystem 1032 through an interface (shown in solid lines) between the subsystems, which requires no communication. Other systems are connected through serial communication interfaces (dotted lines) since they are controlled by a CPU other than main CPU 1041. These subsystems will be illustrated as follows.

SQMGR subsystem 1032 is a sequence manager that receives copy mode information from U/I subsystem 1036 to issue job commands to the respective subsystems, thus coordinating the respective subsystems for efficient copy work, while also monitoring states of the respective subsystems at all times for handling the situation promptly when a problem occurs.

CHM subsystem 1033 controls a paper storing tray, a duplex tray, and a manual insertion tray, feeding of the copy paper, and a purging operation of the copy paper.

IMM subsystem 1034 performs division of the panel on a sensitive material belt that controls running/stopping of the sensitive material belt and a main motor that controls other functions related to the sensitive material belt. Marking system 1035 is a subsystem for controlling a corotron, an exposure lamp, developing equipment, a potential of sensitive material belt, and of toner density.

U/I subsystem 1036 is a subsystem that controls the user interface, display of machine stages, job management such as determination of the copy mode, and job recovery.

INPUT subsystem 1037 performs automatic feeding of a document (DADF) and semiautomatic feeding of the document (SADF), feeds computer-formed documents (CFF), controls two-sheet automatic feeding of the document (2-up), recycles automatic feeding of the document (RDH), and detects the size of a document.

OUTPUT subsystem 1038 controls the sorter and the finisher, outputs the copied paper in the sorting, stacking, or non-sorting modes, and outputs the copied documents in bound form.

OPT subsystem 1039 scans during the document exposure, moves a lens, controls of a shutter and PIS/NON-PIS, and moves a carriage in the LDC mode.

IEL subsystem 1040 erases unwanted images on the sensitive material belt, erases a front end and a back end of the image, and erases images in accordance with the editing mode.

The above-mentioned systems are formed of seven CPUs, shown in FIG. 4, as a heart of the system. These CPUs permit flexible adaptation to combinations of the base machine with optional peripheral devices. Main CPU 1041 on the main board includes software for SQMGR subsystem 1032, CHM subsystem 1033, and IMM subsystem 1034, and is connected with respective CPUs 1042 through 1047 through serial bus 1053. CPUs 1042 through 1047 communicate directly with the respective subsystems through the serial communication interface shown in FIG. 3. The serial communication occurs between main CPU 1041 and other other CPUs 1042 through 1047 at a preselected timing, where one communication cycle is 100 msec in length. For this purpose, accurate timing is required, and signals that cannot fit within the timing constraints of the serial communication are processed in interrupt mode through separate hot lines, different from serial bus 1053, via interrupt ports (INT terminal signal) provided at the respective CPUs. In other words, performing the copy operation at a processing speed of 64 cpm (A4-LEF) and 309 mm/sec and setting the control precision of a regi-gate (registory gate) to ±1 mm results in jobs that cannot be processed within a communication cycle of 100 msec as mentioned above. To assure execution of such jobs, hot lines are required.

Thus, the duplicator according to the present invention employs an arrangement of software corresponding to the various optional devices with which the duplicator can be equipped. Such an arrangement is employed because: (1) if base machine 1001 is to be provided with an operation control program for all of these optional devices, a very large memory capacity will be required, and (2) the duplicator should be arranged so that these optional devices can still be used without replacement of the memory or addition of additional memory when new devices are developed in the future or the present optional devices are improved.

For this reason, base machine 1001 has a basic memory area for controlling the basic construction of the duplicator and an additional memory area for storing the programs that are read from the IC card together with the function information. The additional memory area stores various programs, including the control program for DADF 1013 and the control program for user interface 1012. When the IC card is set to IC card device 1022 with the required optional devices being mounted to base machine 1001, the program required for the copy operation is read from the card through the user interface 1012 and loaded into the additional memory devices. The loaded program cooperates with or overrides the program that is stored in the basic memory area. The memory used in non-volatile memory formed of a random access memory backed up by a battery. Of course, other storage media including the IC cards, magnetic cards, and floppy disks may be used as a non-volatile memory. This embodiment of the duplicator is arranged so that the settings of picture density and enlargement factors can be preset with fewer steps. The present values are stored in the non-volatile memory.

(I-4) Serial Communication Method

Figure 6:
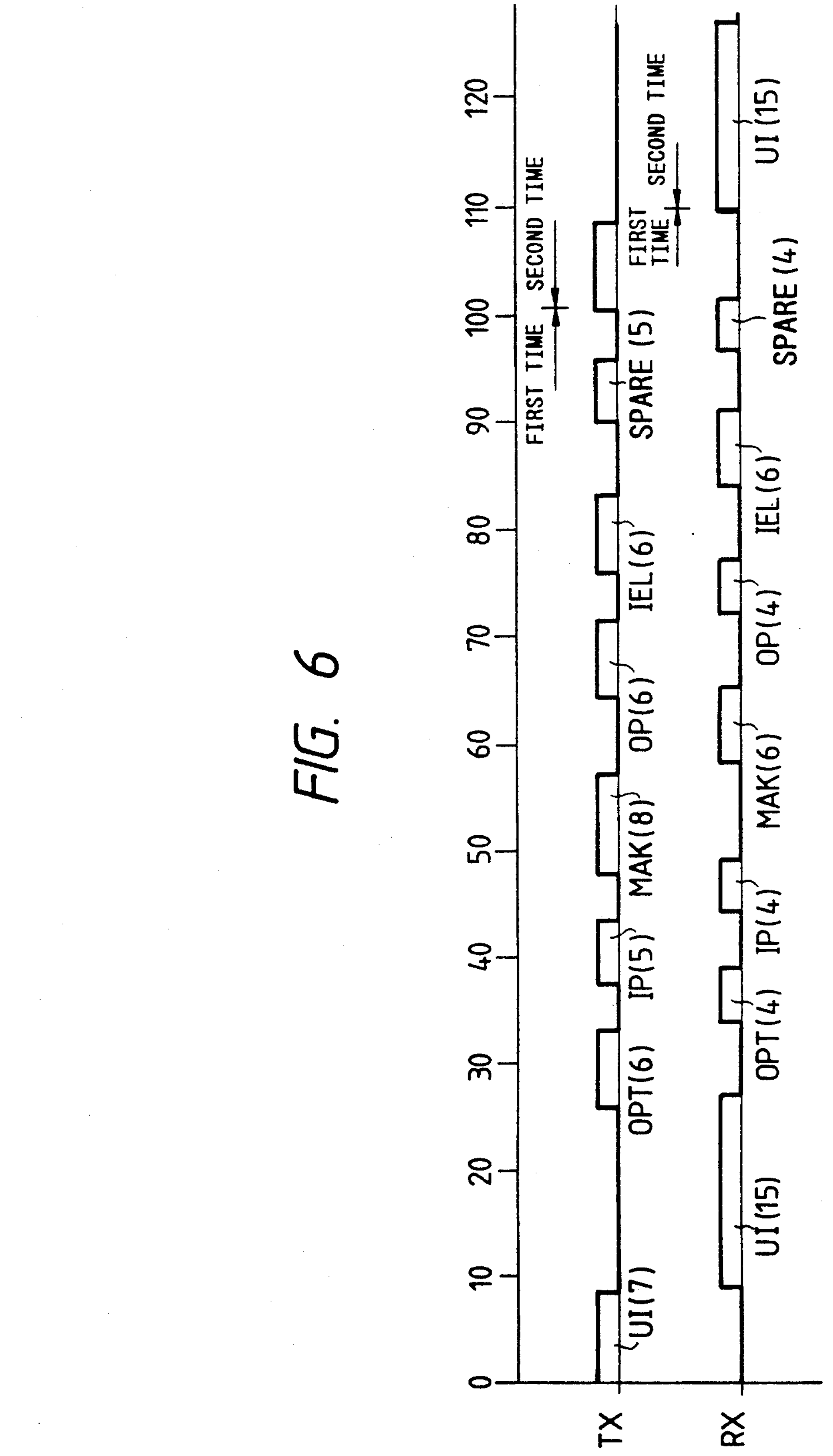
FIG. 6 is a timing chart showing intervals between communications in one communication cycle.

FIG. 5 is a diagram illustrating a transfer data structure and a transmission timing for the serial communication. FIG. 6 is a timing chart indicating communication intervals in one communication cycle. In serial communication between main CPU 1041 and respective CPUs 1042 through 1047, the amount of data shown in FIG. 5(*a*) is assigned to each CPU. FIG. 5(*a*) shows, in the case of the user interface (UI), that the transmitted data from main CPU 1041 is 7 bytes, received data RX is 15 bytes, and the transmitting timing Ti for the next slave (or optical CPU 1045) (FIG. 5(*c*)) is 26 ms. According to this example, a total of 86 bytes are transmitted and received, which means a period of about 100 ms at a communication speed of 9600 BPS. The data length consists of a header, a command, and data as shown in FIG. 5(*b*). If transmission and reception have a maximum data length as shown in FIG. 5(*a*), an overall communication cycle will be as shown in FIG. 6. Here, on the basis of 9600 BPS, the time required for transmitting 1 byte is 1.2 ms and the time required for the slave to initiate transmission after it has received the date is 1 ms, thereby defining one communication cycle to be equal to 100 ms.

(I-5) Division into States

Figure 7:
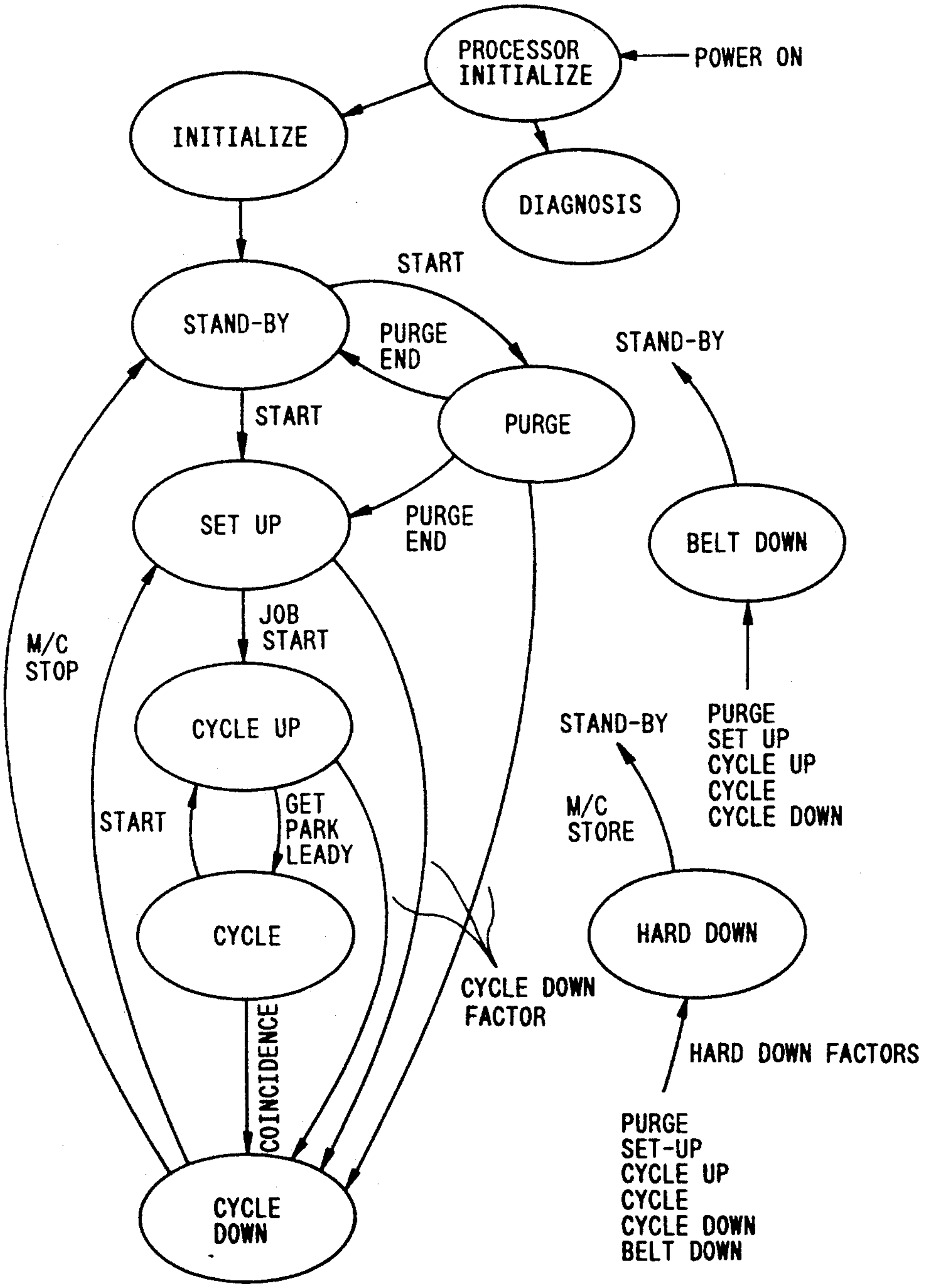
FIG. 7 is a transition diagram of a processor.

FIG. 7 is a diagram illustrating the states of the main system.

A state division ensures efficiency and accuracy of the control. Machine states from power-on to copy operation, as well as some number of states after the copy operation, are divided into some number of states to define specific jobs to be performed at the respective states. A following state can only be entered after jobs at the respective preceding states have been completed. The respective states are assigned flags, thus the respective systems can decide, by referring to these flags, what state the main system is in and what the respective subsystems should do. The respective subsystems are also state-divided and are assigned flags in accordance with the respective states. The main system refers to these subsystem flags to manage the states of the respective subsystems.

When the power supply is on, the system enters a processor-initialized condition and a decision is made based on whether the system is in the diagnostic mode or the user mode (copy mode). The diagnostic mode is a mode that is used by the main service during repair for performing various tests on the basis of the conditions set by an NVM (non-volatile memory).

In user mode, initialization is performed in accordance with the contents of the NVM. For example, the carriage is set to home position, the lens is set to a position of a magnification of 100%, and the respective subsystems are initialized. When initialization is completed, the system enters a standby state.

Standby state is maintained until a start button is pushed after all the subsystems have initialized. In standby state, a message "PLEASE WAIT" appears on the full auto mode picture. Then the sensitive lamp is turned on to cause idle rotation of the fuser for a required amount of time. The U/I will display a message "PLEASE COPY" when the fuser is warmed up to a predetermined control temperature. This standby condition lasts only several tens of seconds at the first power-up.

A set up state is a prewarming state occurring after the start button is pushed to activate the copy operation, in which a main motor and a sorter motor adjust constants such a $V_{DDP}$ of the sensitive material belt. The ADF motor is turned ON, feeding of the first document is initiated, the first document copy arrives at the regigate, where its size is detected, tray and magnification are determined in APMS mode, and the ADF document is pulled by a platen. Then the second document of the ADF is advanced to the regi-gate, thereby shifting the system to cycle up state.

Cycle up state is a state lasting until the first panel comes to a get park point after the belt is divided into some pitches for panel management. A pitch is determined in accordance with the copy mode and the optical subsystem is informed of the magnification for lens movement. Then, when the CHM subsystem and the IMM subsystem are informed of the copy mode and the magnification has been set, length of scanning is determined by the size of paper and the magnification, and the optical subsystem is informed of the length of scanning. Next, the marking subsystem is informed of the copy mode, the IMM checks a panel L/E, which depend on the pitch when the marking subsystem has completed its preparatory work. When the first copy panel is found and reaches the get park point, the system enters the cycle up state. The cycle of this state repeats the copy operation while performing ADC (Automatic Density Control), AE (Automatic Exposure), and DDP control, etc. at the same time as the copy operation. When R/L=counts of sheets, the document is replaced. This process is repeated until a required number of documents has been processed. Then a coincidence signal is output, causing the system to enter a cycle down state.

Cycle down state is a state in which carriage scan and paper feed, etc. are terminated and management after the copy operation is performed. In the cycle down state, the respective corotron and the developing equipment are shut off and the panel next to the last used panel is located at the stop park position to avoid fatigue of a specific panel due to over-use.

The system usually returns to the standby state, but returns to the set up state if a restart key is pushed for restarting when the copy operation has been carried out in the platen mode. The system also shifts to the cycle down state from the set up or the cycle up states under certain conditions, et.c., if paper jamming occurs.

In the case where jamming has occurred, the paper is automatically fed once the jammed paper is removed. Generally, when the jamming occurs, the system shifts from any state in the order of cycle down, standby, and purge states. Upon the end of the purge state, the system shifts to the standby or the set up states, but shifts to the cycle down state if the jamming reoccurs. The belt down state occurs, for example, when the jamming occurs between a tacking point and the tray, when the jammed paper can be removed by disengaging the belt clutch to stop the belt driving. The hard down state occurs when operation becomes dangerous due to opening of the interlock or when control becomes impossible due to clock failure, in which case the 24 volt power supply is shut off.

The system shifts to the standby state when these factors of the belt down an the hard down are removed.

II. Specific Arrangement of the Respective Units

(II-1) Optical System

Figure 8A:
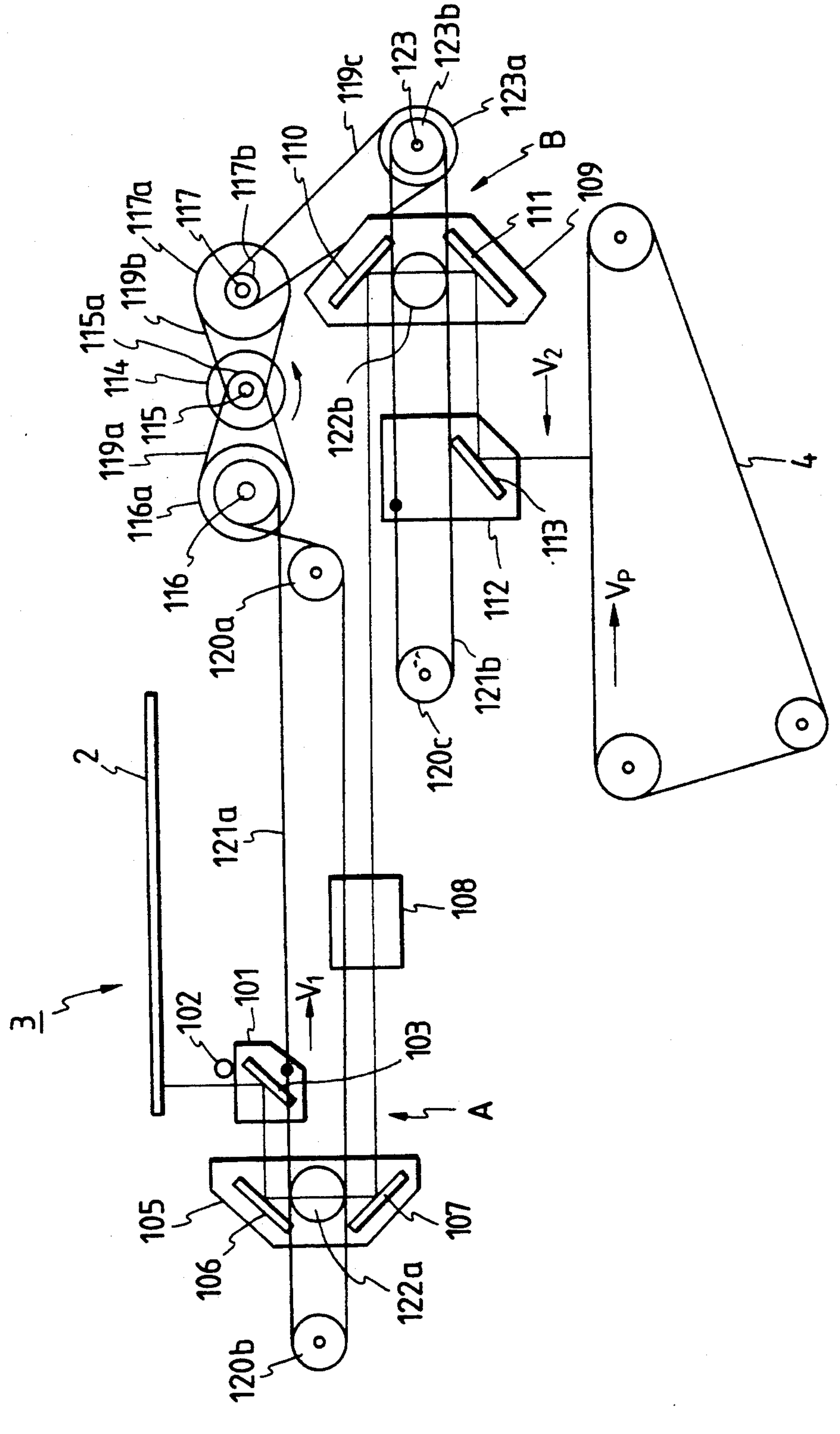
FIGS. 8(*a*), 8(*b*), and 8(*c*) are diagrams showing a scan exposure apparatus.
Figure 8B:
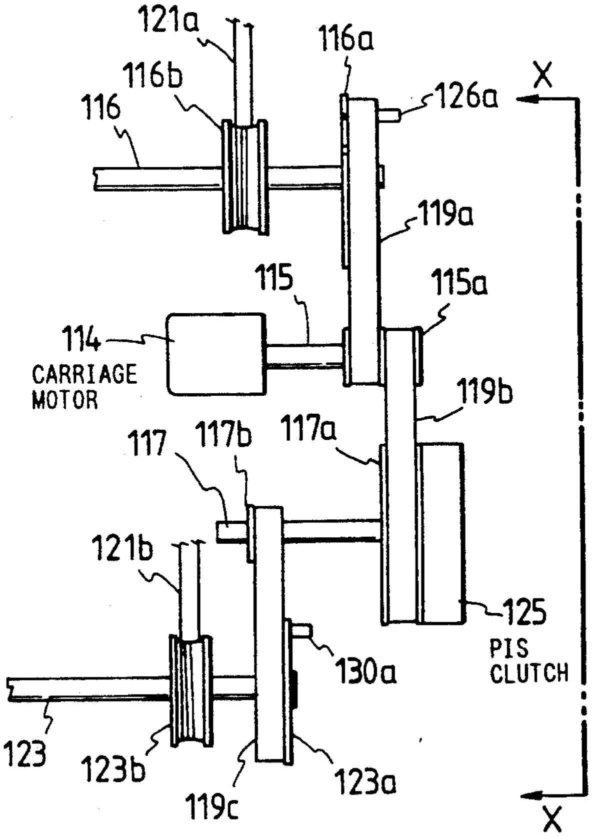
Figure 8C:
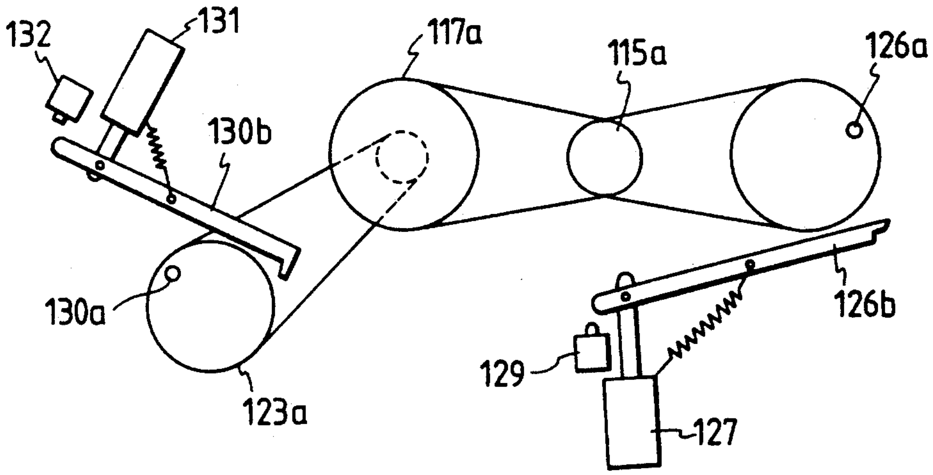

FIG. 8(*a*) is a general side view of the optical system. FIG. 8(*b*) is a top view of the optical system. FIG. 8(*c*) is a cross-sectional view taken along line X—X of FIG. 8(*b*).

A scan exposure device 1003 in this embodiment employs a PIS (precision imaging system) method in which the image is exposed on photo-sensitized material at a speed higher than a moving velocity of the sensitive material belt, as well as a method in which the second scan system B is fixed and the first scan system A is arranged to move independently of the other. The first scan system A consists of first carriage 101 having exposure lamp 102 and first mirror 103, and second carriage 105 having second mirror 106 and third mirror 107. The first scan system A scans the document placed on platen glass 2. On the other hand, the second scan system B consists of third carriage 109 having fourth mirror 110 and fifth mirror 111, and fourth carriage 112 having sixth mirror 113. Lens 108 is positioned on the optical axis of third mirror 107 and fourth mirror 110. Lens 108 is moved by a lens motor in accordance with the magnification but is fixed during scan exposure.

The first and second scan systems A and B are driven by carriage motor 114 of a D.C. motor. Transmission shafts 116 and 117 are disposed on both sides of output shaft 115 of carriage motor 114, and timing belts 119*a* and 119*b* are provided between timing pulley 115*a* secured to output shaft 115 and timing pulleys 116*a* and 117*a* secured to transmission shafts 116 and 117.

A capstan pulley 116*b* is secured on transmission shaft 116 and first wire cable 121*a* is provided in a crosswise manner between driven rollers 120*a* and 120*b* in opposition to pulley 116. First carriage 101 is secured on wire cable 121*a*, while at the same time wire cable 121*a* is wound around a reduction pulley 122*a* mounted on second carriage 105 in the direction of the arrow shown in the figure. First carriage 101 moves at a velocity of $V_1$ in the direction of the arrow shown, while the second carriage 105 moves at the velocity of $V_1/2$ in the same direction. Timing belt 119*c* is provided between timing pulley 117*b* fixed on transmission shaft 117 and timing pulley 123*a* of transmission shaft 123 disposed in opposition to timing pulley 117*b*. Second wire cable 121*b* is provided between capstan pulley 123*b* of transmission shaft 123 and driven roller 120*c* is disposed in opposition to capstan pulley 123*b*. Fourth carriage 112 is secured on wire cable 121*b*, while wire cable 121*b* is wound around reduction pulley 122*b* mounted on third carriage 109. When carriage motor 114 rotates in the direction of the arrow shown, fourth carriage 112 moves at a velocity of $V_2$ in the direction shown in the figure, while at the same time third carriage 109 moves at a velocity of $V_2/2$ in the same direction.

Further, as shown in FIG. 8(*b*), a PIS clutch (magnetic clutch) 125 is provided on transmission shaft 117 for transmitting the rotation of timing pulley 117*a* to timing pulley 117*b*, which is driven into engagement when the electric power to PIS 125 is shut off, thereby transmitting rotation of rotating shaft 115 to transmission shafts 117 and 123. When the electric power supplied to PIS 125 causes it to disengage, the rotation of rotating shaft 115 is not transmitted to transmission shafts 117 and 123. Also, as shown in FIG. 8(*c*), engagement protrusion 126*a* is provided on the side surface of timing pulley 116*a*. Engagement bar 126*b* engages engagement protrusion 126*a* upon activation of LDC lock solenoid 127 to thereby fix transmission shaft 116, and thus the first scan system A, which will cause LDC lock switch 129 to become ON. In addition, engagement protrusion 130*a* is provided on the side surface of timing pulley 123*a*. Engagement bar 130*b* engages engagement protrusion 130*a* upon activation of PIS lock solenoid 131 to fix transmission shaft 123 and thus second scan system B, which will cause PIS lock switch 132 to become ON.

With the scan exposure device thus far described, an exposure method of either PIS mode (precision imaging system) or NON-PIS mode is selected upon disengagement of PIS clutch 125. In the PIS mode, when a magnifying factor is greater than 65%, PIS clutch 125 is caused to engage, thereby causing the second scan system B to move at a velocity of $V_2$. Thus, the exposure point of sensitive material belt 1004 moves in the reverse direction of the photo-sensitized material to relatively increase the scan speed $V_1$ to be greater than the process speed $V_p$, and to thereby increase the number of copied sheets per unit time. At this time, $V_1=V_p\times3.5/(3.5M-1)$ where $V_1=432.5$ mm/s assuming that the magnification factor is M, and $V_p=308.9$ mm/s assuming $M=11$. Further, $V_2$ depend on the diameters of timing pulleys 117*b* and 123*a*, thus $V_2=\frac{1}{3}$ to $\frac{1}{4}$ of $V_1$. On the other hand, in the NON-PIS mode, in order to prevent an increase in speed of the scan system and an increase in lighting power and also to retard power consumption, if the reduction factor is, for example, less than 64%, disengaging PIS clutch 125 and causing the PIS lock solenoid to become ON will fix second scan system B to scan with the exposure point being fixed, thereby avoiding loads on drive system and an increase in power for lighting the document and keeping the total power consumption at less than 1.5 kVA.

Figure 9A:
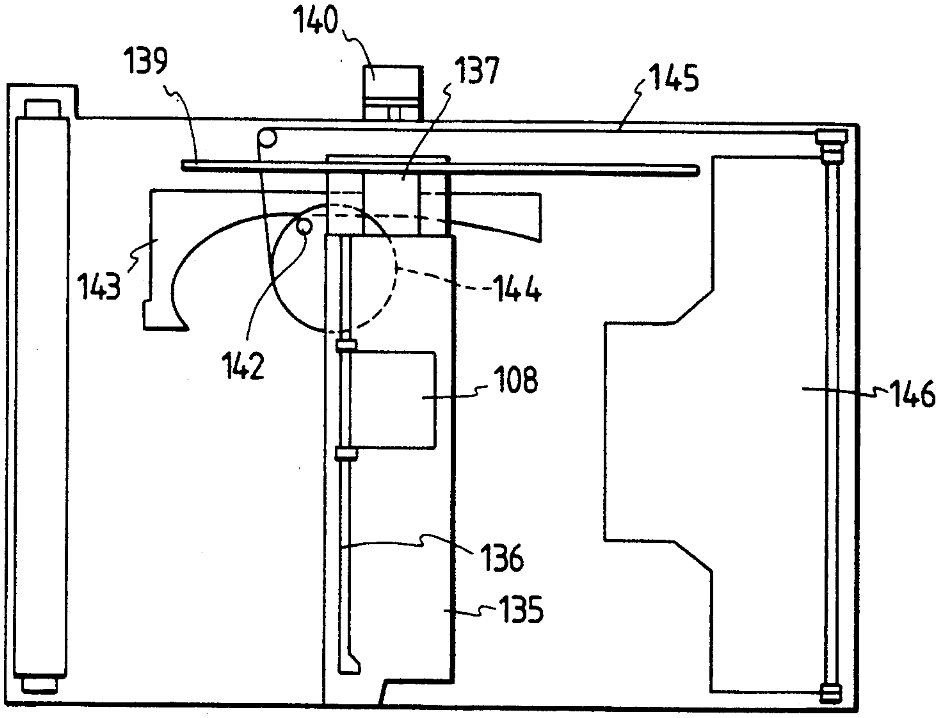
FIGS. 9(*a*) and 9(*b*) are diagrams showing a lens-driving system
Figure 9B:
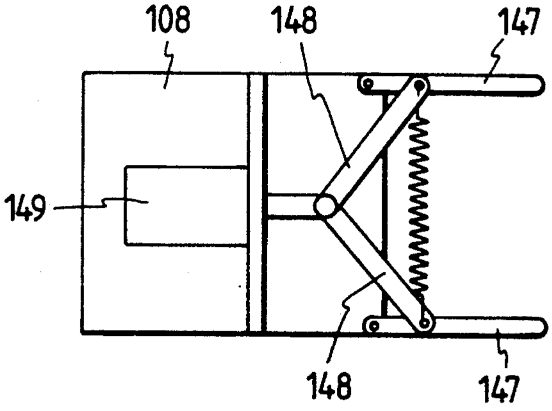

Lens 108, as shown in FIG. 9(*a*), is slidably mounted to supporting shaft 136, which in turn is secured on lens carriage 135 disposed below platen glass 2. Lens 108 is connected to lens Z motor 137 by means of a wire (not shown). Rotation of lens Z motor 137 causes lens 108 to move along the supporting shaft 136 in the direction of Z (vertical in the figure) thereby varying the magnification factor. Lens carriage 135 is mounted slidably to supporting shaft 139 close to the base while also being connected to lens X motor 140 by means of a wire (not shown). Rotation of the wire causes lens carriage 135 to move along the supporting shaft 139 in the direction of X (lateral direction in the figure), thereby varying the magnification. Lens motors 137 and 140 are 4-phase stepping motors. When lens carriage 135 moves, pinion 142 mounted on lens carriage 135 rotates along a curved surface of lens cam 143, thereby rotating large gear 144 and causing mounting base 146 of the second scan system to move by means of wire cable 145. Therefore, rotation of lens X motor 140 permits setting of the distance between lens 108 and second scan system B with respect to a predetermined magnification.

Further, as shown in FIG. 9(*b*), lens shutter 147 is mounted on one of the side surfaces of lens 108 by means of link mechanism 148 so that the lens shutter can be opened and closed at will. Lens shutter 147 opens during an image scan and closes after the image scan by means of ON or OFF of shutter solenoid 149. The purpose of shielding light by means of lens shutter 147 is to form a DDP patch and an ADC patch on the sensitive material belt and to prevent erasure of an image when second scan system B returns in the PIS mode.

Figure 10:
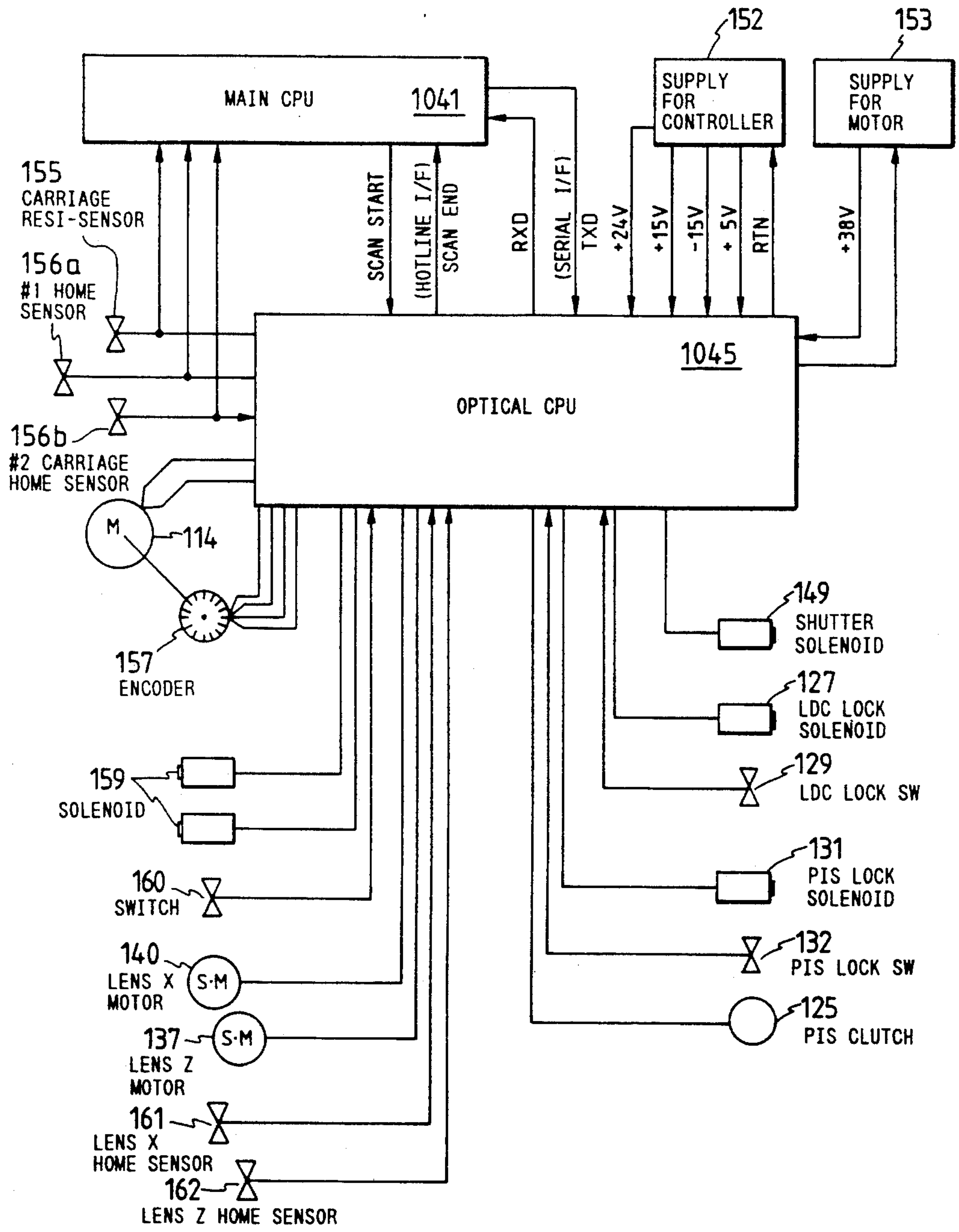
FIG. 10 is a diagram showing an arrangement of the control system for an optical system.

FIG. 10 is a block diagram illustrating a summary of the subsystem of the optical system. Optical CPU 1045, connected with main CPU 1041 through the serial communication and the hot line, controls the respective carriages and the lenses, etc., in order to form a latent image on the sensitive material in copy mode transmitted from main CPU 1041. Control power supply 152 consists of the supplies for logic (5 V), analog (±15 V), solenoid, and clutch (24 V). A 38V motor supply 153 is also provided.

Carriage regi-sensor 155 is positioned at a registry position in correspondence to first mirror 101 and provides a signal when an actuator on first scan system A does not depress carriage regi-sensor 155. This signal is sent to the optical CPU to determine a position or a timing for registration and to determine a home position P when returning first scan system A. To detect the position of the carriage, first home sensor 156*a* and second home sensor 156*b* are provided, and first home sensor 156*a* is disposed at a predetermined position between the registration-position and the stopping position of first scan system A for detecting the position of first scan system A to provide an output. Second home sensor 156*b* detects the position of the second scan system to provide an output.

Rotary encoder 157 provides pulse signals of a phase A and a phase B, the phase difference therebetween being 90 degrees, in accordance with the rotational angle of carriage motor 114. Rotary encoder 157 has been designed to have a shaft pitch of 0.1571 mm/pulse of the first scan system at 200 pulse/rotation. Solenoid 159 for variable power activates a variable power lens (not shown) through CPU 45 and recognizes movement of the variable power lens by means of ON/OFF operation of variable power switch 160. Lens home sensors 161 and 162 are sensors for detecting the home positions of lens X motor 140 and lens Z motor 137. LDC lock solenoid 127 fixes first scan system A at a preselected position under control of CPU 45. The LDC lock solenoid confirms the lock by means of LDC lock switch 129. PIS lock solenoid 131 is to fix the second scan system when PIS switch 125 is released in the NON-PIS mode. PIS lock solenoid 131 confirms the lock condition by means of PIS lock switch 132. PIS clutch 125 is of a type which causes the clutch to disengage when energized and to engage when not energized. PIS clutch 125 permits power saving in the PIS mode, thus contributing to accomplishing a total power consumption of 1.5 KVA.

Figure 11A:
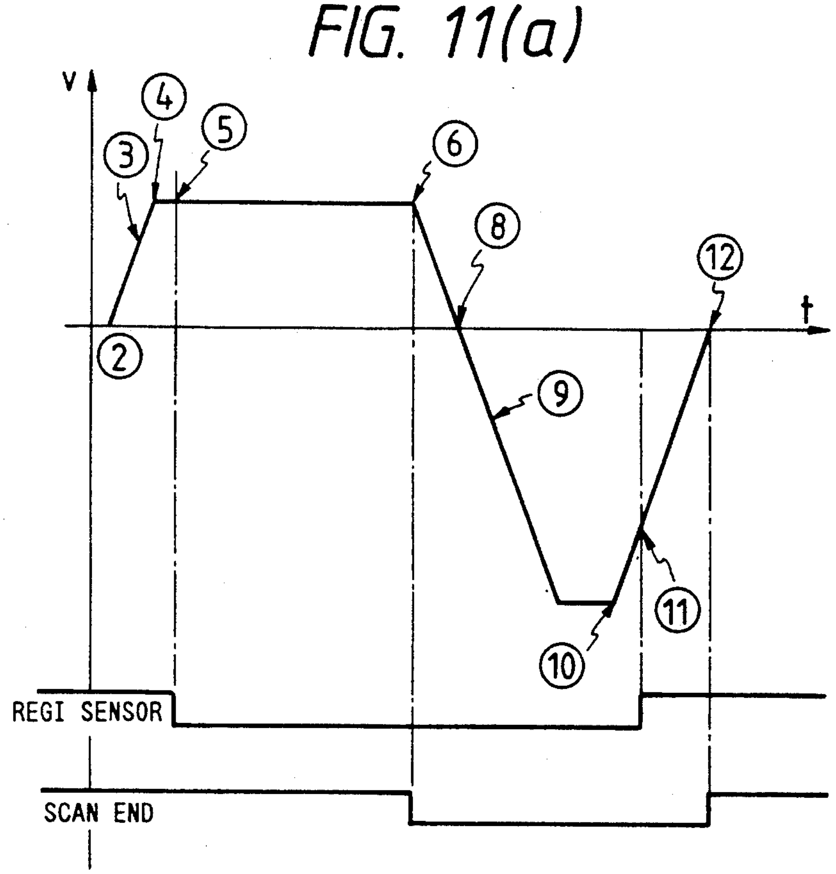
FIGS. 11(*a*) and 11(*b*) are diagrams illustrating the operation of the optical system.
Figure 11B:
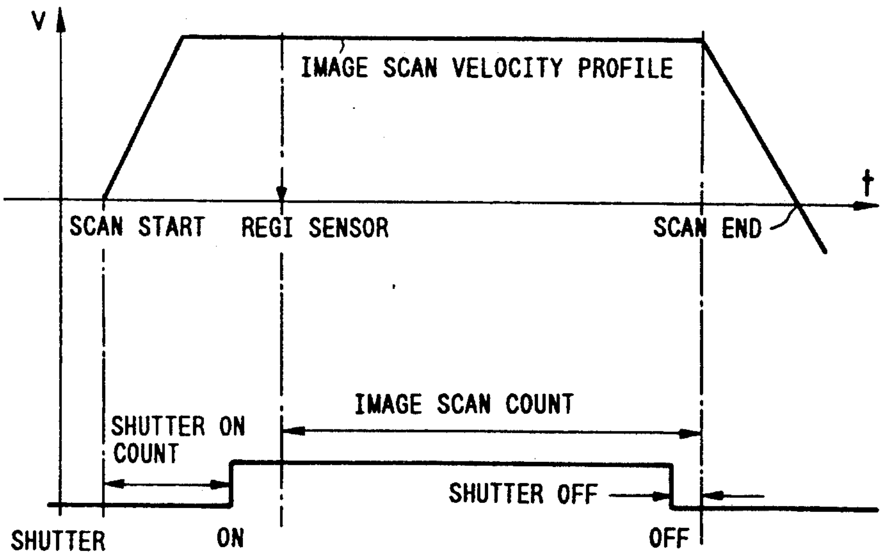

FIGS. 11(*a*) and 11(*b*) illustrate control of the scan cycle of the optical system, which scans first scan system A at a specified magnification and a scan length. The control is activated when a scan start signal is received from the hot line. An image scan count, which is the number of counts of the encoder clock from the interruption of the regi-sensor to the end of a scan, on the basis of scan length data received from the main CPU. First, after receipt of a reference clock data in accordance with the magnification, the carriage motor rotates in the direction of scan (CW) (step 2) to control acceleration when scanning (step 3). Then at step 4, a PLL (phase control) mode is set, and the regi-sensor initiates image scan (step 5) if an interrupt signal indicative of OFF is present. When the count exceeds the above-mentioned scan length (step 6), the PLL mode is disabled and velocity mode is set instead to cause the carriage motor to rotate in the return direction (CCW). Then at step 8, a decision is made based on whether or not an interruption occurred between CW and CCW (reverse rotation signal). If so, acceleration when returning is controlled (step 9). When a count of the encoder reaches a predetermined brake-initiating point (step 10), deceleration when returning is controlled (step 11), and the carriage motor is stopped (step 12) if the reverse rotation signal is present. Also, as shown in FIG. 11(*b*), the number of counts needed to open the shutter (shutter ON count) is set so that the shutter is opened when the number of clocks in the encoder becomes greater than the shutter ON count and the shutter is closed when the number of clocks of the encoder is greater than the shutter OFF count. Thereafter the image scan is terminated.

(II-2) Systems Associated with the Belt

The belt periphery consists of an image system and a marking system.

The image system is supervised by IMM subsystem 1034 to write and erase a latent image while the marking system is supervised by marking subsystem 1035 to perform charging, exposure, surface potential detection, developing, and transfer, etc. In the present invention, IMM subsystem 1034 and marking subsystem 1035 cooperate for performing panel management, patch formation on the belt, etc. to achieve high speed copy and high picture quality.

Figure 12:
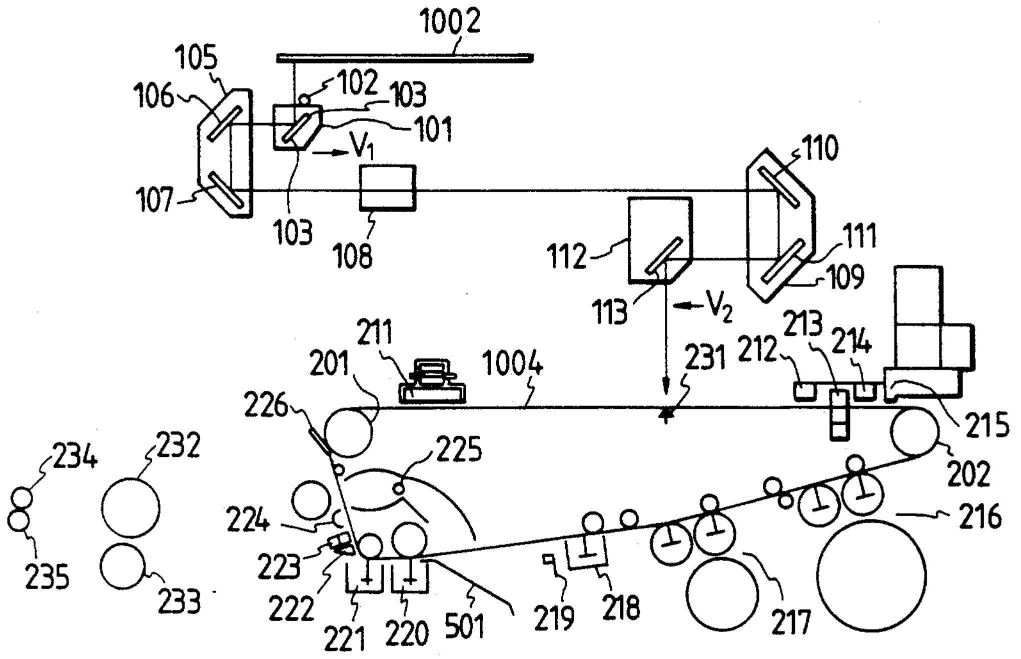
FIG. 12 is a general arrangement diagram illustrating a marking system.

FIG. 12 illustrates an outline of the belt periphery. Within base machine 1001 is disposed an organic sensitive material belt 4. The organic sensitive material belt is coated with charge-generating layers and transfer layers, etc. in multi-layer fashion to form a photo-sensitive material and has, therefore, a higher degree of freedom as compared to an Se-deposited photo-sensitive drum, as well as providing a large peripheral space of the belt, thus permitting easy layout. The belt can shrink and stretch, and the diameter of a roll varies with a temperature difference. Thus, a belt hole is provide at a distance from the belt seam and a train of pulses is produced in accordance with a rotational velocity of the motor by means of an encoder, thereby generating a machine clock. Counting the machine clock for one rotation of the belt at all times permits correction of the timing of the regi-gate and a pitch signal that is a reference for starting the carriage in accordance with the shrinkage and stretch of the belt.

The organic sensitive material belt in a preferred embodiment of the invention is longer than 1 m and can carry four sheets of paper of A4 size or three sheets of paper of A3 size. The panel (image-forming area on the belt) must be managed at all times to assure copy result of the desired panel because the belt has a seam. For this purpose, the embodiment is arranged in such a way that the position of the panel is determined with reference to the belt hole provided at a distance from the seam on the belt. The number of panels (number of pitches) to be placed on the belt is determined in accordance with the copy mode specified by the users and the paper size. A signal is output when the panel from which the first copy is to be made takes up the position of a get park in the vicinity of roll 201 after the start button is pressed, signaling that copying can be performed.

The organic sensitive material belt 1004 is charged uniformly by charge corotron (charger) 211 and is driven clockwise as shown in the figure at a constant velocity. When the first panel approaches regi-sensor 231 (portion to be exposed) by a predetermined amount of time, a pitch signal is outputted. Thus, the timing between the carriage scan and the paper feed is effected on the basis of the pitch signal. The surface of the belt charged by charge corotron 211 is subjected to exposing at exposure portion 231. The photo image of a document placed on platen glass 1002 is incident upon exposure portion 232, which in turn is disposed on the upper surface of base machine 1001. For this purpose, exposure lamp 102, a plurality of mirrors 110, 111, and 113 for transmitting the reflected light from the surface of the document lit by exposure lamp 102, and optical lens 108 are disposed. Mirror 101 is scanned for reading the image of the document. Mirrors 110, 111 and 113 form a second scan optical system, called a PIS (Precision Image Scan), in which the second optical system is scanned in a direction opposite to the movement of the belt for increased relative speed between the two in order to increase the processing speed and the copy speed, thereby accomplishing a maximum copy speed of 64 sheets/min (CPM).

Picture information obtained in a spit-like manner at exposure portion 231 forms a static latent image in accordance with the document on organic sensitive material belt 1004. After the static latent image is subjected to erasure of unwanted images and portions between images and side erasure at IEL (Inter-Image Lamp) 215, the static latent image is then developed by developing device 216 normally of black toner or by developing device 217 of color toner to form a toner image. The toner image moves with rotation of the organic sensitive material belt 1004, passing by pretransfer corotron (image transfer) 218 and transfer corotron 220. Pretransfer corotron 218 is generally for retarding electrical adhesive force of toner by application of an alternating current for ease of movement of toner. Being lit from behind by pretransfer lamp 225 (also used for erasure) before the transfer, the belt formed of a transparent material serves to retard electrical adhesive force of the toner, thus facilitating the transfer.

In the meantime, either the copy paper received in the supply tray of base machine 1001 or the copy paper fed manually through manual insertion tray 1016 is advanced with the aid of an advancement roll and is guided by an advancing path to pass between organic sensitive material belt 1004 and transfer corotron 220. Advancing the paper is effected basically by the LEF (Long Edge Feed), where the regi-gate is controlled to pen and close so that the tip end of the paper coincides with an exposure-initiating position at the tacking point, thereby transferring the toner image onto the copy paper.

The paper is released from sensitive material belt 1004 by detacking corotron 221 and strip finger 222, the paper after completion of transfer process passes through the gap between heat roll 232 and a pressure roll heat-fixing and then passes between transfer rolls 234 and 235 to be delivered onto a delivery tray (not shown).

After the copy paper is removed, sensitive material belt 1004 is treated by preclean corotron 224 for ease of cleaning, the unwanted charge is erased by being lit from behind by lamp 225, and the unwanted toner waste is scratched off by blade 226.

On belt 1004 a patch is formed between images by patch generator 212 and the static potential of the patched portion is detected by ESV sensor 214 for density adjusting. Also, belt 1004 is provided with a hole, as mentioned previously, which is detected by belt hole sensor 213 for determining the belt speed, thereby controlling the process speed. ADC (Auto Density Control) 219 compares the amount of light reflected from the toner deposited on the patched portion and the amount of reflected light when the toner is not deposited to detect a level of deposition while also detecting, by pop sensor 223, when the paper has wrapped around the belt instead of releasing properly.

Figure 13:
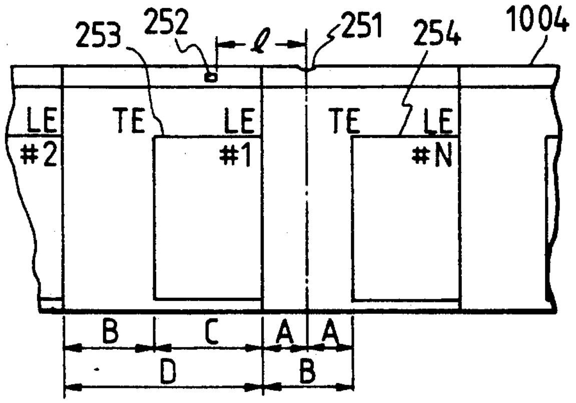
FIG. 13 is a diagram illustrating a panel division on a sensitive material belt.

FIG. 13 illustrates how the panels are divided on the sensitive material belt 1004.

It is important that the image does not lie over seam 251 of belt 1004. Belt hole 252 is provided at a distance l away from the seam, e.g., 70 mm, for a total length of 1158 mm of sensitive material belt 1004. Reference numerals 253 and 254 indicate the first and the last panels when the sensitive material belt surface is divided into N pitches. In the figure, B is a space between the panels, C is a panel length, and D is a panel pitch. The panel pitch is 289.5 mm for 4-pitch division, 386 mm for 3-pitch division, and 579 mm for 2-pitch division, respectively. A relation $A=B/2$ is maintained so that the seam 251 will be in the middle between the LE (Lead Edge) of the panel 253 and TE (Tail Edge) of panel 254.

While the LE of the panel is required to coincide with the LE of the paper, the TE of the panel does not necessarily coincide with that of the paper, but does coincide with the TE of a maximum size of paper to which the panel is applied.

Figure 14:
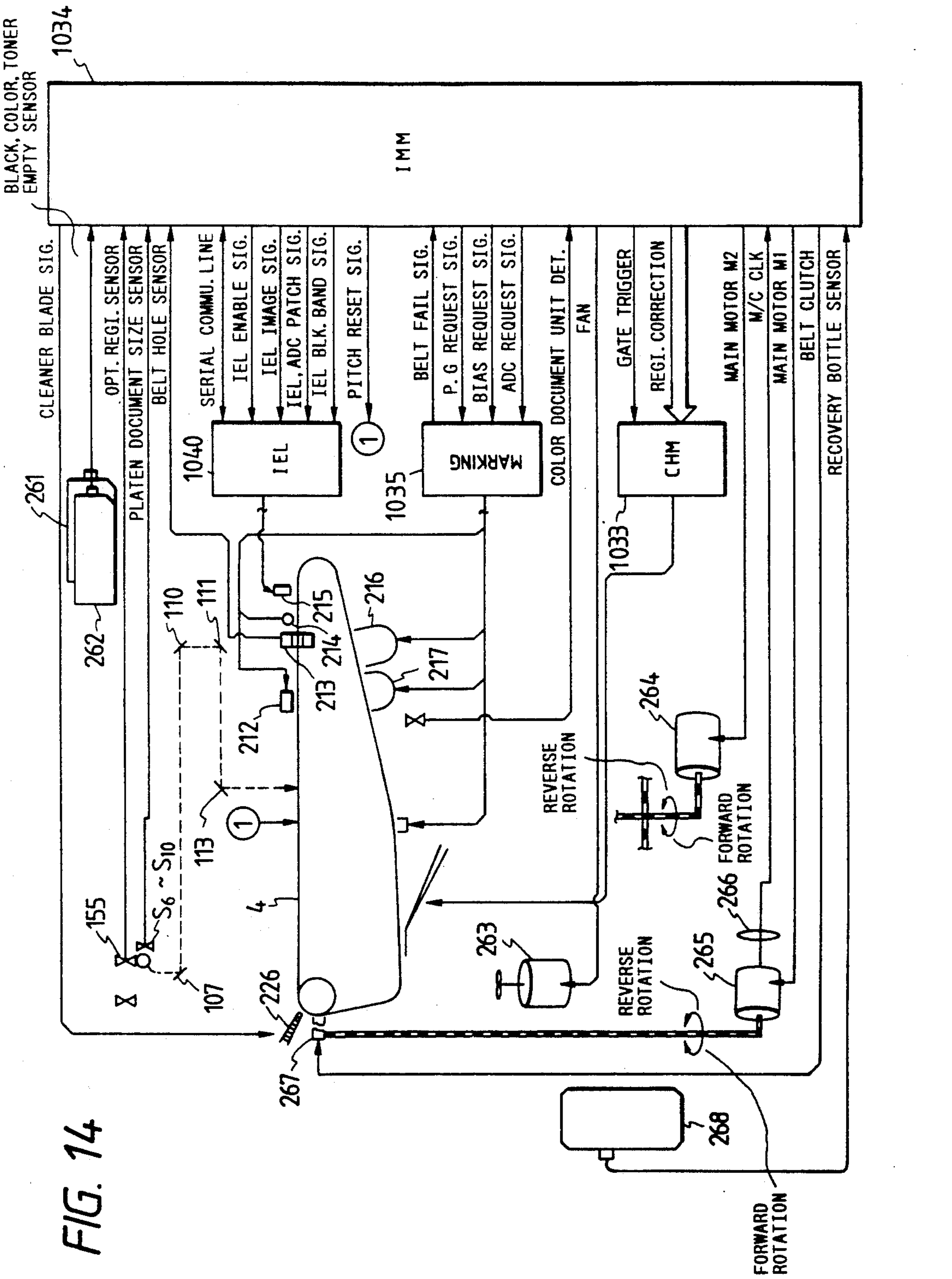
FIG. 14 is a block diagram showing general functions of the marking systems.

FIG. 14 is a block diagram illustrating a summary of functions of IMM subsystem 1034.

IMM subsystem 1034 performs serial communication with IEL subsystem 1040 through a bus line and sends an interrupt signal through the hot line to control with high precision, thus performing management for image formation, while at the same time IMM subsystem 1034 sends a control signal to a marking subsystem 1035 and CHM subsystem 1033 to control jobs associated with the belt.

IMM subsystem 1034 detects the hole provided on organic sensitive material belt 1004 for controlling the main motor while also determining the position of panel formation thus performing management. Further, the IMM subsystem allows idle rotation of the fuser for maintaining a fixing roll at a required temperature for a quick copy service. When the star key is operated, the subsystem enters the set-up state to adjust constant values such as $V_{DDP}$ prior to copy operation. When the copy cycle is entered, subsystem 1034 performs ensure of LE (Lead Edge) and TE (Tail Edge) of the image for forming a necessary image area on the basis of the size of the document. Subsystem 1034 also forms patches for toner density adjustment within the inter-image area.

Further, upon detection of "hard down" such as jamming and belt failure, the IMM subsystem stops the belt or communicates with the sequence manager to stop the machine.

The input signal and the operation of the IMM subsystem will now be described.

The detection signals for toner in black toner bottle 261 and in color toner bottle 262 are input to the IMM subsystem to detect the amount of toner remaining.

An optical regi-signal is input from an optical regi-sensor 155 and used to generate a PG request signal, a bias request signal, and an optical regi-signal on which an ADC request signal is based.

The size of the document is input from platen document size sensors $S_6$ to $S_{10}$, and an area to be erased by IEL 215 is determined on the basis of this document size and the paper size.

A belt hole signal is input from belt hole sensor 213 for controlling the process speed by main motors 264 and 265 to compensate for variation of the time required for the belt to complete one rotation. Two main motors are employed and operated at an efficient operating speed.

Also, the motors employ regenerative braking for improved accuracy of stop-positioning. The motors can be operated in a reverse rotational direction for removing toner waste or paper dust deposited on the blade when cleaning the sensitive material belt with the blade being in close contact with the belt. Driving the belt by the motors is performed through belt clutch 267. Thus, the belt also can be selectively stopped. Pulses are generated by an encoder in synchronism with rotation of the motors. These pulses are used as a machine clock in accordance with the belt speed.

When the belt hole cannot be detected by the belt hole sensor 213 for a certain time interval or when the size of the hole has changed, the IMM subsystem 1034 instructs the sequence manager to stop the machine.

The IMM subsystem 1034 communicates with IEL subsystem 1040, while also sending an interrupt signal through the hot line to provide an IEL enable signal, an IEL image signal, an ADC patch signal, and an IEL black band signal. The IEL image signal erases the unwanted image and the ADC patch signal specifies, through the IEL subsystem 1040, the shape and area of the patch region formed by patch generator 212 as well as adjusting the amount of charge or constant static potential to between 500 and 600 V.

The IEL black band signal forms a black band between the images with a predetermined space for depositing toner. The toner serves as a kind of lubricant, so that damage to belt 1004 from blade 226 can be prevented, particularly when the amount of toner is very small, resulting an almost while-paper-like copy. Further, the IMM subsystem communicates with marking subsystem 1035 through the hot line to provide a patch formation request signal, a bias request signal, and an ADC request signal on the basis of the optical regi-signal. Marking subsystem 1035 receives these signals for driving patch generator 212 to form the patch. System 1035 also drives ESV sensor 214 to detect the static potential and drives developing machines 216 and 217 to form the toner picture. System 1035 also drives and controls pretransfer corotron 218, transfer corotron 220, and detack corotron 221.

The IMM subsystem provides a pitch reset signal for timing a carriage start.

A detection signal indicative of whether or not the color developing unit is present is input to the IMM subsystem, thereby detecting whether the toner in the developing unit is black or color.

A regi-gate trigger signal is sent to CHM subsystem 1033 from the IMM so that the paper coincides with the end of the image at the tacking point. The IMM subsystem calculates an amount of correction for correcting the timing to open the regi-gate if required.

The toner scratched off by blade 226 is recovered in toner recovery bottle 268, a detecting signal indicative of the amount of toner in bottle 268 is input to the IMM subsystem, and an alarm is raised if a predetermined level of toner is exceeded.

Further, the IMM drives fan motor 263 to prevent an abnormal rise in temperature and to maintain the environmental temperature within a tolerated range for high quality copy pictures.

Figure 15:
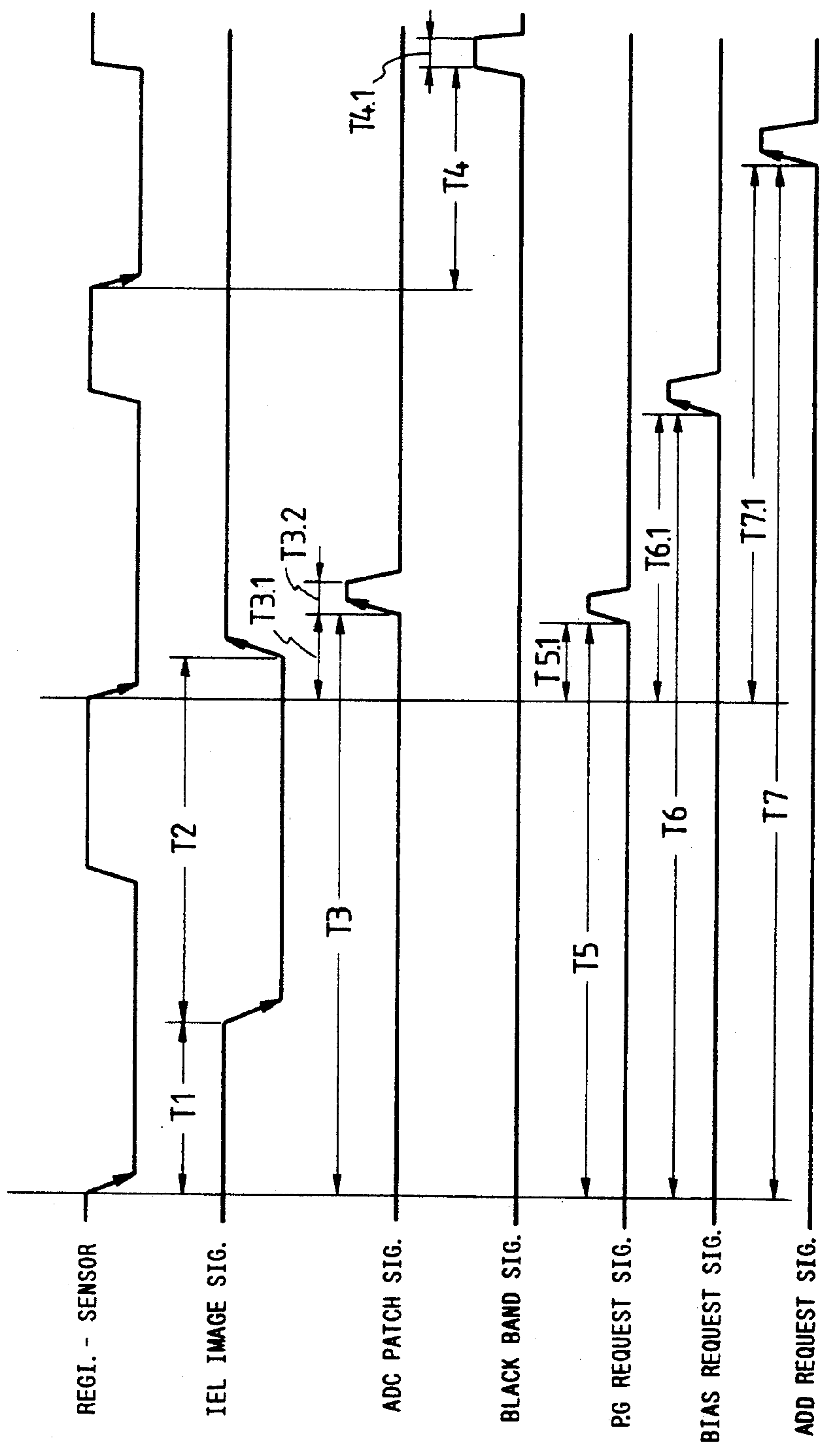
FIG. 15 is a diagram showing the timing chart of the marking system control sequence.

FIG. 15 shows a timing chart. The optical regi-sensor provides a time reference signal. The IEL is turned OFF a predetermined time (T1) after the optical sensor ON/OFF signal. That is, the IEL remains ON for a time T1 for erasing the lead end of the image and then becomes OFF after 72 for erasing the tail end of the image. Thus, the image is formed with the aid of the IEL image signal and the lead end of the paper coincides with the lead end of the image by controlling the regi-gate timing. After formation of the image, the ADC patch signal is generated upon receipt of a patch generator request signal (T5 time units after the reference time) to form a patch in the inter-image. After patch formation, the bias request signal is output (T6 time units after) for development. Thereafter, the ADC request signal is output (T7 time units after) for detecting density of the toner. The black band signal causes a black band to be formed in the inter-image.

During the AE (Auto Exposure) scan, the IEL image signal is not turned ON or OFF.

(II-3) Paper Transferring System

Figure 16:
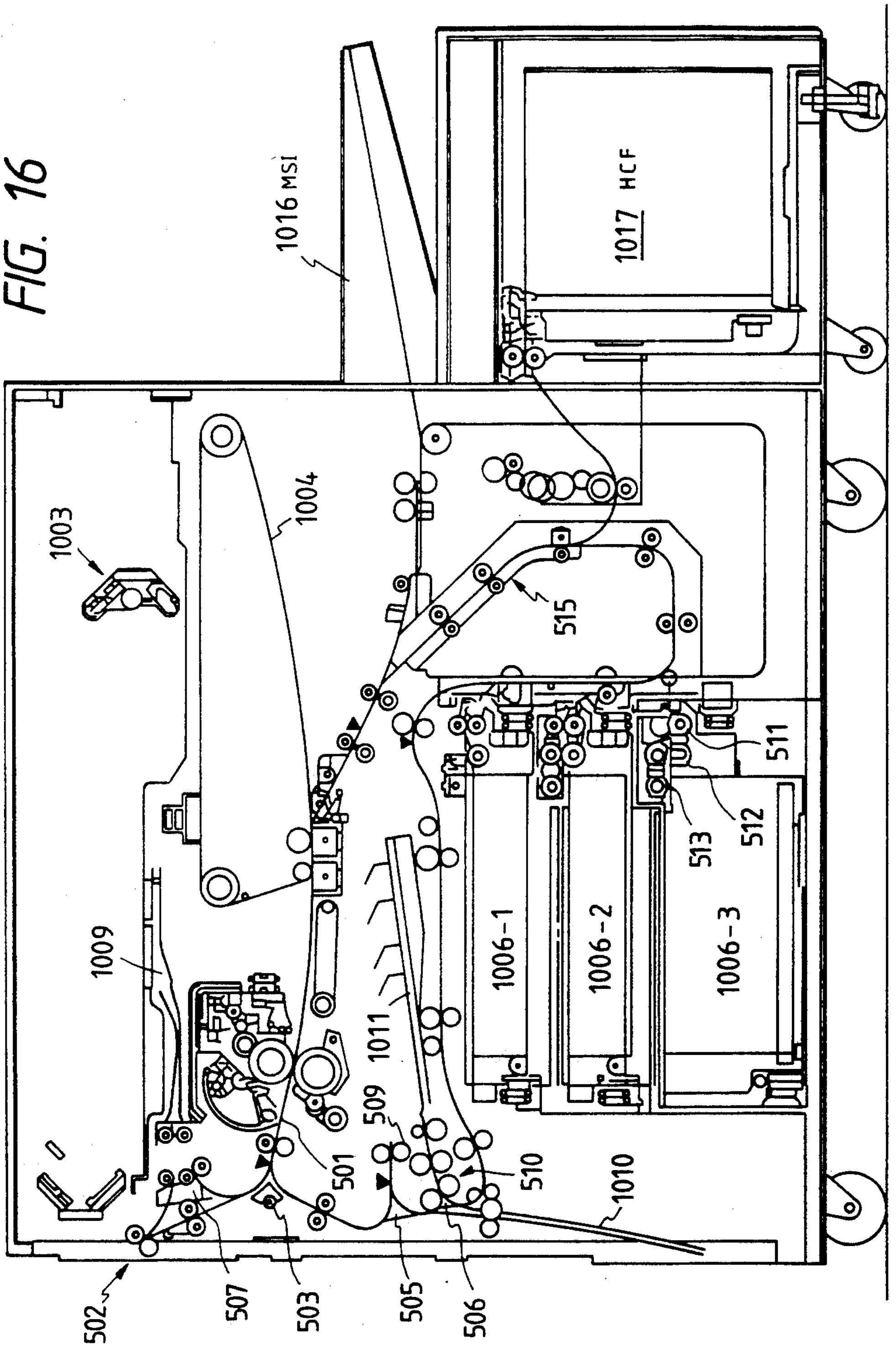
FIG. 16 is a side view of a paper delivery system.

Referring to FIG. 16, the upper paper tray 1006-1, the middle paper tray 1006-2, the lower tray 1006-3 as a paper tray, and duplex tray 1011 are provided within the base machine. Optionally, large capacity tray (HCF) 1017 and manual paper insertion tray (MSI) 1016 are provided on the side of these trays. On each tray are provided appropriately a no-paper sensor, a size sensor, and a clutch, etc. The no-paper sensor is a sensor for detecting the presence of the copy paper in the feeding tray and the size sensor is a sensor for detecting the size of the paper. The clutch is a component for starting and stopping driving of the respective paper advancing rolls. In this manner, setting the same size of copy paper in plural feeding trays permits automatic feeding of the same size paper from another feeding tray when a first one of the feeding trays runs out of paper.

Feeding the copy paper is performed by a feed stepper motor exclusively provided for the task. A feed sensor detects whether or not the paper feeding is performed normally. A gate solenoid is used for registration in which the lead ends of the copy paper fed out are aligned properly. Unlike conventional solenoids, the gate solenoid opens to allow the paper to pass through when the gate solenoid is deenergized. Thus, in the standby state, in which paper will not arrive, the solenoid is not supplied electric power, keeping the gate open and reducing total power consumption. Immediately before the copy paper arrives, the gate solenoid is energized to close the gate so the paper will not pass. Thereafter, the solenoid is deenergized to open the gate when copy paper is to be delivered. This method of control minimizes variation of the gate position at a time the lead end of the copy paper is blocked, thereby positioning the copy paper accurately even if the copy paper is depressed against the gate strongly.

In the case where the same paper is copied twice, for example, in a duplex mode in which the paper is copied on both sides thereof or in a synthesis mode in which a plurality of copy processes are carried out on the same side of the paper, the paper is directed to a transfer route for stacking in duplex tray 1011. In the duplex mode, the paper is stacked directly in duplex tray 1011 from the transfer route, while in the synthetic mode the paper is transferred to inverter 1010 for the synthetic mode, and then is directed to duplex tray 1011 after the paper is turned. Gate 503, provided at a branching point, splits the route from transfer route 501 into two directions, one toward paper take up exit 502 leading to a sorter, etc., and the other toward duplex tray 1011. On the duplex tray 1011 side are gates 505 and 506 for switching the transfer route at a branching point leading to synthetic mode inverter 1010. Gate 507 also is provided at paper take up exit 502 so that the paper can be taken up with the copied side facing up by turning the paper by triroll inverter 1009.

Figure 17:
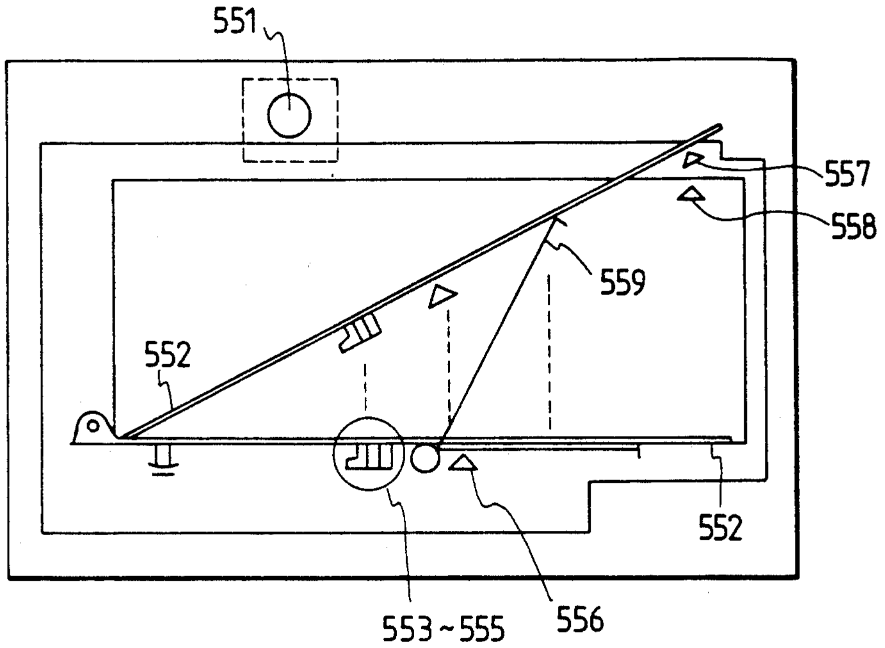
FIG. 17 is side view of a paper tray.

The upper tray and middle tray are capable of storing approximately 50 sheets of paper sizes between A3 to B5 size, legal size, letter size, special B4 size, or 11 by 17 size. These trays have tray motor 551, as shown in FIG. 17, which causes tray 552 to tilt when few sheets of paper are remaining. These trays are also provided with three paper size sensors 553 to 555 for detecting paper size, no-paper sensor 556, and surface control sensor 557 for adjusting tray height. To prevent the tray from climbing too high, emergency switch 558 is provided. The lower tray can contain approximately 1100 sheets of paper of the same size as the paper in the upper tray and the middle tray.

In FIG. 16, the duplex tray can contain about 50 sheets by paper of the same size as those in the aforementioned trays. Duplex tray 1016 is used to temporarily contain the copied papers when the papers are to be copied on the same side more than one time or when the papers are to be copied on both sides in turn. Feed roll 509 and gate 505 are provided at the transfer path on the entrance side of duplex tray 1011 by which selection of paper transfer is effected depending on whether the mode is synthesis mode or duplex mode.

Figure 18:
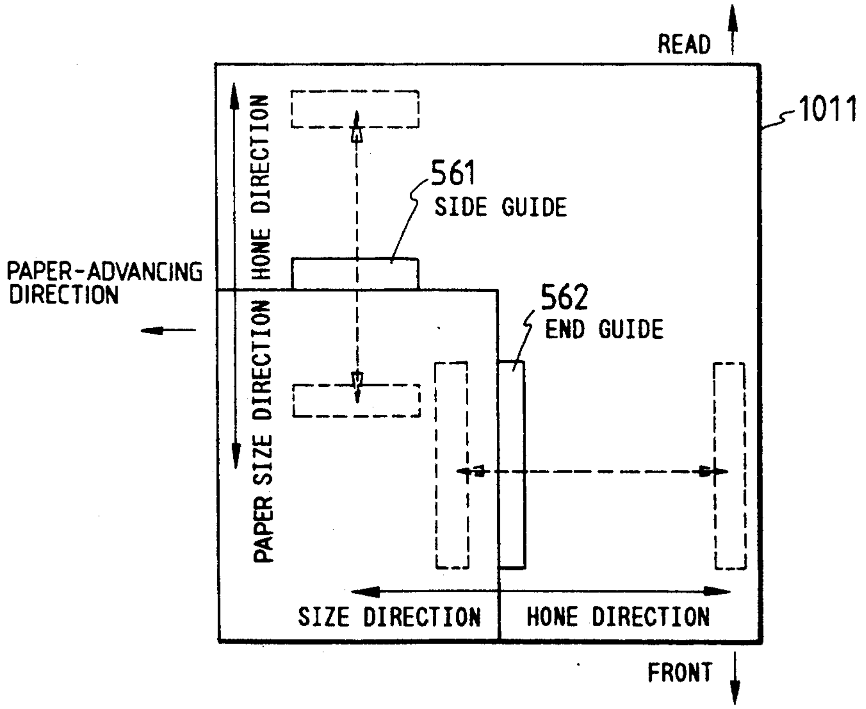
FIG. 18 is a top view of a duplex tray.

For example, in the duplex mode, a sheet of paper transferred down from above is directed to the feed roll 509 side. In contrast, in the synthesis mode, the sheet of paper transferred down from above is directed by gates 505 and 506 to the mode inverter 1010, and the turned paper is directly by gate 506 to feed roll 510 and to duplex tray 1011. A tray-inclining angle of about 17 to 20 degrees is generally required if the paper contained in duplex tray 1011 is to fall freely to a predetermined edge position. However, since duplex tray 1011 is accommodated in a narrow space for overall compact size of the apparatus, a maximum inclining angle of only 8 degrees is allowed. For this reason, duplex tray 1011 is provided with side guide 561 and end guide 562 as shown in FIG. 18. The side guide and the end guide are controlled so that they are stopped at a position corresponding to the paper size when the paper size is decided.

A large capacity tray (HCF) is a supply tray that can accommodate many thousands sheets of the copy paper. For example, it may often be appropriate to buy only the base machine for customers who do not need document expansion or reduction or who need copies in only a small quantity. In contrast, the duplex tray or the large capacity tray are often required for those customers who need copies in a large quantity or who need complex copying operations.

To meet such a wide variety of requirements, the duplicator system according to the present invention is arranged so that the respective peripheral devices can easily be attached or detached. In addition, some of the peripheral devices are provided with independent CPUs (Central Processing Units) for divided control by a plurality of CPUs. This arrangement not only improves on the availability of products to meet customers' needs but also leaves open the possibility of new types of copying operations that come from provision of the new peripheral devices. This possibility makes introduction of this duplicator system very attractive in that the apparatus can propel the evolution of the office work.

Manual paper insertion tray (MSI) 1016 is a tray that can accommodate about 50 sheets of paper of the sizes A2F to A6F, particularly large sizes of paper that cannot be accommodated in other trays. With this type of conventional manual paper insertion tray, the copy paper is supplied manually one at a time. Thus, the paper is advanced at the time of manual paper insertion, overriding other modes of paper supply and making it unnecessary for the operator to select the tray. In contrast to this, a manual paper insertion tray 1016 according to the present invention can set a plurality of copy paper at the same time. Therefore, if the paper is supplied from the manual insertion tray 1016 upon setting of the paper, then the paper feeding possibly may be started while setting of a plurality of paper is still in progress.

To prevent such an occurrence, manual paper insertion tray 1016 must be explicitly selected.

The present invention employs an arrangement in which measure roll 513, feed roll 512, and take away roll 511 are integrally mounted for compactness of the apparatus. After the lead end of the paper is nipped by taking away roll 511, the lead end of the paper is detected by a feed out sensor and the paper is stopped temporarily to be preregistered and aligned. The paper fed out is transferred to the image-transfer position of sensitive material belt 1004 through aligner device 515.

(II-4) Automatic Document Advancing Device (DADF)

Figure 19:
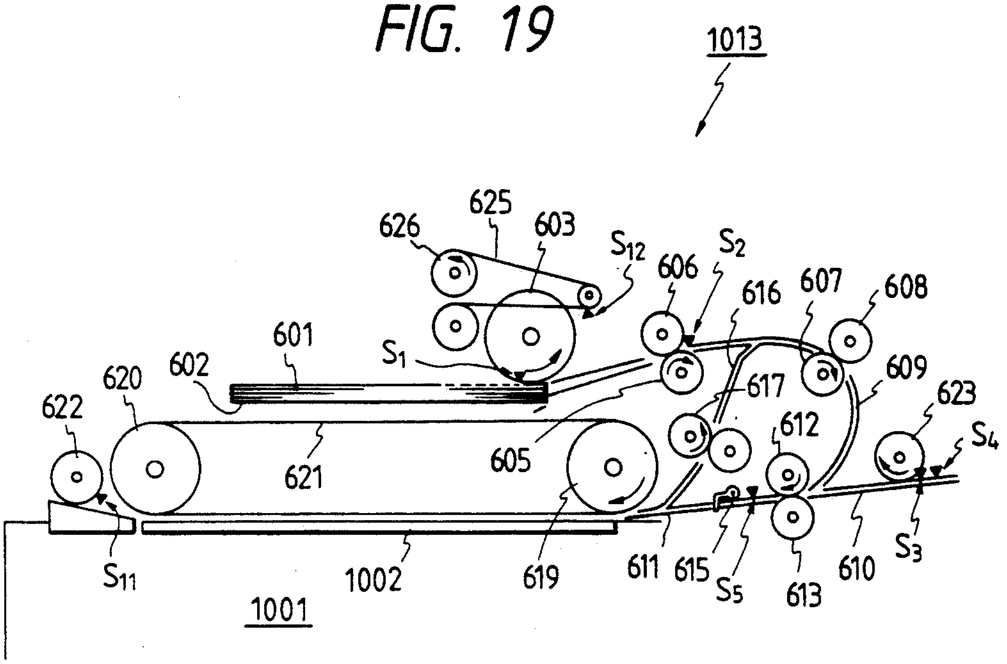
FIG. 19 is a side view of auto document feeding devices.

In FIG. 19, DADF 1013 is mounted on platen 1002 of base machine 1001. DADF 1013 is provided with document tray 602 on which documents 601 are placed. On the document supply side of document tray 602 is disposed supply paddle 603 to send out documents 601 one at a time. Documents 601 thus supplied are delivered between first drive roller 605 and its driven roller 606 and then between second drive roller 607 and its driven roller 608 toward arcuate delivery path 609. Arcuate delivery path 609 is merged into the manual insertion transfer path 610 to be connected with horizontal transfer path 611. Third drive roller 612 and its driven roller 613 are provided at the exit of arcuate delivery path 609. Third drive roller 612 can be moved up and down by means of a solenoid (not shown), so that it can be moved into and out of driven engagement with driven roller 613. Horizontal transfer path 611 is provided with stop gate 615 driven into rotation by a drive motor (not shown) and is also connected to turning delivery path 616 toward arcuate delivery path 609. Turning delivery path 616 is provided with fourth drive roller 617. Also, belt drive roller 619 is provided on platen glass 1002 in opposition to the exit of horizontal delivery path 611 so that belt 621 is sandwiched between its driven roller 620 and can be driven in both a normal and a reverse direction. Fifth drive roller 622 is provided on the exit of the belt transfer path. Sixth drive roller is provided on manual insertion transfer path 610. Two drive rollers 623 are provided in front and back of the base machine (in a direction normal to the paper) and are capable of simultaneously advancing two sheets or paper of the same size. Cleaning tape 625 cleans the surface of supply paddle 603 with seventh drive roller 626.

Figure 20:
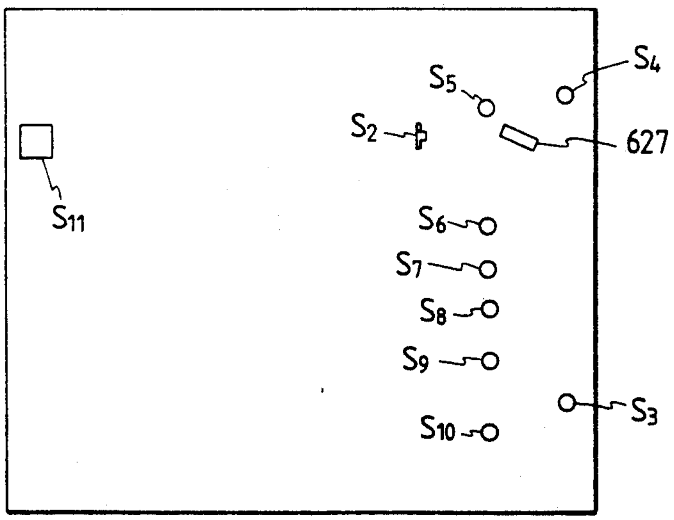
FIG. 20 is a top view of a sensor layout.

Next, photosensors $S_1$ to $S_{12}$ of FIG. 20 are described. Photosensor $S_1$ is a no-paper sensor for detecting the presence or absence of document 601 on document tray 602, and photosensor $S_2$ is a take away sensor for detecting passage of document 601. Photosensors $S_2$ and $S_4$ are feed sensors provided along manual delivery path 610. Photosensor $S_5$ is a regi-sensor for detecting whether or not the tilted feeding of the document is corrected by skew roller 627 and is positioned at the predetermined position on stop gate 615. Photosensors $S_6$ to $S_{10}$ are paper size sensors for detecting the size of the document paper, and photosensor $S_{11}$ is a take up sensor for detecting whether or not the document has been discharged. Photosensor $S_{12}$ is an end sensor for detecting the lead end of cleaning tape 625.

Figure 21A:
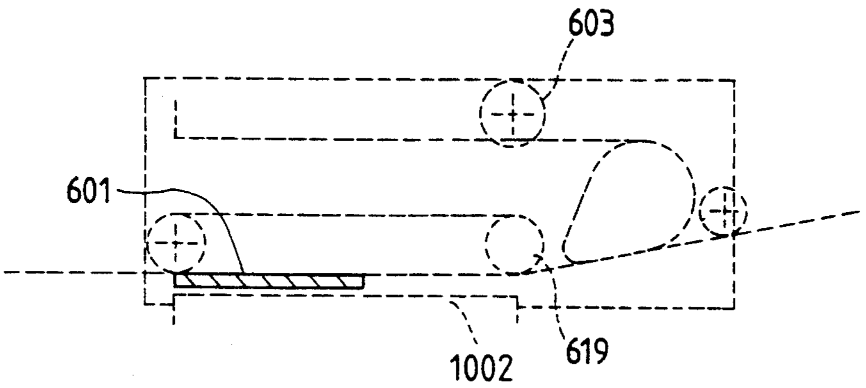
FIGS. 21(*a*), 21(*b*) and 21(*c*) are diagrams illustrating how the document is automatically delivered.
Figure 21B:
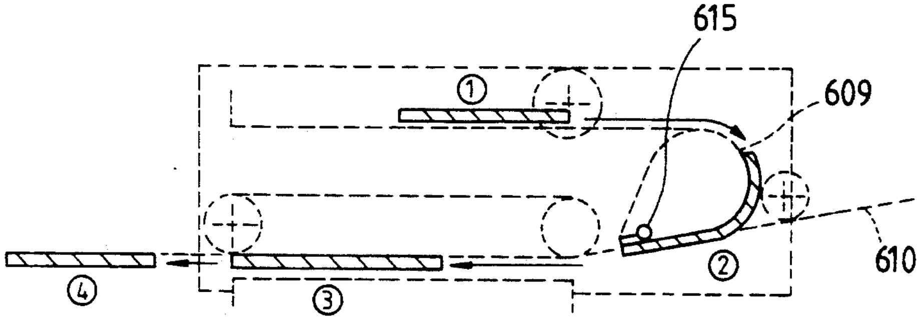
Figure 21C:
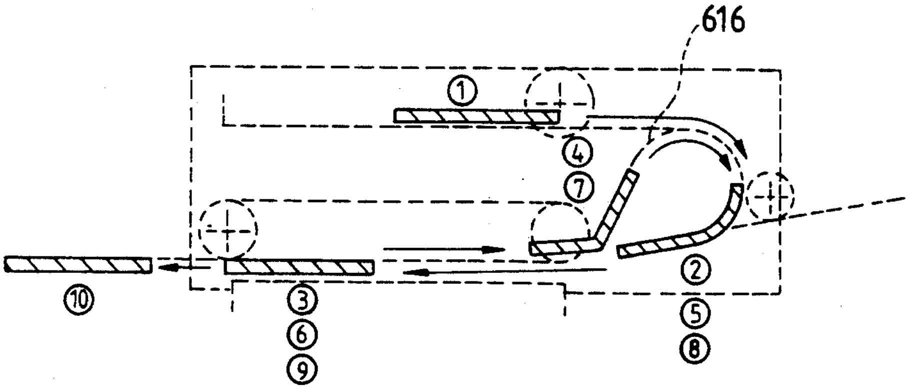

Next, the operation of DADF 1013 of the aforementioned arrangement will be described with reference to FIG. 21. FIG. 21(*a*) shows the platen mode in which document copy 601 is placed on the platen for exposure. FIG. 21(*b*) shows the simplex mode, in which document copies 601 are placed in document tray 602 in pile with the surface to be copied facing up. Pressing the start button causes first drive roller 605 and second drive roller 607 to rotate. Third drive roller 612 moves upwardly to be out of engagement with driven roller 613, while at the same time stop gate 615 descends to block horizontal delivery path 611. Thereby document copy 601 passes through arcuate delivery path 609 to be depressed against stop gate 615 (position 1 to position 2). At this position in stop gate 615, the document position is corrected by skew roller 627 so that the lead end of the document is perpendicular to horizontal delivery path 611, while at the same time the size of the document is detected by sensors $S_6$ to $S_{10}$. Then third drive roller 612 moves downwardly to abut driven roller 613, while stop gate 615 moves up to open horizontal delivery path 611. Third drive roller 612, belt drive roller 619, and fifth drive roller 622 rotate to deliver the document toward the required position on the platen for exposure with the surface thereof to be copied facing down. The document copy is then discharged. This operation also applies to a case where a single document is delivered through manual delivery path 610. In addition to a function in which the document is delivered one at a time, the simplex mode can deliver two document copies of the same size (2-up), deliver a large sized document (LDC) and, using a computer form feeder (CCF), delivery continuous paper for computers.

FIG. 21(*c*) shows the duplex mode, which is the same as the aforementioned process of FIG. 21(*b*) for point 1 to point 3. When exposure of one side of the paper is completed, belt drive roller 619 rotates in the reverse direction, the third roller moves upwardly out of engagement with driven roller 613, and stop gate 615 descends to block horizontal delivery path 611. Thus, the document paper is delivered to turning delivery path 616 and then is further driven by fourth drive roller 617 and second drive roller 607 to pass through arcuate delivery path 609 where it is pressed against stop gate 615 (point 4 to point 5). Then, third drive roller 612 moves downward into engagement with driven roller 613, while stop gate 615 moves up to open horizontal delivery path 611. Third drive roller 612, belt drive roller 619, and fifth drive roller 612 rotate to send the document paper for exposure toward the predetermined position on platen 1002 with the reverse surface of the document facing down. Upon completion of exposure of the both sides of the document copy, belt drive roller 619 again rotates in reverse direction to redeliver the document to turning delivery path 616. Thereafter, the document passes over platen 1002 and is discharged by fifth driven roller 622 in like manner (point 7 to point 10). Thus, the documents are stacked in layers, in the order initially in which they were tacked in document tray 602, with the surface copied first facing down.

(II-5) Sorter

Figure 22:
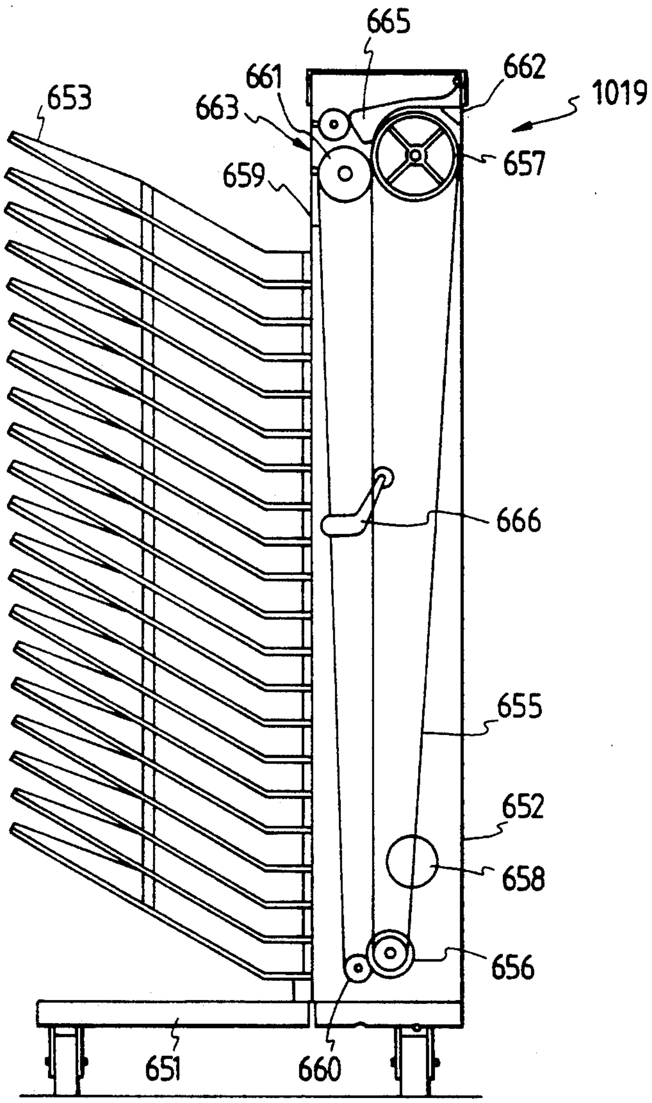
FIG. 22 is a side view of the sorter.

In FIG. 22, sorter 1019 have sorter main body 652 and twenty bins 653 on movable cargo 651. Within sorter main body 652 are provided belt drive roller 656 for driving delivery belt 655 and its driven roller 657, as well as chain drive sprocket 660 for driving chain 659 and its driven sprocket 661. Belt drive roller 656 and chain drive sprocket 660 are driven by sorter motor 658. Paper entrance 662, paper exit 663, and switching gate 665 driven by a solenoid (not shown) are provided above delivery belt 655. Also, chain 659 is provided with indexer 666 for feeding the copy paper to the respective bin.

Figure 23:
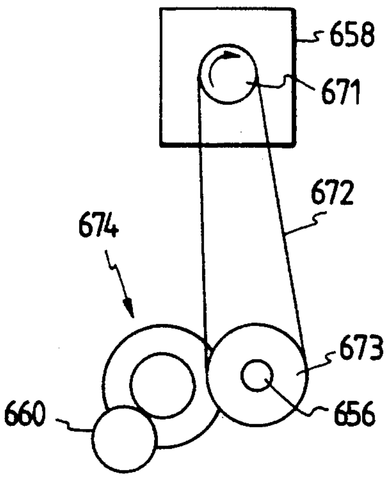
FIG. 23 is a diagram illustrating a drive system for the sorter.
Figure 24A:
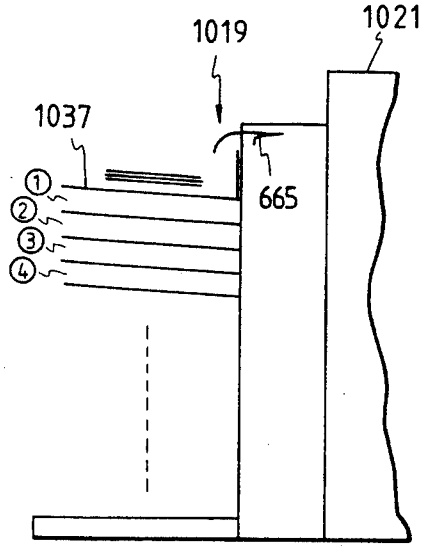
FIGS. 24(*a*)–(*d*) are diagrams illustrating the operation of the sorter.
Figure 24B:
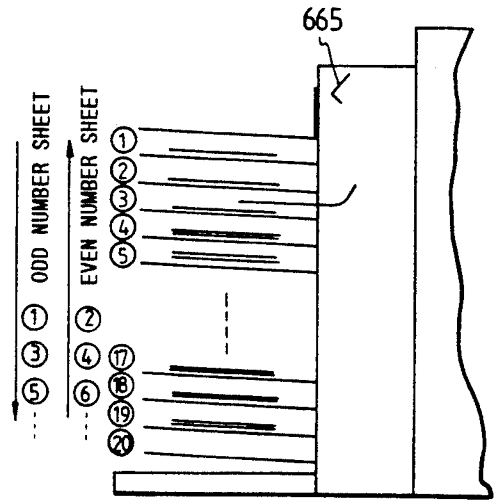
Figure 24C:
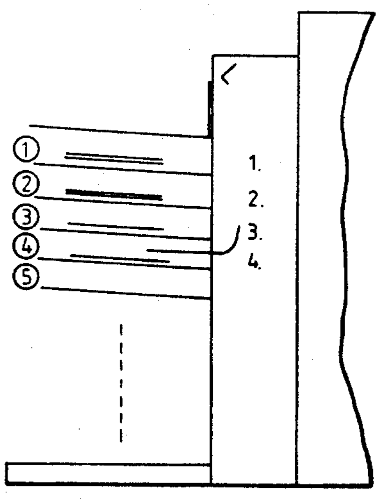
Figure 24D:
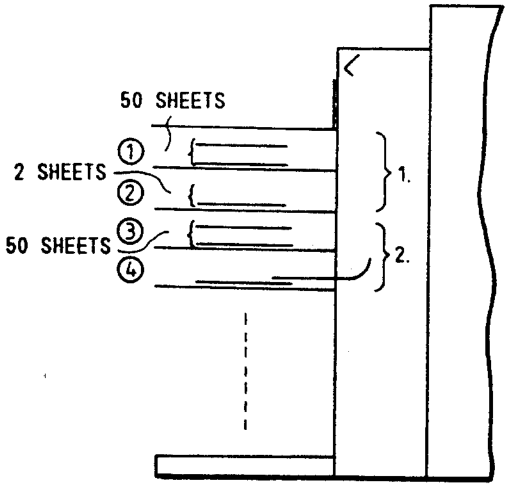

As shown in FIG. 23, rotation of drive shaft 671 of sorter motor 658 is transmitted to pulley 673 by means of timing belt 672. Rotation of pulley 673 is transmitted to belt drive roller 656 while also being transmitted to chain drive sprocket 660 through gear assembly 674.

The operation of the sorter will now be described with reference to FIG. 24. FIG. 24(*a*) shows a non-sort mode in which switching gate 665 is positioned at "non-sort" to deliver the copy paper to the uppermost take-up tray. FIG. 24(*b*) shows a sort mode in which switching gate 665 is shifted to "sort", wherein odd-number sheets are delivered to odd number trays in a downward direction and even number sheets are delivered to even number trays in an upward direction. Thus, the sorting time is decreased. FIGS. 24(*c*) and 24(*d*) illustrate a tack mode; FIG. 24(*c*) shows an example of four document copies and FIG. 24(*d*) shows a case where a maximum number of sheet per bin has been exceeded. For example, if a maximum number of 50 sheets is exceeded, the remainder will be contained in the next bin.

(III) User Interface (U/I)

(III-1) General Arrangement of the User Interface

Figure 25A:
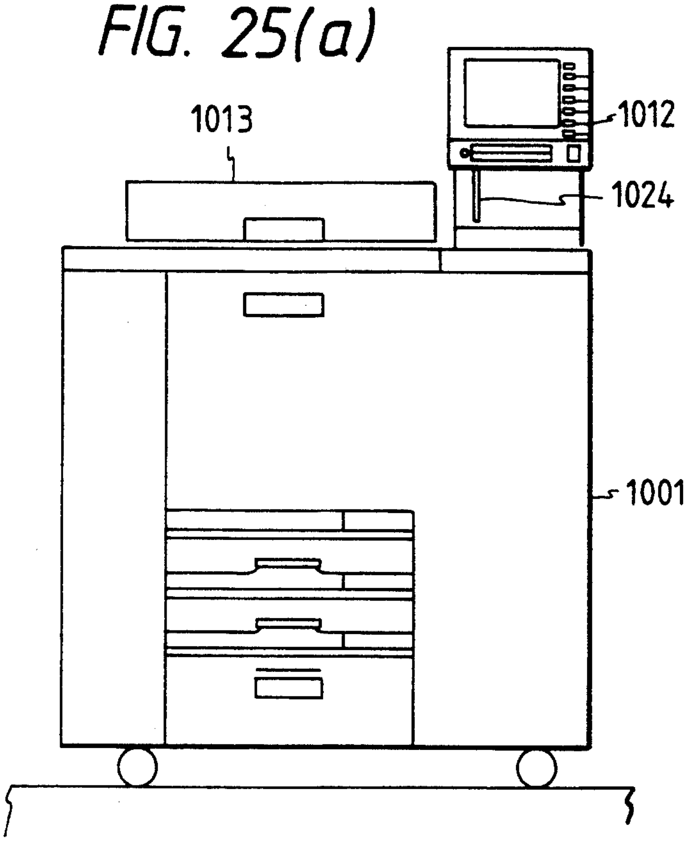
FIGS. 25(*a*), 25(*b*), and 25(*c*) are diagrams showing the user interface using the display, which is mounted on the apparatus.
Figure 25B:
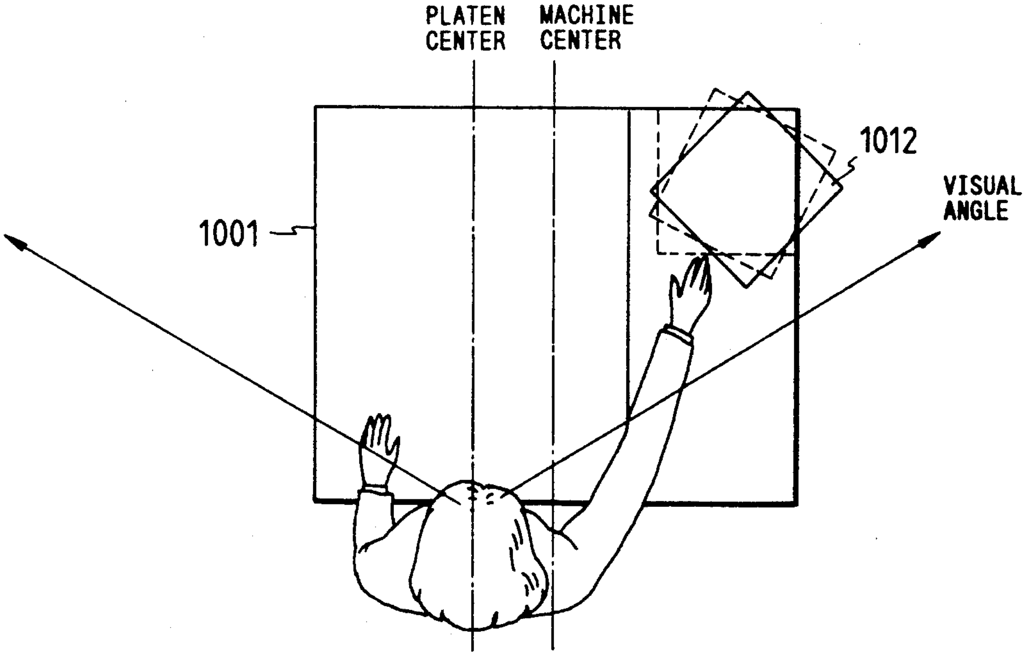
Figure 25C:
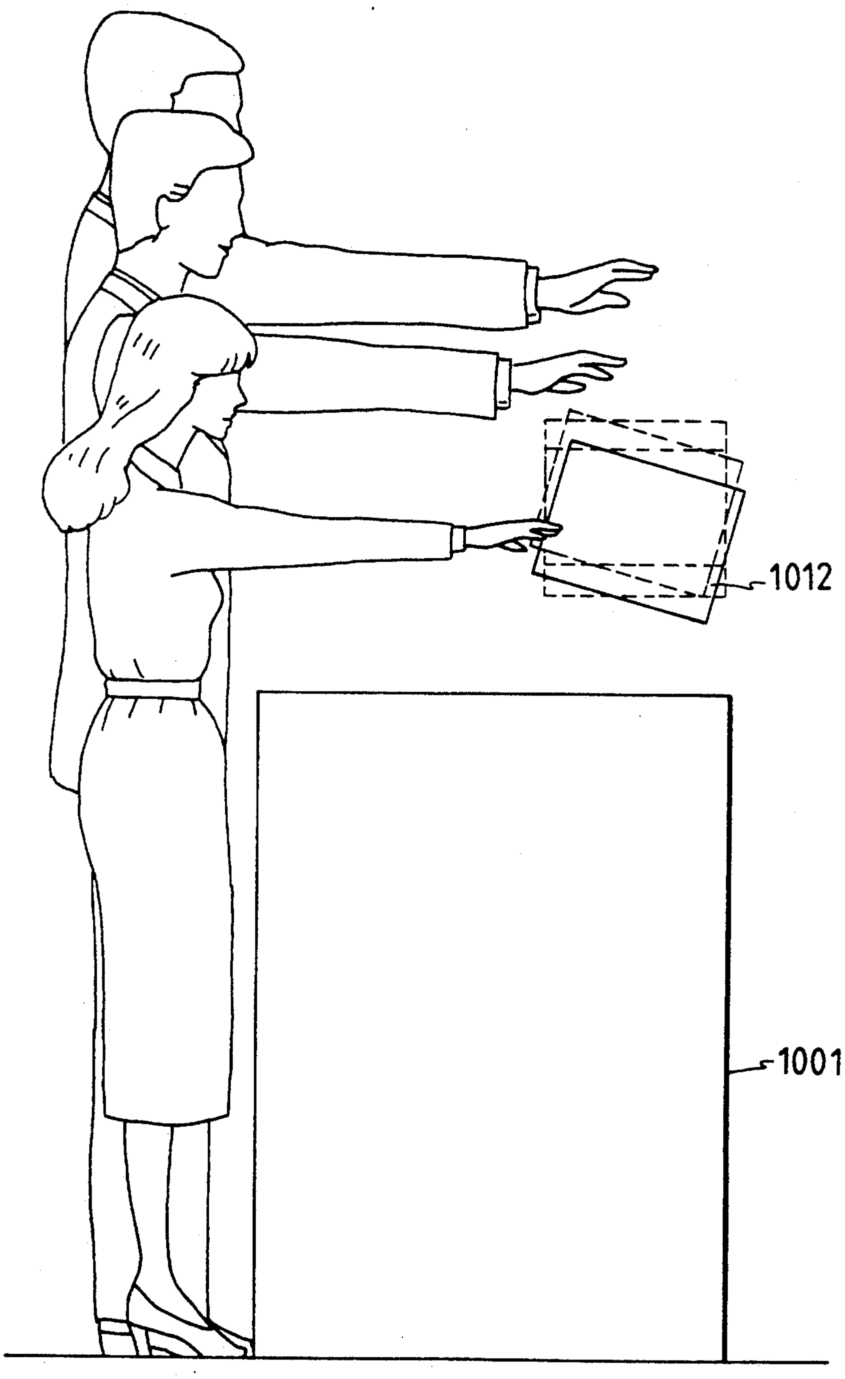
Figure 26:
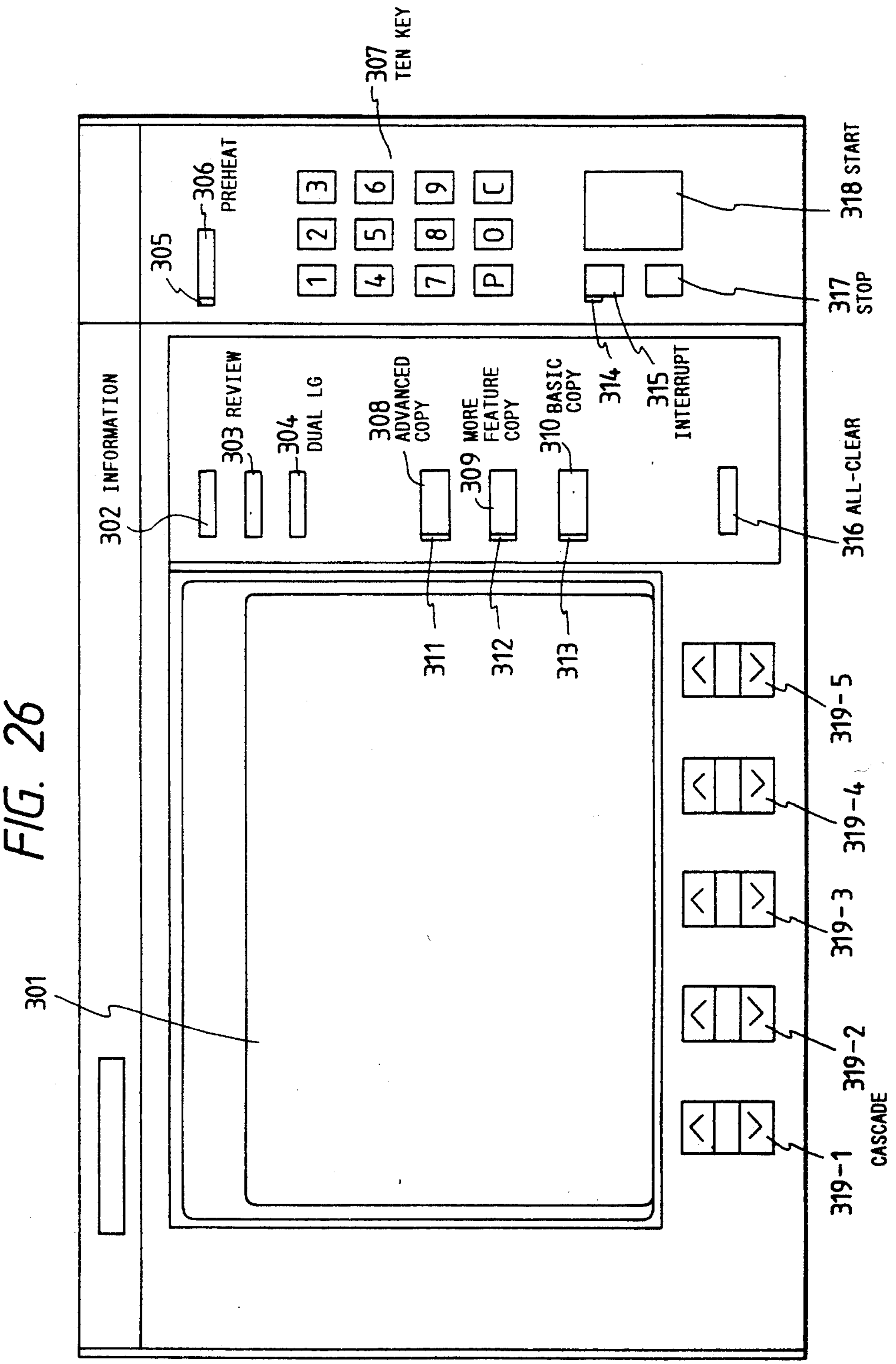
FIG. 26 is a diagram showing a front view of the user interface (U/I) using the display.

FIG. 25 illustrates a user interface employing a mounted display. FIG. 26 shows an overall view of the user interface employing a display.

(A) Features of the Mounting Location

The present invention does not employ the previously described conventional console panel as a user interface, but employs a stand type of display. Employing the display allows mounting of the display above duplicator main body (base machine) 1001 three dimensionally. Thus, in particular, user interface 1012 can be placed at the back corner on the right of duplicator main body 1001 as shown in FIG. 25(*b*). The duplicator can be compact in size without taking user interface 1012 into consideration.

In duplicators, the height of the platen or the height of the duplicator is designed to be as high as the waist of the operator for ease of setting of the document. This height requirement places limitations on the height of the duplicator. Conventionally, a console panel has been mounted on a surface level of the same height, and an operation unit and a display unit for selecting functions or setting execution conditions have been disposed at a distance considerably away from the operator's eyes. In contrast, user interface 1012 of the current invention is higher than the platen as shown in FIG. 25(*c*), or nearly as high as the level of the operator's eyes. Thus, that location is not lower than the operator, but in front of and to the right of the operator, allowing easy operation. In addition, mounting the level of interface 1012 close to the eye level permits effective use of space under the interface as a mounting space for control printed circuit boards of the user interface or card device 1024. Thus, structural alteration is not necessary to mount card device 1024 and card device 1024 can be mounted without changing the overall view of the system, while at the same time making the display easy to see. The display may be fixed at a a predetermined angle or may, of course, be adapted to vary the angle.

When a display is used in this manner, the display orientation thereof can be adjusted easily, unlike a conventional panel that is mounted two dimensionally at a location close to the operator. Thus the display picture may be directed upward and to the left, aimed at the operator's eye level as shown in FIGS. 25(*b*) and 25(C), i.e., centrally upward (toward the operator's eyes), thereby providing a user interface with good operability and visibility. Employment of such an arrangement permits the operator sitting at the middle of the duplicator to more easily perform setting of the document copy and operation of the user interface.

(B) Features of the Picture

An amount of information corresponding to multi-functions is necessarily large and requires a large display area. Thus, it is difficult to implement a compact panel in accordance with the compact size of the duplicator. A compact display causes not only a problem of display density, but also causes a difficulty in providing a picture for the operator to see and recognize easily.

Thus, when employing a compact display, the display should also be compact for a well-balanced design and the display control should be carefully arranged. In the present invention, a variety of techniques are used to achieve a compact but recognizable display. For example, the display can be formed from a wide variety of display material and can use a variety of display control methods other than the LED and liquid crystal display used in the console type panel.

For example, in the user interface according to the present invention, the display picture is switched in accordance with the respective modes such as the basic copy, the more feature copy, and advanced copy to display menus for operations such as function selection and execution conditions. The user interface also moves a cascade (cursor) on the picture through key operation for specifying selection and inputs execution conditions. Some selections of the menu may be displayed in a pop-up manner (with overlapping displays and display windows) to display more information than conventional interfaces. As a result, the display picture can still be neatly arranged for improved operability even if a large number of available functions and setting conditions are to be displayed. In addition, the interface can selectively display a review picture for displaying settings of all the aforementioned pictures, an information picture for illustrating functions, a full auto picture used when carrying out the standard copy mode, a diagnostic picture for initial machine setting and machine inspection and a jab picture for displaying location of the paper jams.

In this manner, the display of the invention incorporates division of information into multi-pictures, division of the respective picture area, adjustment of intensity, gray display, and other display techniques. Further, the operation keys and LEDs are carefully combined to simplify configuration of the operation unit, while at the same time diversifying and simplify in the control and content of the display and operation input, thereby implementing compactness and multifunctions of the duplicator.

The general appearance of a user interface using a CRT display with such a concept is illustrate in FIG. 26. In this example, the key/LED board is disposed below CRT display 301, at the front and to the right of CRT display 301. The selection mode picture is divided into a plurality of regions, one of which is used as a selection region. The selection region is divided vertically into cascade regions for selectively setting the respective functions. For this purpose, cascade keys 319-1 to 319-5 are provided on the key/LED board below the selection region of the vertically divided picture for selecting and setting the functions of a cascade. Mode selection keys 308 to 310 are provided for switching the selection mode pictures. Other keys (302 to 304, 306, 307, 315 to 318) and LEDs (305, 311 to 314) are positioned on the right side. In this way, the number of keys and LEDs is reduced and the keys and LEDs are positioned beside and below CRT display 301, respectively. Thus, the size of the duplicator need be only somewhat larger than CRT display 301, thereby providing a compact user interface.

(III-2) Arrangement of the Control System

Figure 27:
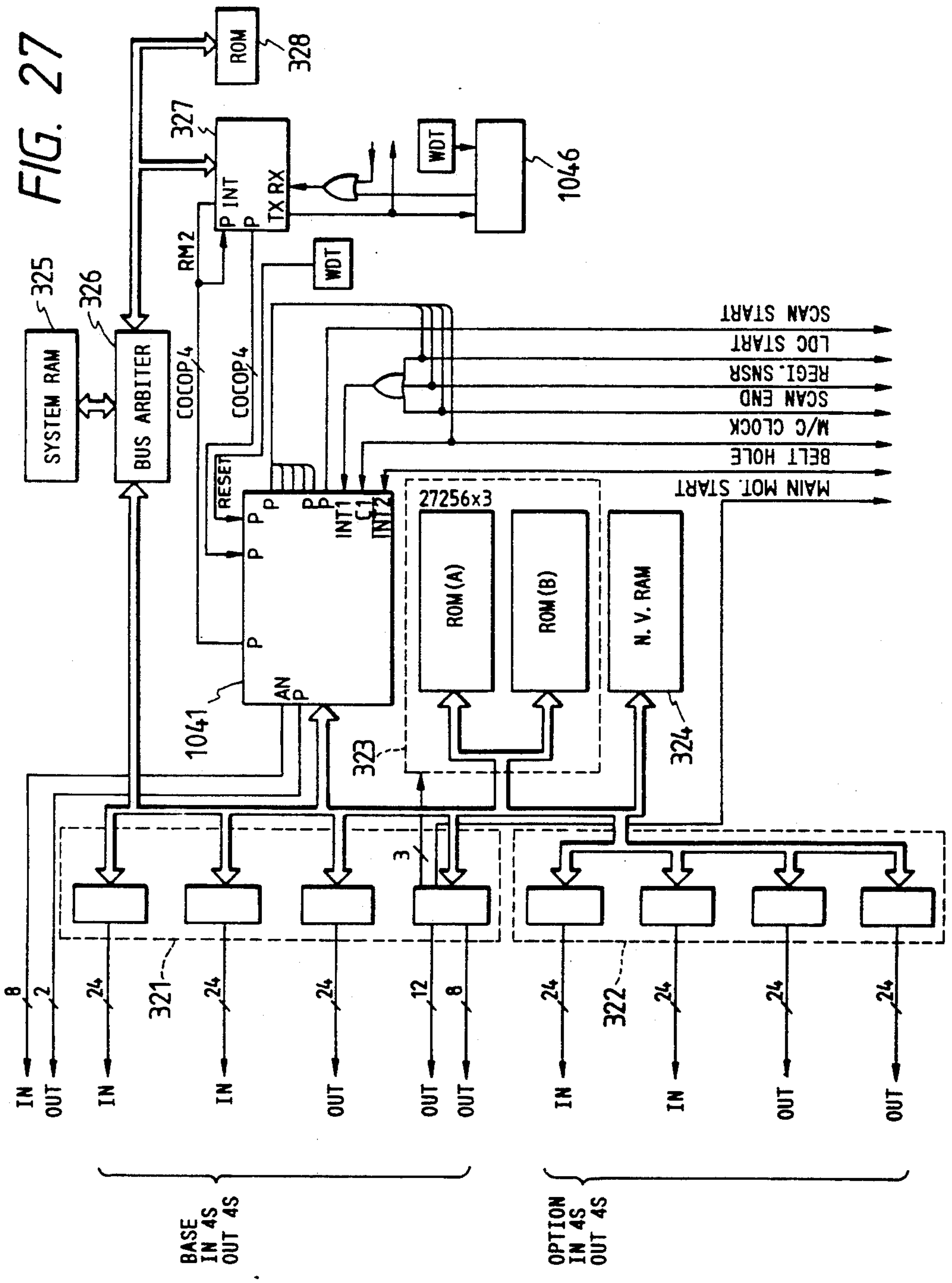
FIG. 27 is a diagram showing a main CPU connected with the U/I CPU through the serial communication.
Figure 28:
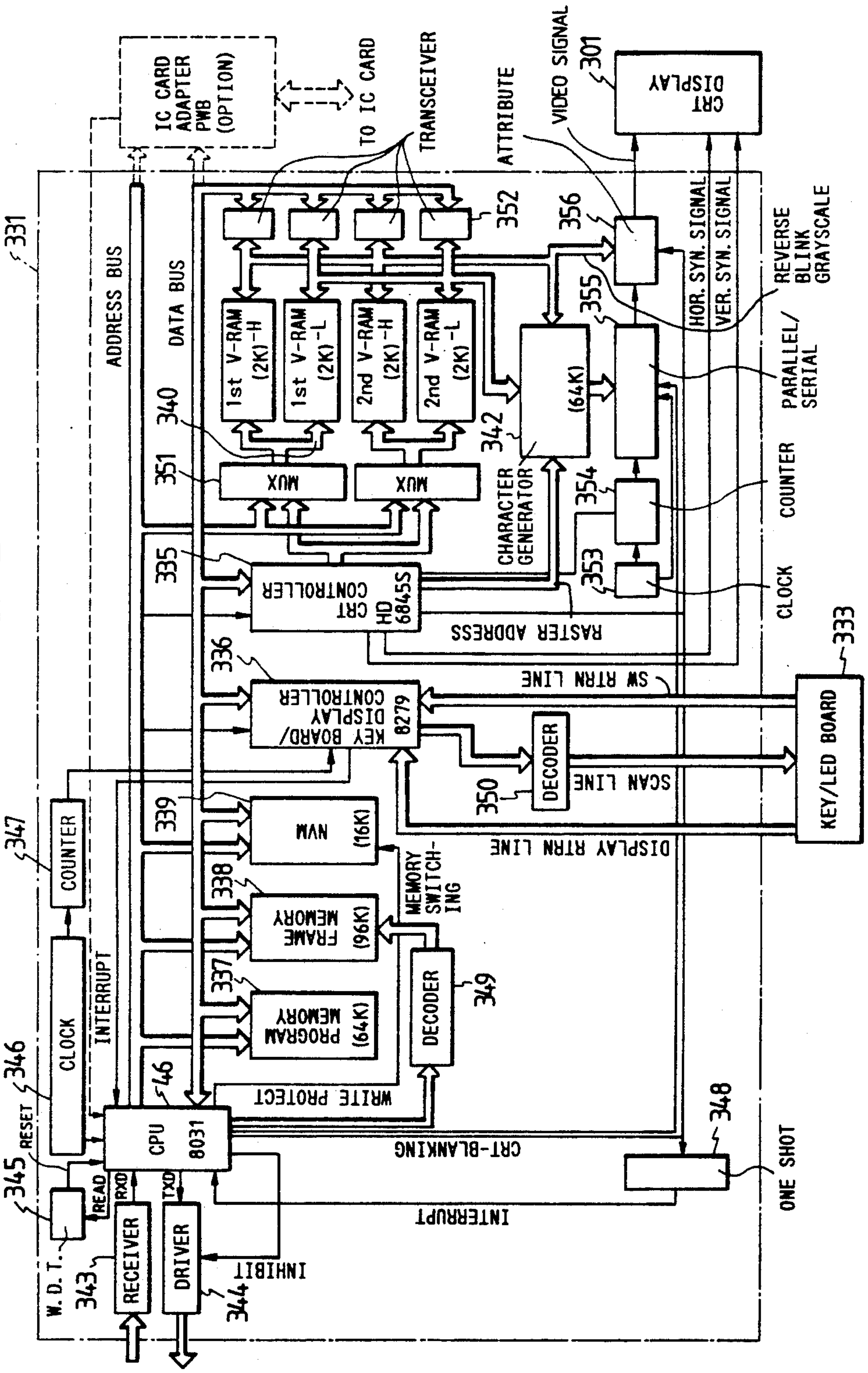
FIG. 28 is a diagram showing a hardware arrangement of the user interface.
Figure 29:
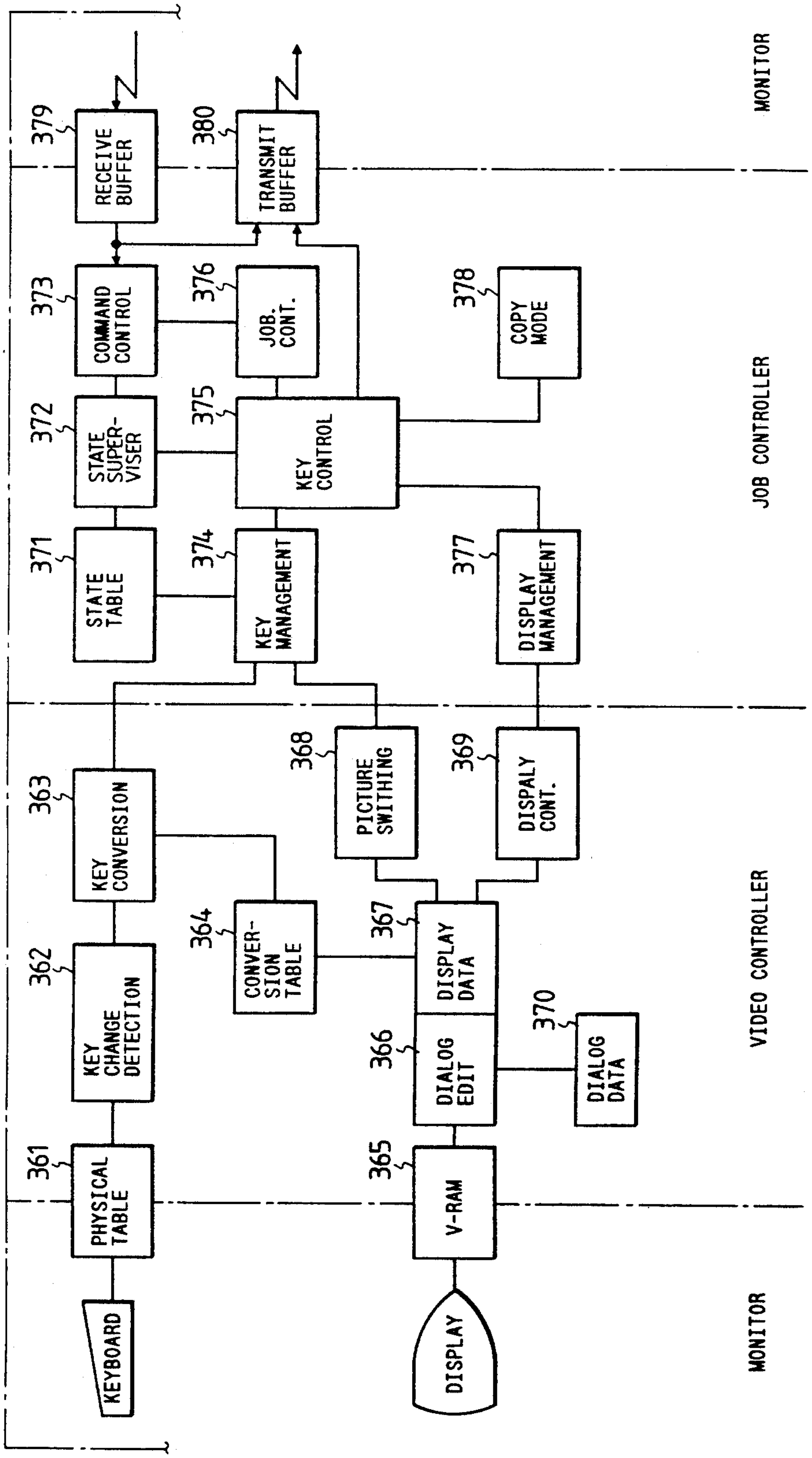
FIG. 29 is a diagram showing a software architecture of the user interface.

FIG. 27 shows a relation between the U/I CPU and the main CPU communicating with the U/I CPU through serial communication. FIG. 28 shows an arrangement of the hardware of the user interface. FIG. 29 shows a software arrangement of the user interface.

(A) Hardware Arrangement

Main CPU 1041 has, as shown in FIG. 27, ROM 323, NVRAM (non-volatile RAM) 324, interface 321 for transmitting and receiving data to and from the base machine, and interface 322 for transmitting and receiving the data between the base machine and the optional devices. A bus is connected with communication control circuit 327 through bus arbiter 326. The main CPU communicates with U/I CPU 1046 as well as with the other CPUs on the serial communication line through communication control circuit 327. ROM 323 stores a program including the respective subsystems, such as the previously mentioned sequence manager, the imaging module, and the copy handling module. Bus arbiter 326 has system RAM 325 which stores the data received from the other CPUs so that main CPU 1041 can transmit and receive the data asynchronously with serial communication timing. ROM 328 is for storing a communication program used for transmitting and receiving the data on the serial communication line with the aid of communication control circuit 327. All communication functions associated with bus arbiter 326 and communication control circuit 327 may be performed by main CPU 1041. The sequence manager subsystem in main CPU 1041 monitors states of the respective subsystems through the serial communication. When the subsystem of the sequence manager receives a copy mode signal from the user interface, it commands the respective subsystems in such a way that the copying operation can be carried out efficiently in a predetermined time.

Basically, the system of the user interface provided with U/I CPU 1046 includes CRT board 331, CRT display 301, and key/LED board 333. CRT board 331 is provided with U/I CPU 46 for generally controlling the overall system, CRT controller 335 for controlling CRT display 301, and keyboard/display controller 336 for controlling key/LED board 333. The user interface system is also provided with memory means comprising program memory (ROM) 337 for storing the aforementioned respective programs, frame memory (ROM) 338 for storing the frame data, RAM 339, part of which is formed as a non-volatile memory to store respective tables and display control data, etc. while also being used as work area, two sets of V-RAMs (video RAMS) 340, an character generator 342.

Data transmission and reception between main CPU 1041 and U/I CPU 1046 of CRT board 331 is effected on the serial communication line through driver 344 and receiver 343. A TXD signal is transmitted from CRT board 331 and an RXD signal is received by CRT board 331. Clock generator circuit 346 employs, for example, a crystal oscillator of 11.0592 MHz, which is divided by 12 down to a reference frequency of 0.9216 MHz in U/I CPU 1046. During communication by the CPU 1046, the reference frequency of 0.9216 MHz is divided by a number between 1 and 256 (programmable) in an internal timer to provide a transfer clock. Thus, the reference frequency of 0.9216 MHz is divided by ⅓ and then is further divided by 32 to obtain the transfer clock of 9600 Hz (transmission bit rate is 9600 BPS).

U/I CPU 1046 receives a state signal of the machine from main CPU 1041 and receives through keyboard-/display controller 336 the operation signals that are input from keyboard/display controller 336, thereby switching the picture to be displayed on CRT display 301, setting the copy mode, and producing messages to be displayed on CRT display 301. During processing of the operation signal input through key/LED board 333, when start key 318 is operated, the current copy mode is checked, and if there is no conflict, then that copy mode is sent to main CPU 1041. If a conflict exists, then a J code message is produced to, for example, display a message on CRT display 301. During preparation for display on CRT display 301, codes of the character generator are set in accordance with the display picture and the codes are written into V-RAM 340. Frame memory 338 stores information for setting the character generator. When the codes are written into V-RAM 340, the dot data of the character generator is read in synchronism with a raster address under control of CRT control 335 and the dot data is converted into serial data by parallel/serial conversion circuit 355 and displayed on CRT display 301.

Watch dog timer (W.D.T.) 345 checks for uncontrolled running of U/I CPU 1046 and is reset when U/I CPU 1046 reads a particular address, for example, any one of the data area 7000 to 77FF. The program is arranged so that these particular addresses are normally read within a period of 150 ms. Thus, if U/I CPU 1046 runs away, then the particular addresses are not read even after 150 ms has passed, and watch dog timer 345 is not reset. When this occurs, procedures in accordance with runaway of U/I CPU 1046 are carried out.

Keyboard/display controller 336 receives a clock of 2.7648 MHz, which is obtained by dividing the output of clock generator 346, from which U/I CPU 1046 is supplied clocks, by 4. Keyboard/display controller 336 divides the input signal by 27 by a prescaler to obtain a 102 KHz signal, which provides a key/LED scan time of 4.98 ms.

If the scan time is too long, all input signals will not be detected. Therefore, the data may not be read in properly if the operator's key operation time is too short. Conversely, if the scan time is too short, the CPU operations will occur too frequently, causing lower throughput. Thus, an optimum scan time should be selected after taking these factors into account.

(B) Software Arrangement

A software arrangement of the user interface includes a monitor having functions such as I/O management, task management, and communication protocol; a video controller having functions such as key input management and picture output management; and a job controller having functions such as selection decision and mode decision. When performing a required number of copying operations, all the procedures from the beginning of the operation to the completion of a required number of copy sheets is defined to be one complete job. In this manner, by arranging the software in a modular form and by allocating picture control and conversion of key inputs to the video controller, the job controller may be designed without regard to the display devices and the keyboard. Therefore, when the display is to be replaced by a console panel, for example, the job controller may be left intact and only the video controller need be modified in accordance with the console panel.

To this end, the video controller need only transfer a logic key to the job controller and to reflect interface commands received from the job controller to the display devices and the keyboard.

It is the logic keys and the interface commands that enable the modular division of the software. Because it controls the video controller with interface commands, the job controller can manage the jobs without concern for details of picture display, thereby simplifying software architecture. Thus, as for key input, physical information of the keys is processed by the video controller and the mode indicated by the keys is recognized by the job controller for checking the key accept conditions to control the job. The job controller issues the interface commands to the video controller on the basis of machine state and selection mode information, and the video controller in turn executes the commands to edit and draw the picture. Key-change detector unit 362 and other blocks for processing, producing, and controlling the other data, which are described later, have been shown on a predetermined program basis (module). These structural bases are grouped only for convenience of illustration, some are further formed of a plurality of modules.

i) Video Control

Key-change detector 362 checks for double key operation and continuous key pressing with the aid of physical key table 361 and with respect to the physical key information received from a monitor. Key converter 363 converts the physical key thus detected and currently being pressed into a logic key (logic information), and requests that the job controller check and acknowledge condition of that key (current key). Conversion table 364 is referred to by key converter 363 when converting the physical key into the logic key. For example, a cascade key is a physical key, but has different logic information depending upon the pictures. Therefore, conversion from the physical-key into logic-key is controlled on the basis of the display picture information of display control data 367.

Picture switching unit 368 receives the key acknowledge signal and the logic key from the job controller, or receives the logic key directly from key converter 363 in the video controller. The logic key, in turn, calls the basic-copy picture and the more feature copy picture. Alternately, the logic key may renew the display picture number to the corresponding picture number of display control data 367 when the logic key is the only picture-selecting key for which moving the cascade (cursor) permits development of the pop-up picture when no mode renewal or state renewal functions are present. For this purpose, picture switching unit 368 store the logic key for developing the pop-up picture to renew display control data 367 so that the pop-up picture is developed if another key is not input within 750 ms after that logic key is pressed. This process prevents the pop-up picture from being developed at every time a function to develop the pop-up picture is temporarily selected in the course of making a desired selection. Thus even though it is actually a logic key for developing the pop-up picture, the pop-up logic key input is ignored if another key is input within 750 ms after the pop-up logic key has been input. In the cases of renewal of state due to jamming occurrences, renewal of copy mode such as cascade movement, and renewal of message and counts, display control unit 369 receives the interface command from the job controller and analyzes the command to renew display control data 367.

Display control data 367 controls factors of the display of respective pictures, such as picture number to be displayed and information on display variables in the picture. Dialogue data 370 is a data base of a hierarchical structure having basic frames of the respective pictures, the display data of the frame, and the reference address of variables data of the display data (addresses in display control data 367 in which information on display variables are stored). Dialogue edit unit 366 reads the basic frame of the picture to be displayed and the display data from dialogue data 370 on the basis of the information on the display variables stored in display control data 367. Dialogue edit unit 366 edits the picture to draw and develop the display picture on V-RAM 365.

ii) Job controller

Key management unit 374 interrogates state table 371 to confirm whether or not the logic key can be accepted and, if the logic key is acceptable, key management unit 374 confirms the key logic providing that the other key information is not input within 750 ms thereafter. Key management unit 374 then sends the logic key to key control unit 375. Key control unit 375 receives and processes the logic key to renew the copy mode, to check the mode, and to output the copy-execution command. Key control unit 375 knows the machine state to transfer the display control information to display management 377, thereby performing display control. Copy mode 378 is set for the respective cop setting information of the basic copy, the more feature copy, and advanced feature copy. Display management unit 377 provides the interface command, on the basis of a result from key control unit 375, to the video controller to activate the interface routine (display control unit 369). State management unit 372 determines state changes on the basis of the key acceptance, occurrence of jamming or failure, and open condition of an interlock and renews state table 371 for accepting key input. Whether the key is accepted is then determined from the current state of the system. Job control unit 376 receives the machine operation information and provides a command for machine control after the start key is operated, thereby managing execution of the copy operation of individual documents.

Command control unit 378 informs state management unit 372 and job control unit 376 of the command state received from the main body while also, during execution of a job, receiving the command for execution of the job from job control unit 376 and transmitting them to the main body.

Therefore, when the start key is operated, key control unit 375 sets the command corresponding to the copy mode to transmission buffer 380 to carry out the copy operation. The commands indicative of the machine state are received successively by receive buffer 379 and transferred to job control unit 376. A next command is output, causing the machine to execute the copy operation every time each sheet of copy is completed, until a machine stop command is output at the end of required number of sheets of copy work. During this copy operation, if a command indicative of occurrence of jamming is received, state management unit 372 recognizes the jamming state through command control unit 373 and renews state table 371 while also causing display management unit 372 to provide the video controller through key control unit 375 with the interface command for controlling the jam picture control.

iii) Interface command

Because the job controller outputs the interface command to control the video controller, the job controller may be designed independently from the video controller, thereby allowing the display to be readily converted into the console panel or into other input/output means by suitably modifying the video controller. The interface command has registered commands with respect to the tray, e.g., tray number, paper size, and orientation of the tray, and commands with respect to the optional devices, e.g., model names, presence/absence, and commands with respect to second development, e.g., presence/absence and color. The interface command also has normal setting commands with respect to cascade, setting the number of sheets, binding margin and the like. The edit setting commands include a box display and coordinate display, etc. and the job setting commands include call numerics and registered numerics. The display commands include the normal message, state indication, mode indication, toner remainder indication, recovered toner indication, and no-paper indication. The mode command includes jam, jam clear, information change, preheat, interrupt, recovery, and changes. Further, there are display control commands, machine state commands, initialize commands, and diag-commands etc. Display control unit 369 in the video controller analyzes these commands to perform renewals of display control data 367. For example, the registered commands effect initial setting of the respective pictures. The normal setting command performs display of set state of the cascade and erasure of an unnecessary cascade in the normal setting picture, and also performs display of binding margin. The mode conversion command performs display of the respective mode picture and ON/OFF of the LED (not shown). In the manner described above, the operation of the cascade key goes up one rank if the key may be acceptable when the cascade key shifts from ON to OFF, when the same cascade key remains pressed subsequently for 750 ms, and when the same cascade key remains pressed subsequently for a further 125 ms. Then, if the rank is not ready for receiving the mode, the operation of the cascade key skips one rank to select the next key. Logic codes corresponding to cascades that have gone up are transferred as a key acceptance to the job controller and are fed back as a display data from the job controller to the video controller.

(C) Summary of Processing by User Interface

An example of processing in accordance with the operation by the operator and the machine state will now be described.

First, the power supply is switched on for initialization. Next, state table 371 causes key management unit 374 to provide picture switching unit 368 with an instruction for an initial picture providing that there is no key input in the initial state. In response to this instruction, picture switching unit 368 in the video controller sets the display picture of display control data 367 to the initial picture.

In display control data 367, if the initial picture has been set to the basic copy picture, dialogue edit unit 366 reads the frame of the basic copy from dialogue data 370. Because the frame shows the address in display control data 367 on a region basis, dialogue edit unit 366 reads display control data 367 in accordance with these addresses for editing to draw the basic copy picture on V-RAM 365. At the same time, the LED indicative of the basic copy is activated. Here, when the mode selection key of the more feature copy or advanced copy is pressed, key management unit 374 interrogates the key acceptance condition to provide an instruction representative of the picture corresponding to picture switching unit 368 in a similar manner. If the initial picture in display control data 367 has been set to full auto picture, then the full auto picture will be drawn. This full auto picture setting is effected in the diagnostic mode.

Once these pictures are displayed, when an operator operates the cascade key to renew physical key table 361, key change detector 362 detects the renewal, which in turn will be converted into a logic key by key conversion unit 363. The cascade key is converted into different logic keys depending on the current pictures. Therefore, the referenced position in conversion table 364 is controlled on the basis of the picture information from display control data 367, thereby effecting the conversion into the logic key. For example, in FIG. 26, when cascade key 319-3 is pressed, the cascade key is converted into a logic key indicative of the duplex copy cascade if the picture is for the basic copy operation. In contrast, the cascade key is converted into a logic key indicative of the color cascade if the picture is for the more feature copy operation.

Key management unit 374 decides whether or not the cascade key from state table 371 can be received, and allows reception of the key as a cascade key in the selection mode picture. The key will be sent to key control unit 375, and from there to state management unit 372. Key control unit 375 renews copy mode 378 on the basis of the key and also transfers the display information of the cascade to display management unit 377. Display management unit 377 produces the interface command and outputs it to the display control unit 369. Display control unit 369 renews the cascade setting information in display control data 367 in response to the interface command. As previously mentioned, the content of cascade setting information is reflected on the picture with the aid of dialogue edit unit 366. In this manner, the respective selection modes are switched. When the respective cascades are set and settings thereof are displayed on the display, copy mode 378 and state table 371 of the job controller are renewed.

Then, when the start key is operated, key control unit 375 checks copy mode 378 to output the copy execution command. The copy execution command is outputted by setting transmitter buffer 380. The copy execution command is transmitted to the main CPU by the monitor through the serial communication line. If mode setting conflicts with the copy execution command, then display management unit 377 produces and outputs the interface command for display control, thereby controlling the message.

Upon output of the copy execution command, job control unit 376 manages the copy operation for every sheet of copy. For example, when receiver buffer 379 receives the machine state commands in succession after initiation of the copy operation by the machine, command control unit 373 analyzes the received commands to inform state management unit 372 and job control unit 376. Job control unit 376 receives the machine state command and outputs the commands necessary for machine operation for every copy until a required number of copy sheets is completed. The machine state command is sent to transmitter buffer 380 via command control unit 373. In the meantime, state management unit 372 renews state table 371 in accordance with this machine state command. Thus, in this state, key management unit 374 will not permit acceptance of the mode selection key, cascade key, or other keys.

If jamming occurs and a jam occurrence command is received from the machine while the copy operation is in progress, then the information about the jam is transferred both to state management unit 372 and to job control unit 376 via the command control unit 373. As a result, state table 371 is reset to "an occurrence state" to half the copy job. Key control unit 375 locates the location of the jamming and transfers the location to display management unit 377, thereby producing, for example, on a mode basis, an interface command formed of jam handling codes to which are added parameters indicative of the jam zone. Display control unit 369 processes this interface command to substitute display control data 367 for the content of the jam picture display, thereby decreasing precedence of the current picture by one rank and displaying thereover the jam picture indicative of the jam zone.

Key control unit 375 recognizes the remaining amount of toner, the state of the toner-recovery bottle, when the duplicator is out of paper, and the opening of interlock from the machine state command, thereby controlling the message region, maintenance information region, and count unit, etc. through display control unit 377.

An all-clear key is pressed at the same time the power is switched on to enter the diagnostic mode. This mode, too, is recognized by key control unit 375 through key management unit 374. The diagnostic command is output through display management unit 377 to control the diagnostic picture. The diagnostic mode permits registration and setting at a particular region in display control data 367 not permitted by normal modes. One such setting indicates whether the full auto picture should be displayed or not.

(III-3) Selection Control

Figure 30:
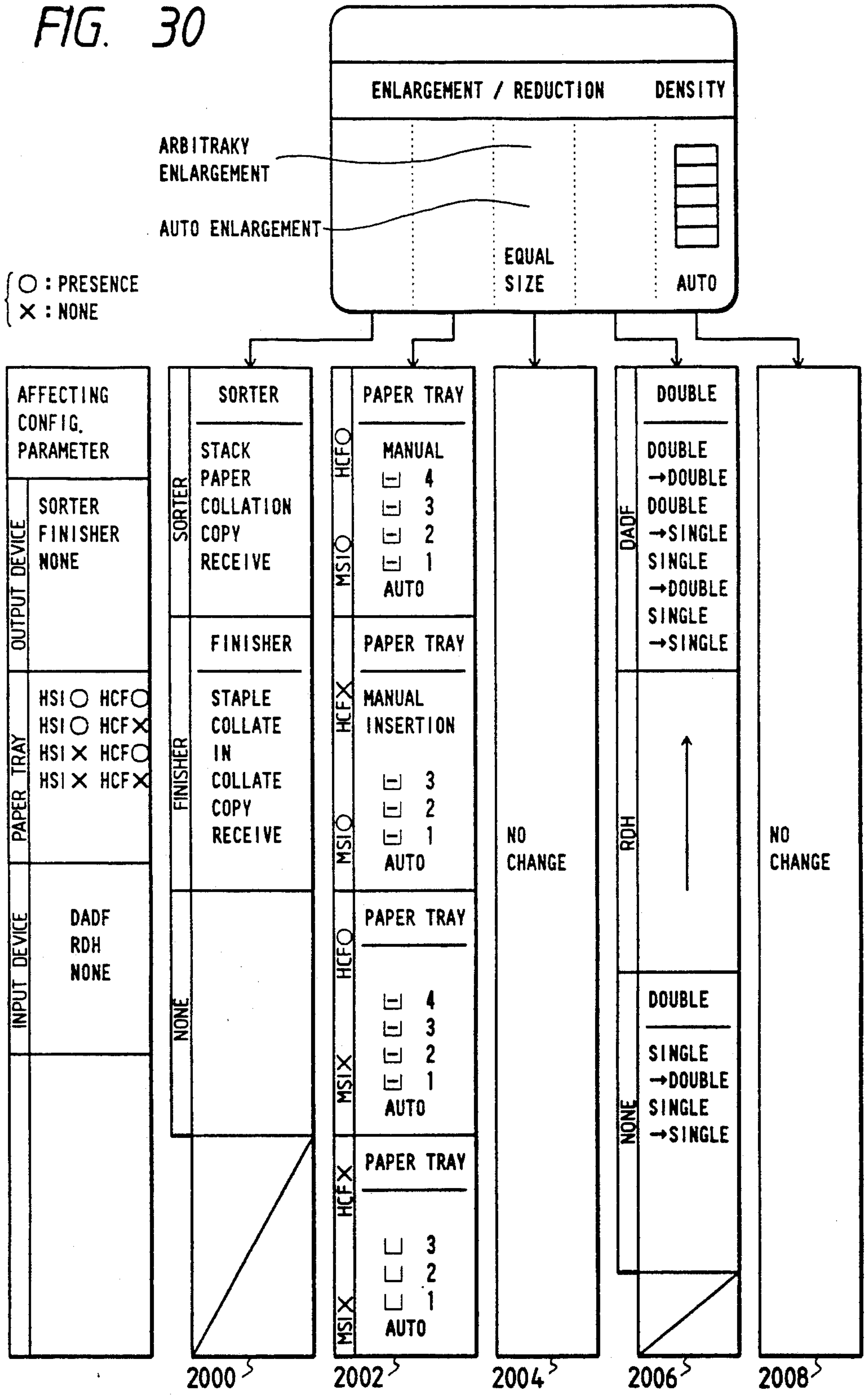
FIG. 30 is a diagram illustrating the relation between the optional devices and the functions.
Figure 31A:
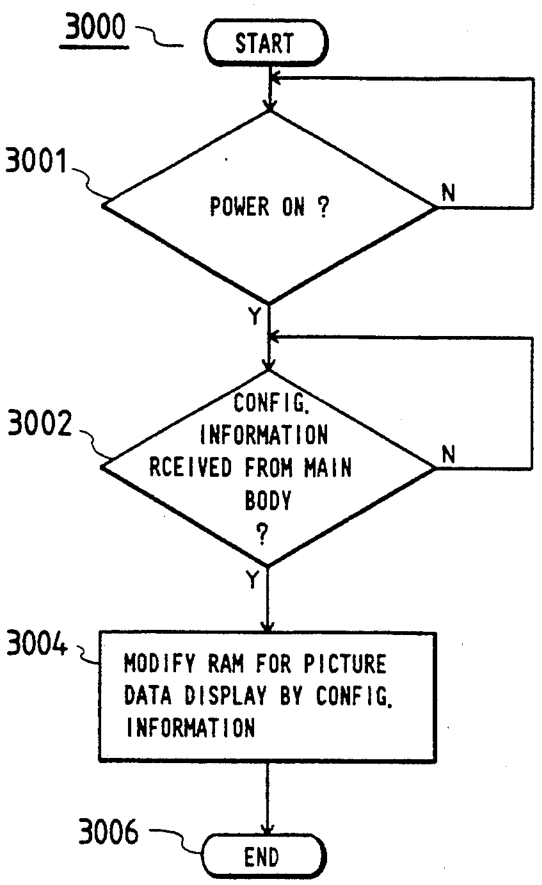
FIGS. 31(*a*), 31(*b*), 31(*c*), and 31(*d*) are flow charts illustrating an example of a process flow of the selection control.
Figure 31B:
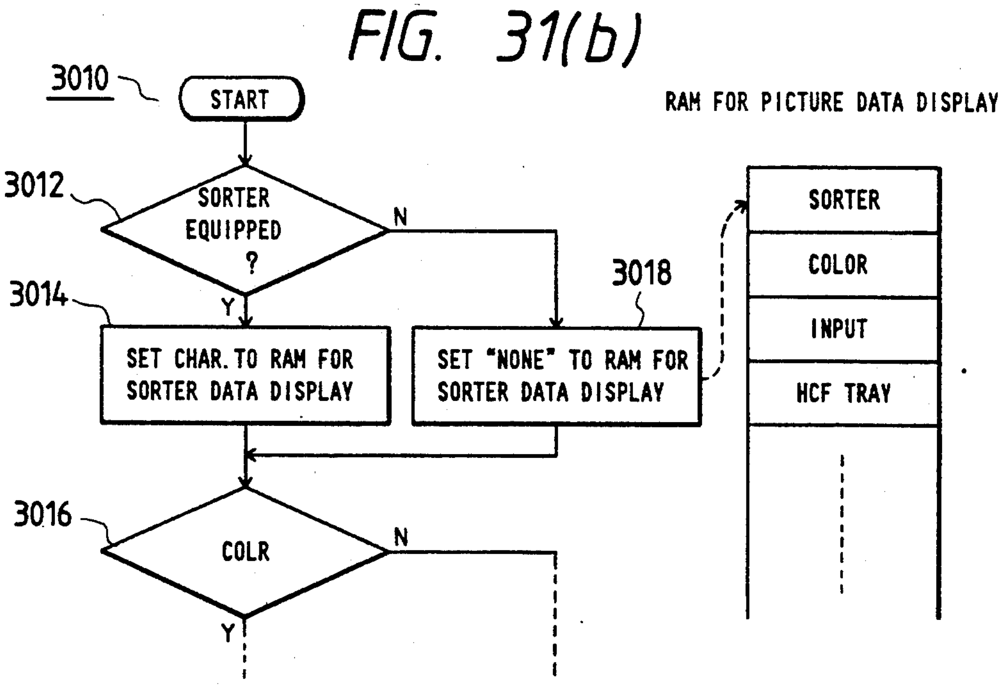
Figure 31C:
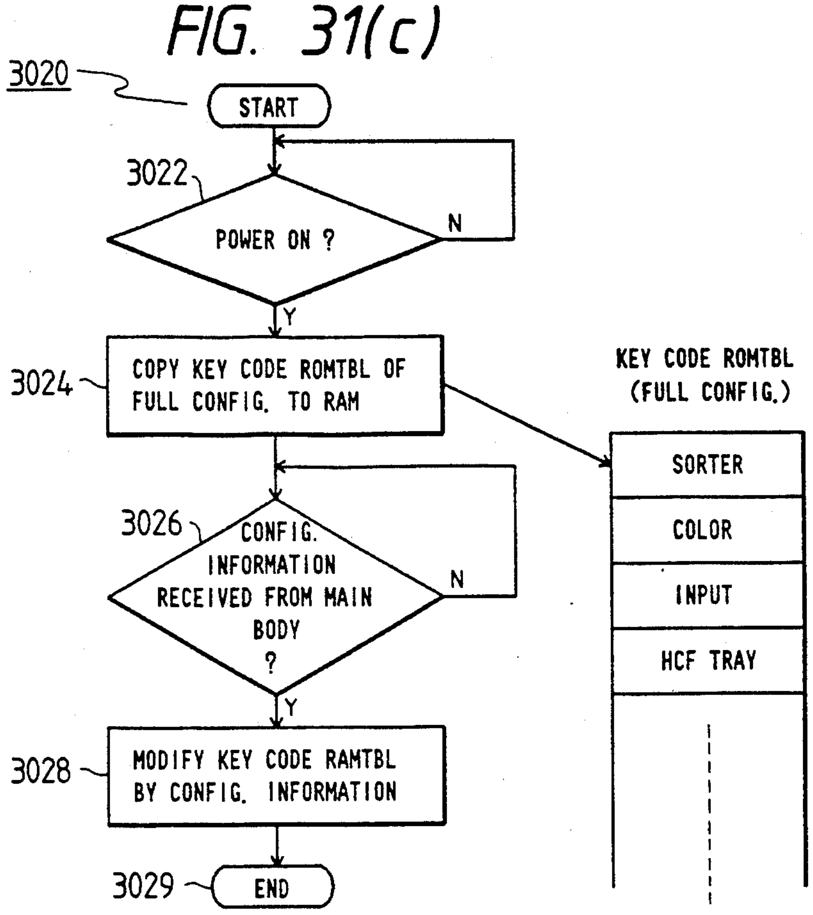
Figure 31D:
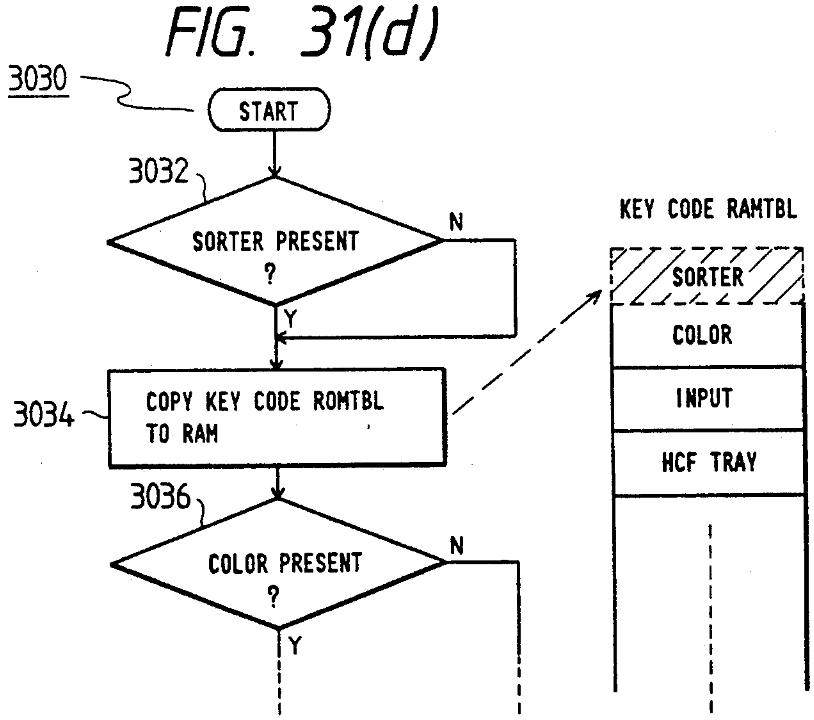
Figure 32A:
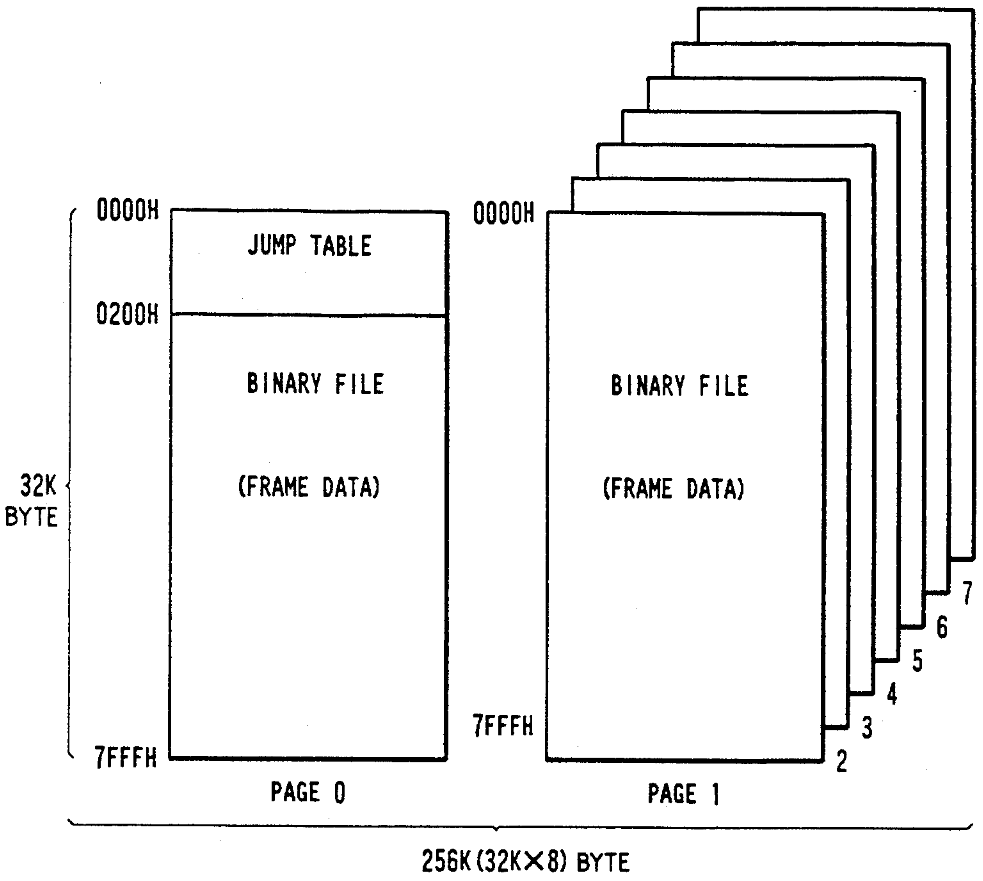
FIGS. 32(*a* ) through 32(*m*) are diagrams showing arrangements of the picture data.
Figure 32B:
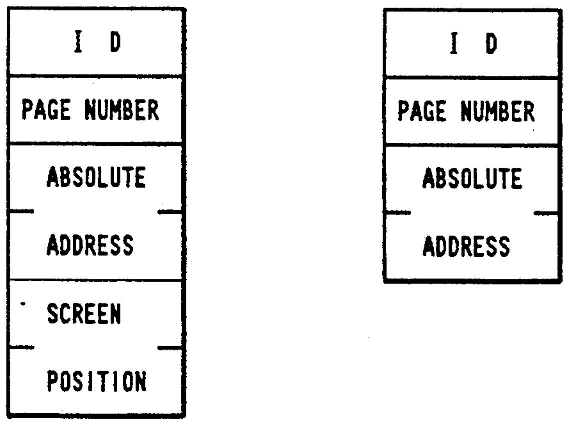
Figure 32C:
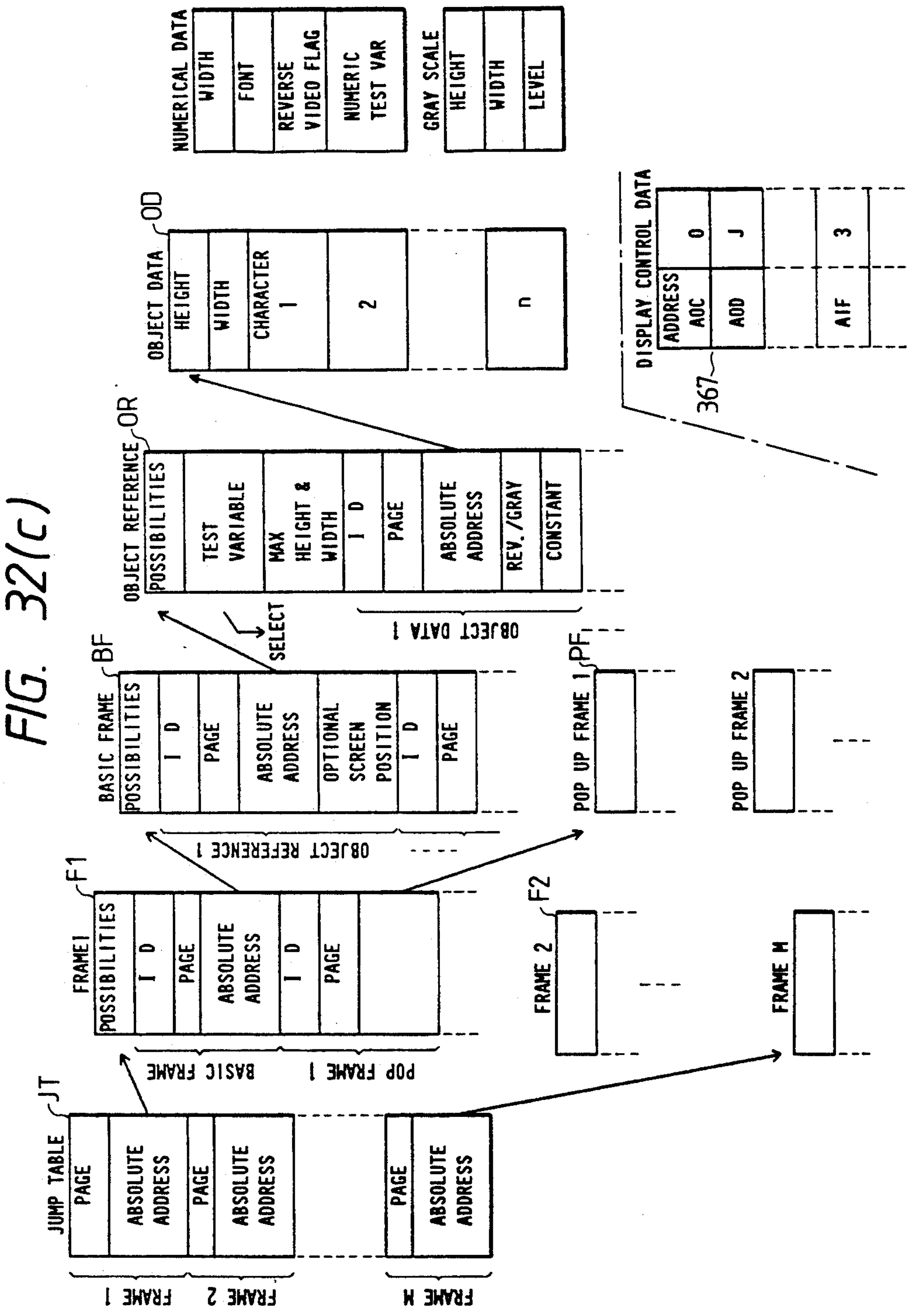
Figure 32D:
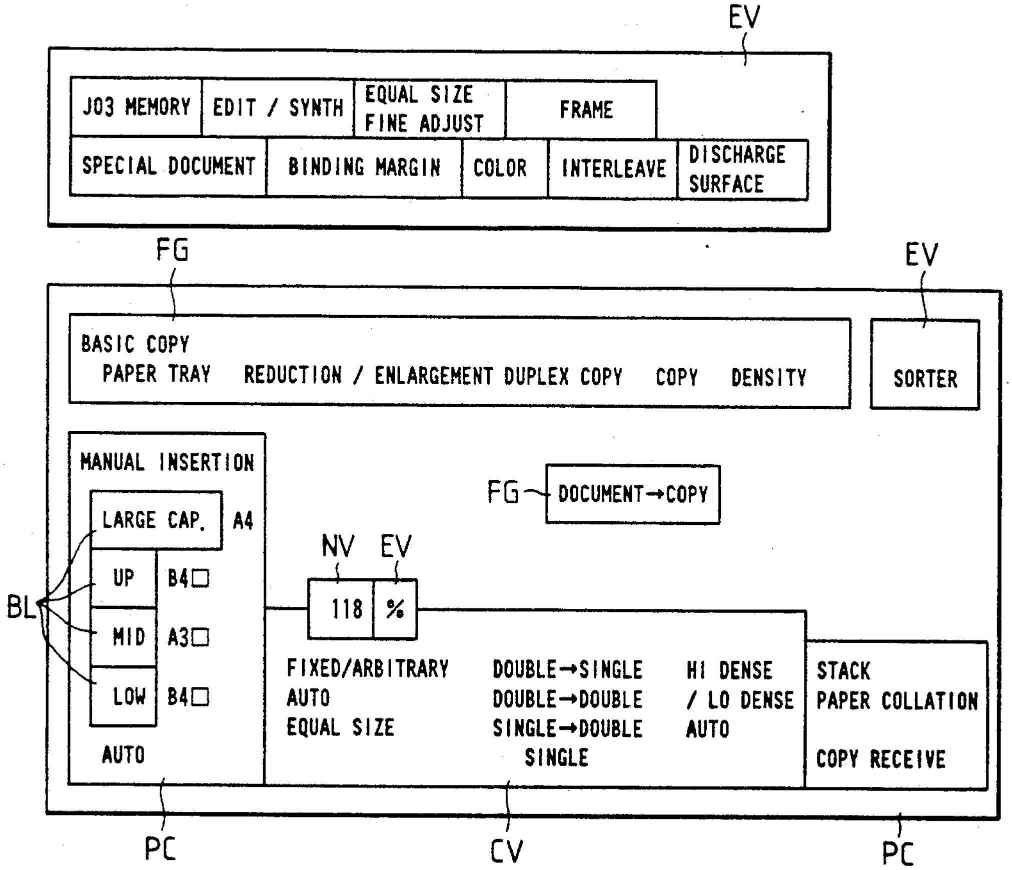
Figure 32E:
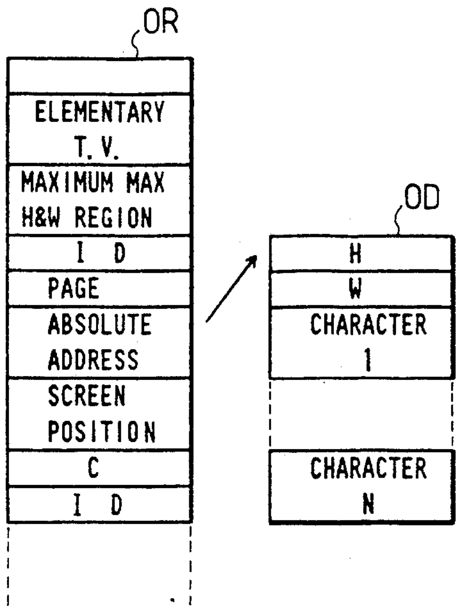
Figure 32F:
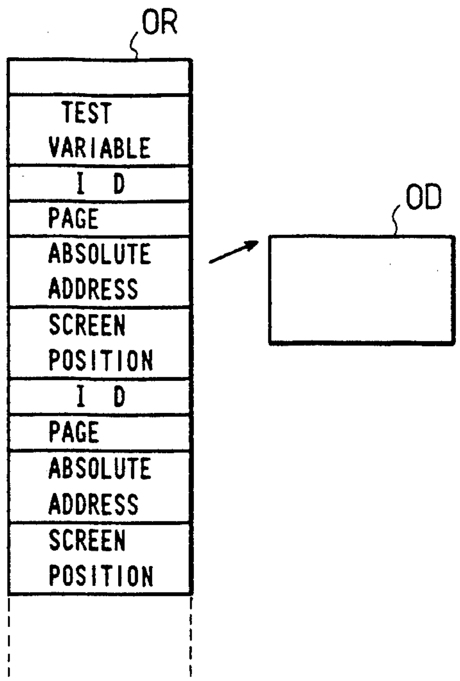
Figure 32G:
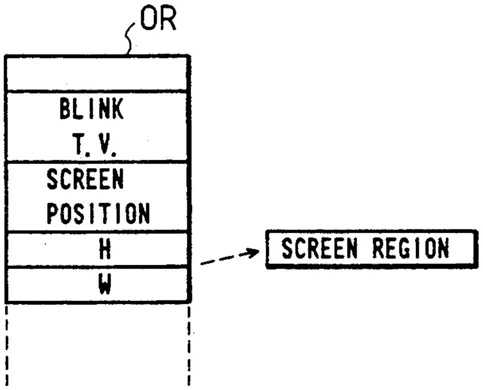
Figure 32H:
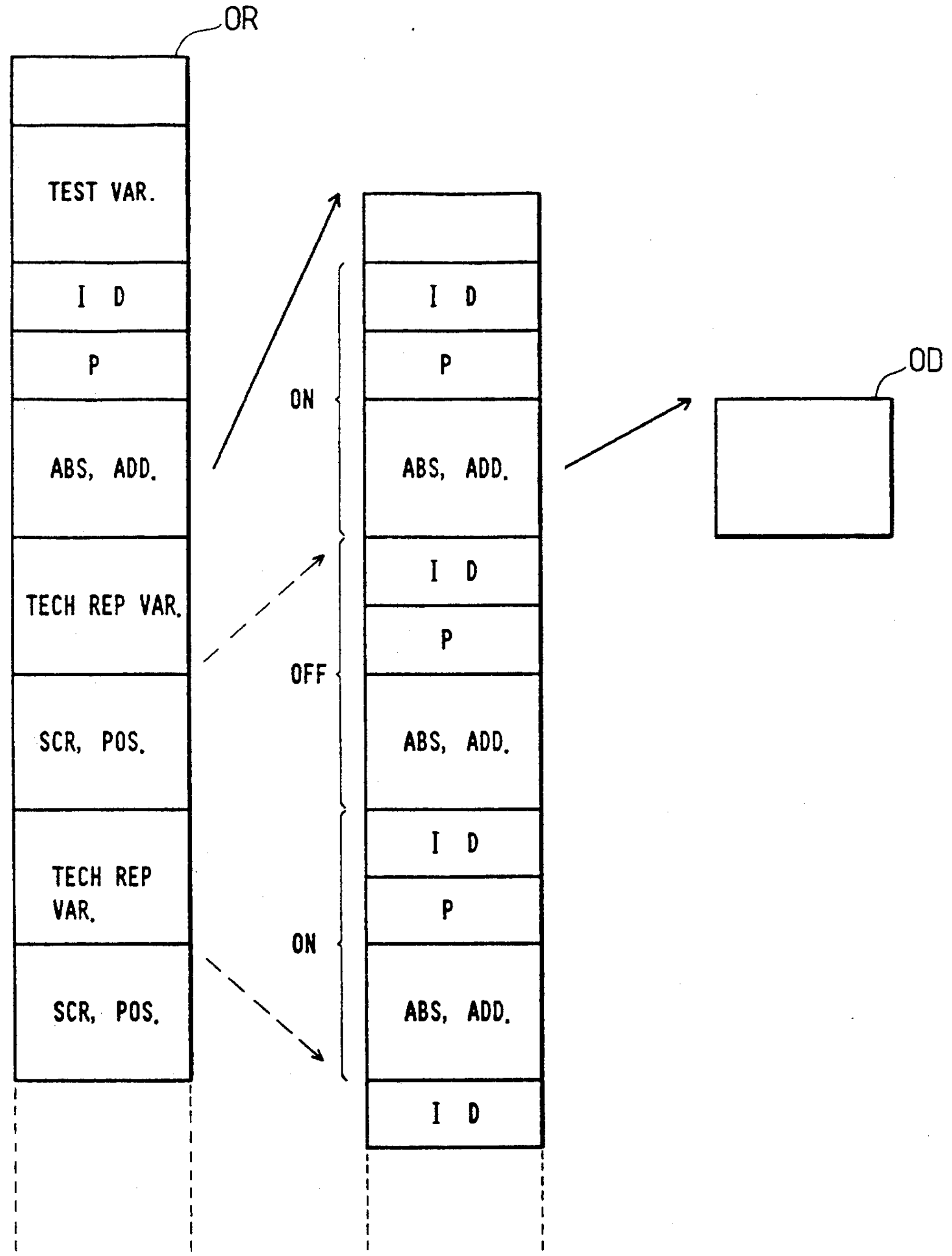

FIG. 30 is a diagram illustrating the relation between the optional devices and the functions thereof and FIG. 31 is a diagram showing a process flowchart of selection control.

As previously mentioned, a duplicator according to the present invention can be equipped with a wide variety of optional devices. For example, if the picture is left as it is when an invalid cascade is indicated, the operator may possibly select a mode mistakenly. In the meantime, there are a wide variety of combinations, such as an output device, an input device, and paper trays to name only a few. The output device may or may not have a sorter and a finisher, the paper tray may or may not have an HCF, and the input device may or may not have a DADF and an RDH. Further, the paper tray can be equipped with at least one of the MSI and the HCF. Thus the combinations include a case in which either an MSI or an HCF is present, a case in which both the MSI and the HCF are present, and a casein which neither the MSI nor the HCF is present. Thus, there are a total of 10 parameters, including the above combinations of the MSI and the HCF. FIG. 30 shows several variations of cascades in accordance with these parameters. In FIG. 30, first cascade 2000 shows a function of outputting, a second cascade 2002 shows a function of a paper tray, a third cascade 2004 shows a function of enlargement/ reduction, a fourth cascade 2006 shows a function of duplex copy, and a fifth cascade 2008 shows a function of density.

As is shown in FIG. 30, in the output, for example, the cascade name changes and so does selection for a case in which the sorter is present and a case in which the finisher is present. Therefore, a simple calculation reveals that three alternate selection mode pictures are required for the output device alone depending on whether the device is present or not. Thus, the paper tray and the input device add more selection pictures, the total number of mode pictures will be as many as $3\times4\times2=24$. Further, considering whether or not variable power of the second development, LDC, side erasure, consecutive-page copy, job program, and editor, etc.. are present, as well as their combinations with the basic copy picture, the feature copy picture, and the advanced copy picture, several thousand combinations are possible. Providing an managing pictures corresponding to all of these combinations requires that the region (dialogue data 370) have a large capacity for storing the pictures and also causes an increased amount of processing in the dialogue editing.

(A) Configuration Setting-Processing

The present invention employs a data structure in which a small amount of picture data can set configuration by means of dialogue data 370 and display control data 367. The configuration information is set to display control data 367 to control the cascade name of the respective pictures and selections while, at the same time, conversion of the physical key into the logic key by key conversion unit 363 is controlled by conversion table 364. FIG. 31 shows the flow of control of configuration setting in a flow chart 3000.

In the process of configuration setting, the configuration information is received in the form of a command from the main body, as shown in FIG. 31(*a*), when the power is switched on (step 3001). Key control unit 375 activates display control unit 369 through display management unit 377 in accordance with the configuration information (step 3002), thereby renewing the content of display control data 369 formed of a picture data display RAM (step 3004). During this renewal, decisions also are made based on whether or not sorter color, input, HCF tray, etc. are present as shown in FIG. 31(*b*) and a flag indicative of "1" or "0" is set in accordance with the decision result. FIG. 31(*c*) and FIG. 31(d) show an example of an arrangement having a key code table of full configuration information stored in a ROM. In this case, the key code conversion table is copied from the ROM to RAM 364 (step 3024) upon power-up, and when the configuration information is received from the main body (step 3026), the key code conversion table in the RAM is renewed in accordance with the information (step 3028). For example, the logic key conversion may be made when the sorter and the finisher are present. Thus, pressing the cascade key is invalid when neither sorter nor finisher is present.

(B) Data and Editing of the Display Picture

FIG. 32(*a*) through 32(m) illustrate arrangements of the picture data. When the aforementioned optional devices are present in different combinations, different cascades and available functions result, and the provision of the pictures corresponding to the individual combination of an optional device and its selection is still not necessary. Basically, as shown in FIG. 29, the database of the picture is stored in the ROM and in the RAM, and a specific display block is varied to edit the data for one picture.

FIG. 32(*a*) shows an arrangement of the memory area of the dialogue data. This memory area has eight chips of 32K bytes each, and is accessed by a page (Page Number) and an absolute address (Absolute Address). Part of page "0" is used as a jump table, and the address storing data of the respective pictures (frames) are pointed so that the respective pictures can be accessed on a picture number basis (frame number and pop-up number). The basic data structure includes a first type, which contains a data ID, a page number, an address, and a screen position. The basic data structure also includes a second type, shown in FIG. 32(*b*), which contains a data ID, a page number, and an address, but which does not contain a screen position. These structures store, for example, a message data (Message Variable), a numeric data (Numeric Variable) such as a set count, a figure data (Figure Variable) having display contents in a fixed format, a variable data whose content varies depending on the devices present, a blink data (Blink Variable) indicating a tray which has been removed, a presettable cascade data (Presettable Variable), a data of a basic frame, and a data for a pop-up frame.

Overall data structure of the dialogue data includes, as shown in FIG. 32(*c*), a jump table JT, a frame F1, F2, . . ., FM, a structural frame, e.g., basic frame BF and pop-up frame PF for forming the respective frames, an object reference OR, and an object data OD, in which specific display data is stored. The object data OD contains the actual display information. The other data are pointers of a hierarchical structure (a tree structure) as shown by the arrow in the figure. All pictures are provided in the form of structural frames in which all the display data corresponding to the respective pictures are provided as a pair consisting of the object reference OR and the object data OD. For controlling the respective pictures, reference information (Test Variable) of the object reference OR is used. For example, for data in a setting state display region which is displayed in the manner of ON or OFF, the data indicative of ON and the data indicative of OFF are provided in the object reference OR and the object data OD, respectively. Which one of the data is used depends on the setting of the display control data 367, which is addressed by the reference information. In other words, the reference information (Test Variable) indicates a reference address of display control data 367 and display control unit 369 (FIG. 29) need only set the data in accordance with the copy mode and with which of the optional devices are actually present. The same is true of control of the display in accordance with whether or not the sorter (or other devices) are actually present The respective data structures will now be described in detail. The jump table JT has a page and an absolute address in accordance with the respective frame, pointing to the top address of corresponding frames F1, F2, . . ., FM. Frames F1, F2, . . ., FM include the basic copy picture and the more feature copy picture, the advanced copy picture,, the review picture, the information picture, and the jam picture, etc. The respective frames contain "possibilities" information indicating how many data are contained. The "ID" information and the data address point to the top address of the basic frame and the pop-up frame, respectively. In the case of the basic copy picture, for example, the structural frame consists of the basic frame BF without a pop-up, the pop-up frame of magnification, and the pop-up frame PF of copy density. The structural frame of the basic frame BF and the pop-up frame PF, etc. also have "possibilities" information at the top, followed by "ID" information, the data address pointing to the top address of all the object reference OR, and the display position of the top (Screen Position). The object reference OR contains reference information (Test Variable) containing an address of display control data 367 and a maximum height and width, followed by "ID" data and a data address, display manner data (Rev/Gray) such as reverse and gray, and a constant (Constant). In message data, assuming that there are k message data, the object reference OR has constants "0" to "k", each pointing to the object data OD of the corresponding message data. Thus, assuming that a character string of the object data of the constant "0" pointed by the object reference OR is "PLEASE COPY" and a character string of the object data of the constant "1" is "COPYING", the messages "PLEASE COPY" and "COPYING" may be displayed by writing "0" and "1", respectively, from display control unit 369 into display control data 367 at the address indicated by the reference information from the object reference OR. In this manner, the object reference OR is provided with all data, for example, message data are divided into an upper message and a lower message data provided with all data. In dialogue editing unit 366, the object data OD is selected in the object reference OR on the basis of the reference information and the object data OD pointed by the object reference OR is processed, thereby reading the characters "PLEASE COPY", which are ultimately written into the V-RAM.

When the object data OD is numeric data, height-information is stored because the numeric data is only one line tall, and thus the object data is followed by data width (the number of pixels), data for specifying a font, e.g., Ming style of Chinese character or Gothic, display attribute such as reverse, and the reference information (Test Variable). Within display control data 367, which has the address specified by the reference information, are written the numerics to be displayed such as count value and magnification. When the object data OD is actually a gray scale, the object data is followed by the size of the region (Height, Width) and the level (OFF "00", level 1 "01", level 2 "10", . . . ). Thus, the dialogue data contains data of a wide variety of data, as shown in FIG. 32(*d*), and this data is used to form the basic copy picture.

In the basic copy picture as shown in FIG. 32(*d*), as mentioned previously, the setting state display region and the data EV (Elementary Variable) having the cascade name of the sorter are displayed in an ON/OFF manner. Therefore, as shown in FIG. 32(e), this type of data will serve as reference data, with the constant "1" and "0" corresponding to ON and OFF (blank), respectively. Thus, "sorter" is displayed if "1" is stored in the address of the display control data specified by the reference information (Test Variable), and nothing is displayed if "0" is stored therein.

FIG. 32(*f*) shows a data structure applied to fixed cascade that is not changed. This data structure is shown in the basic copy picture in FIG. 32(*d*) as a data CV (Cascade Variable) applied to the respective cascades such as reduction/enlargement, duplex copy, and copy density. This data has the references "frame (ON)" and "non-frame (OFF)" as a series of data for respective cascades in the object reference OR. Then a cascade number for specifying "frame" is written to the display control data in the address specified by the reference information (Test Variable). Thus, with this data CV, the data "frame (ON)" are selected only for the cascades specified as "frame" by the display control data but "non-frame (ON)" is selected for other cascades. As shown previously, the "frame" displays a frame (shadow) on the right side and at the bottom, and is backlit with high intensity for a three-dimensional effect, while the "non-frame" has a gray gradation background.

FIG. 32(*g*) shows an example of a data structure of, for example, the tray that is blinked, which corresponds to the data BL (Blink Variable) in the basic copy picture in FIG. 32(*d*). When the data to be blinked is set to the display control data at the address specified by the reference information (Test Variable), the data BL sets the top display position (Screen Position) and the size (the height and width) to blink. In other words, this data is set to all the regions to which the blink is applicable.

FIG. 32(*h*) shows an example of data structure applied to the presettable cascades. The data structure corresponds to the data PC (Presettable Cascade Variable) in the basic copy picture in FIG. 32(*d*), applied to the respective cascades such as paper tray and sorter. This data includes the reference information for controlling the "frame" cascade, "ID", and an address of a group (Group of Figures) having the reference information of the respective cascades, followed by the reference information (Tech Rep Variable) in accordance with the respective cascade position and display position (Screen Position) of the top end. Then selection is set to the display control data indicated by the reference information (Tech Rep Variable) corresponding to the respective cascade.

FIGS. 32(*i*) to 32(*m*) show an example of the specification of the display control data. Display control unit 369 sets the display control data in accordance with this specification and, during the configuration setting process, the value of the associated cell (Cell) is renewed. In the case where the sorter is present, for example, as is apparent from FIG. 32(*i*) and FIG. 32(*m*), an address AIB is set to "1", and addresses A38, A39, and A3A are set to "2", "3", and "4", respectively. As a result, the cascade name "sorter" is displayed, and below "sorter" are displayed "copy receive", "paper collation", and "stack", as shown in FIG. 32(*d*). Additionally, setting the above-mentioned cell values for the address A38, A39, and A3A in a different order permits a different order of display of the selections accordingly. When the sorter is not present, for example, the address AIB is set to "0" and addresses cascade name and the respective selections will all be blanked. For the paper tray, as is apparent from the specification in FIG. 32(*j*), setting the cell value of the respective addresses to any one of "1" to "7" permits different sequences of display.

Figure 33A:
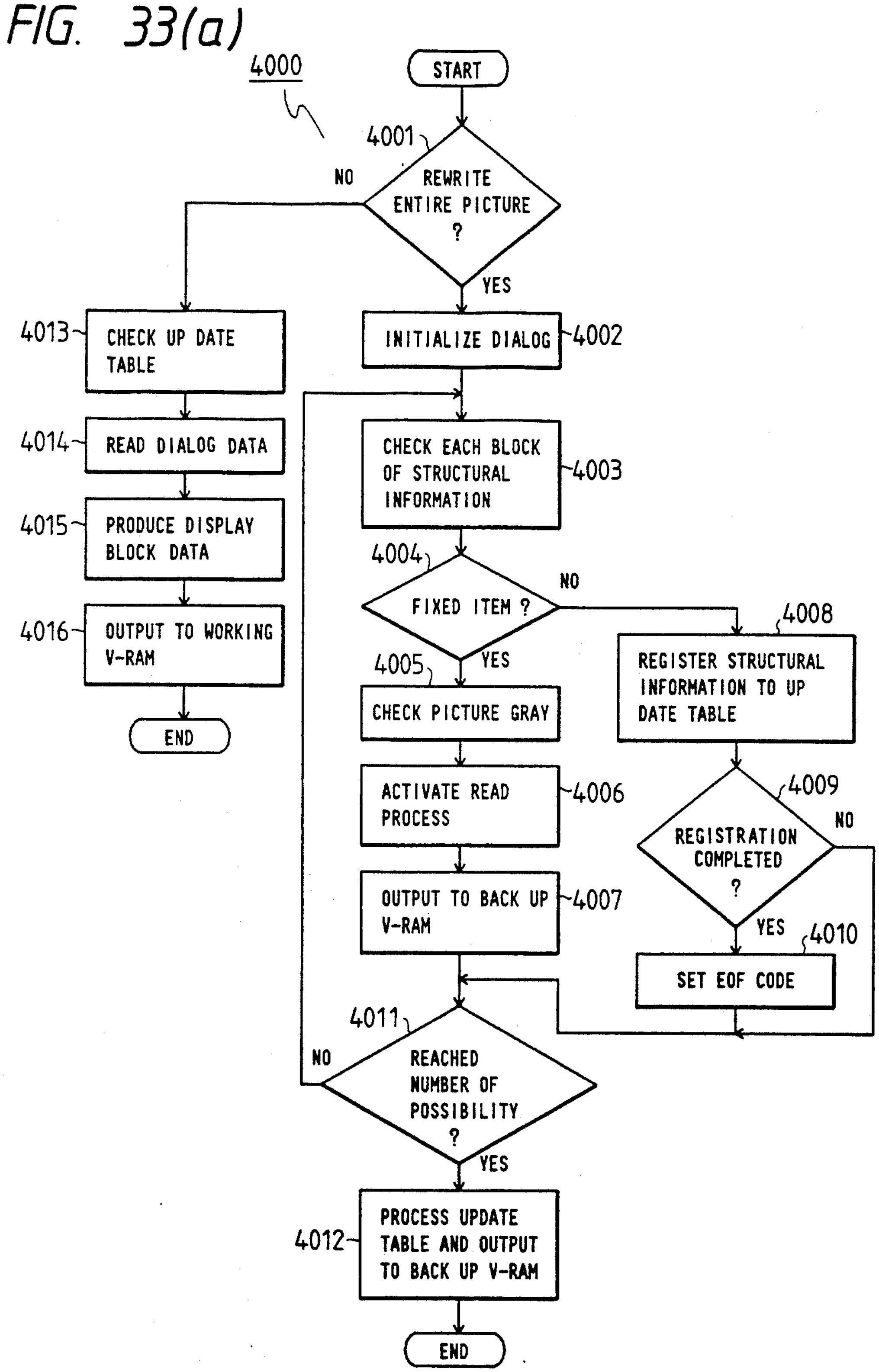
FIGS. 33(*a*) and 33(*o*) are diagrams illustrating a picture editing process.
Figure 33B:
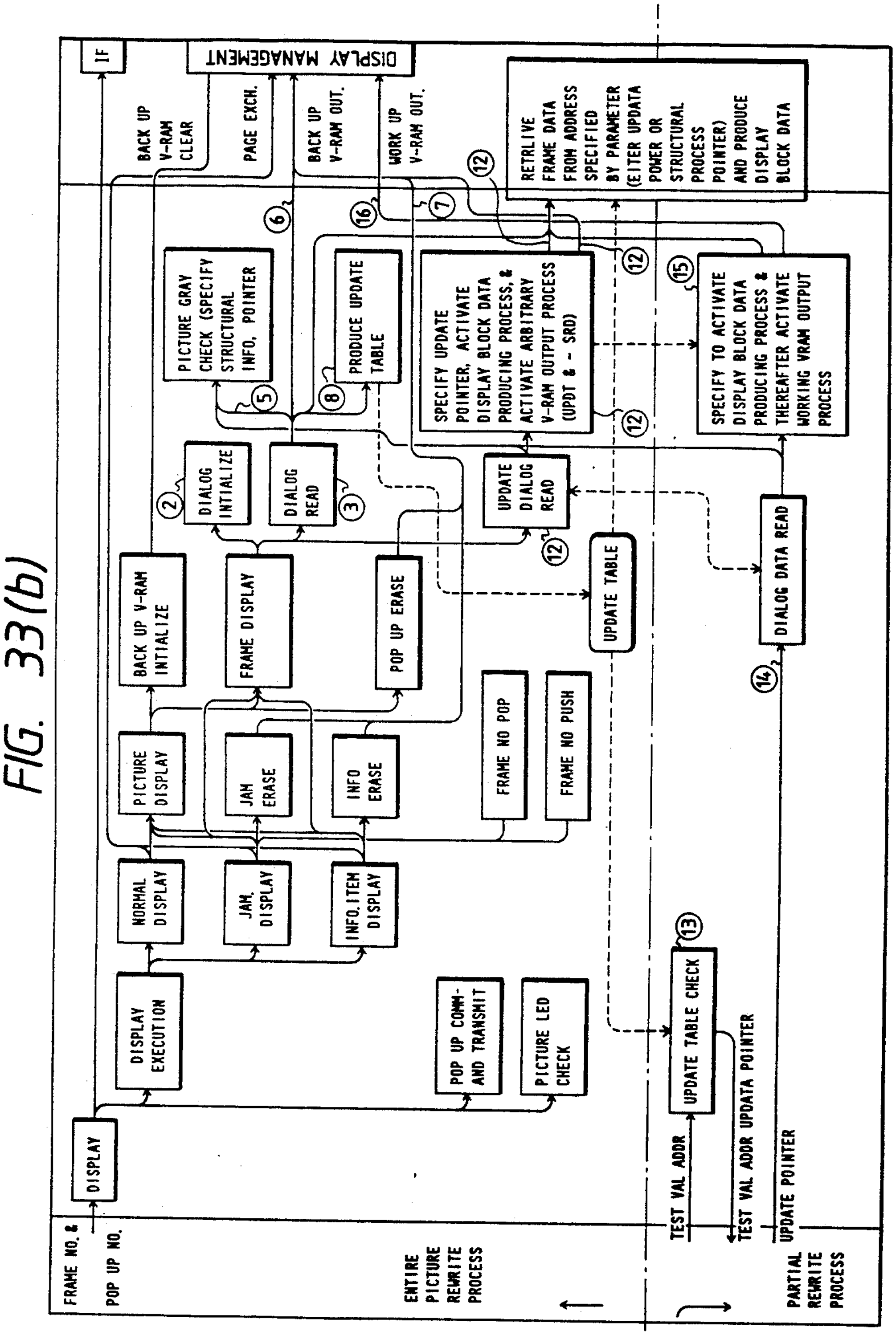

FIG. 33 is a diagram illustrating picture-edit processing. FIG. 33(*a*) shows a flow of the processing in a flow chart 4000. FIG. 33(*b*) shows an example of a module arrangement.

As previously mentioned, the present invention employs a dual structure of the V-RAM so that, if only a portion of the picture is to be modified, the involved portion in the working V-RAM is rewritten, but if a large portion of the picture is required to be modified then the backup V-RAM is modified first and subsequently the display is switched to the backup V-RAM, thereby eliminating flicker of the display picture during modification. For this reason, it is necessary to make a decision, as shown in FIG. 33(*a*), based on whether or not one entire picture is required to be rewritten in the picture-edit process (step 4001). The picture is edited and retrieved in accordance with the frame number, the pop-up number, and the settings of the display control data. Therefore, when the frame number or the pop-up number is changed, the picture needs to be rewritten, which requires use of the backup V-RAM. Also, when the all-clear key is operated, the respective cascades move because the respective cascades are all reset to default. Therefore, the amount of change is quite large, requiring use of the backup V-RAM. Therefore, a first decision is made based on whether the backup V-RAM should be used or the working V-RAM should be used (step 4001).

A dialogue initialization is performed when the picture is to be rewritten. In this process, the top address of the dialogue data is determined on the basis of the frame number and the pop-up number and a dialogue read pointer is set (step 4002).

Then, as many blocks as the number of "possibilities" in the configuration information are each interrogated to determine whether each block is a fixed item or a variable item (steps 4003 and 4004).

If the block is a fixed item, after picture gray check has been performed, the read process is activated to retrieve the display data from the backup V-RAM (steps 4005 to 4007).

If the block is a variable item, then the address of the configuration information and reference information (Test Variable) are registered in an update table. When all the variable items have been registered, an EOF (End of File) code is stored in the update table (Steps 4008 to 4010).

When the above steps 4003 to 4010 have been performed as many times as the number of "possibilities", the blocks in the update table are each checked to perform processing in a manner similar to the above steps 4005 to 4007 (steps 4011 to 4012).

The picture-rewrite process is carried out as mentioned above, but the following partial rewriting process is carried out if the result in step 4001 is NO. IN the partial rewrite process, the update table is interrogated to read the variable item that has been changed, and then the display block data corresponding to the changed item is produced to be output to the working V-RAM.

(III-4) Structure of a Display Picture

The user interface makes full use of the CRT display to simplify configuration of the key/LED board. Particularly, the pictures are carefully divided so that each picture is simple and easy to see and, thus, setting, confirming, and transmitting the message are effectively performed.

The pictures include the selection mode picture for selecting the copy mode, the review picture for confirming settings of the copy mode, the full auto picture for carrying out the copying operation in the standard mode, the information picture for providing an illustration picture illustrating the multi-functional copy mode, and the jam picture for suitably displaying the location of a jam. Further, the selection mode picture is extremely complicated if it is formed in single picture and the functions of the selection mode include not only conventional functions but also specialized functions. Thus, these pictures are divided into three groups depending on the content thereof. These divided pictures are selectively displayed by mode selecting keys 308 to 310, thereby enabling selective display of the desired function by the respective picture. Further, these pictures are each partitioned into a selection area, an other mode-setting-state display area, and a message area, etc., thereby conveying appropriate information to the user in accordance with the operation state.

(A) Selection Mode Picture

Figure 34A:
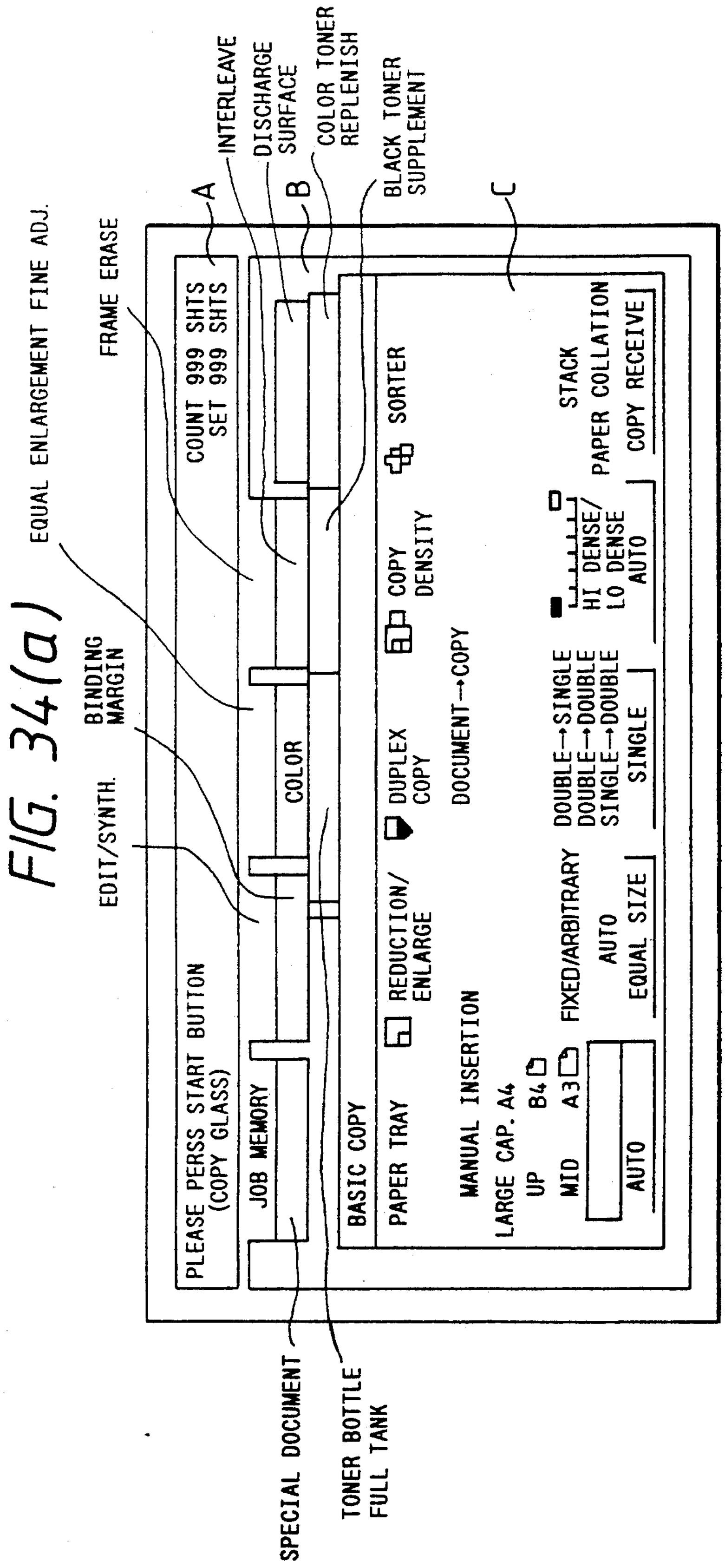
FIG. 34(*a*)–(*c*) are diagrams illustrating the selection mode picture.
Figure 34B:
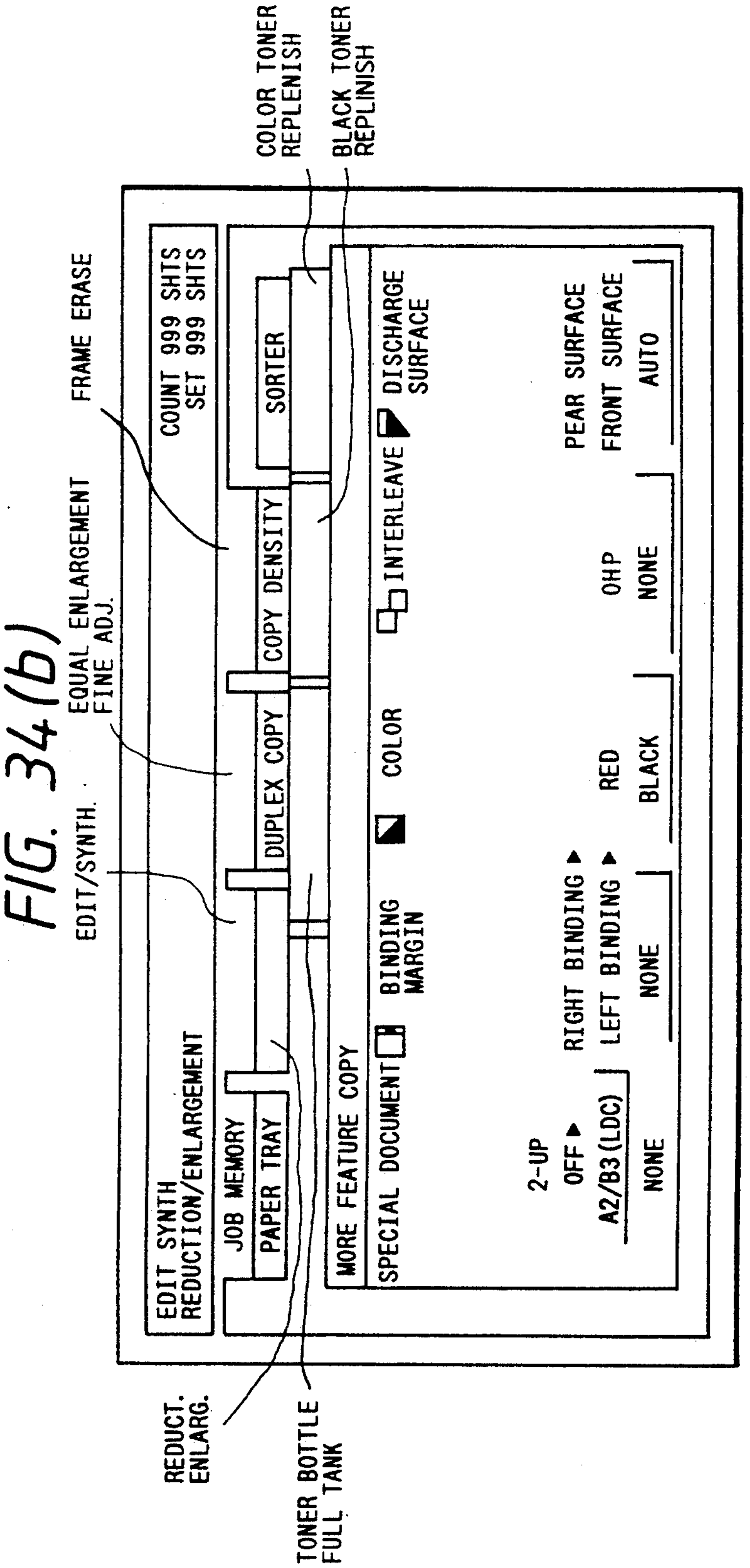
Figure 34C:
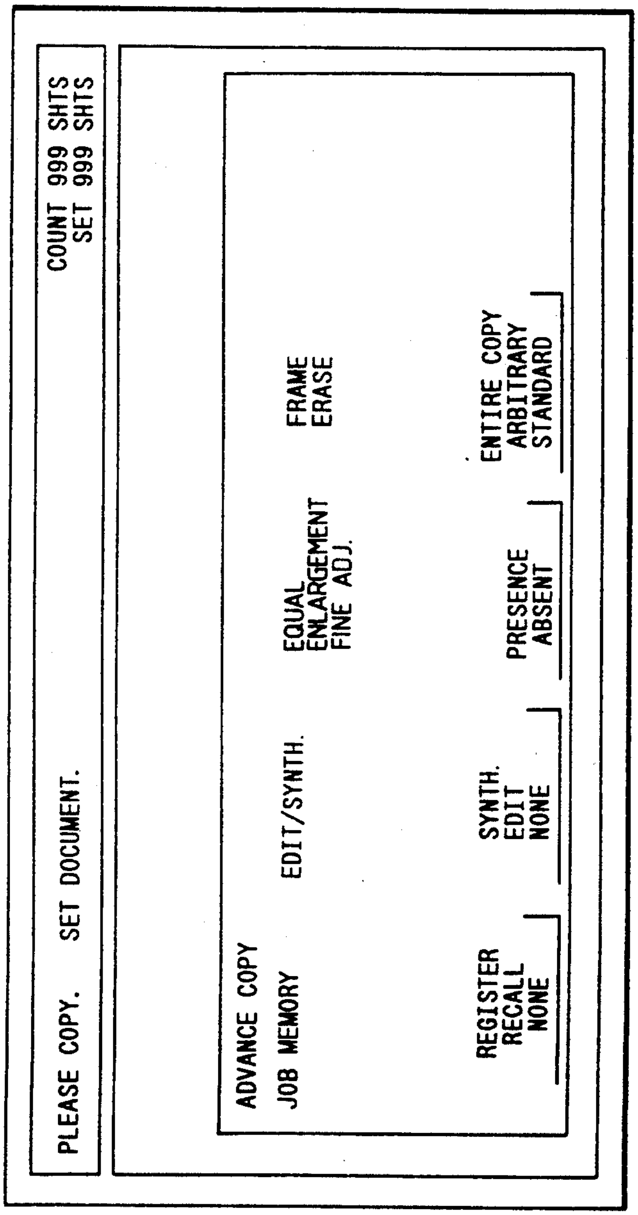
Figure 35A:
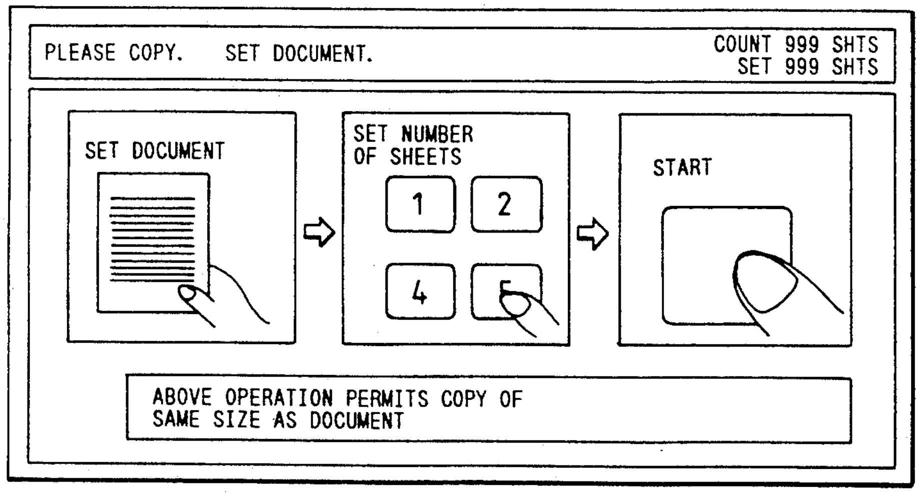
FIGS. 35(*a*) through 35(*d*) are diagrams showing examples of pictures other than the selection mode picture.
Figure 35B:
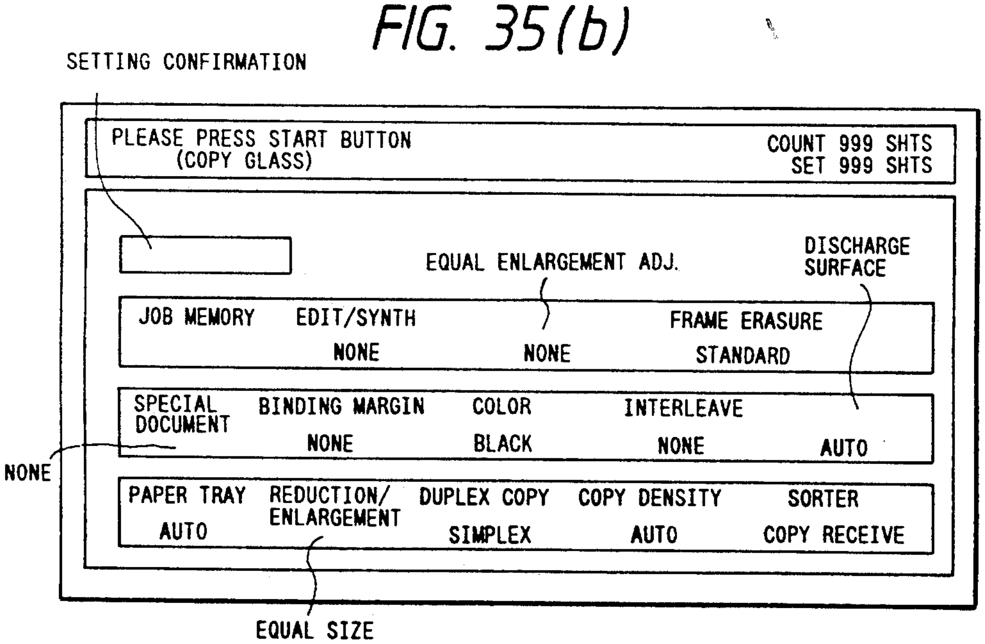
Figure 35C:
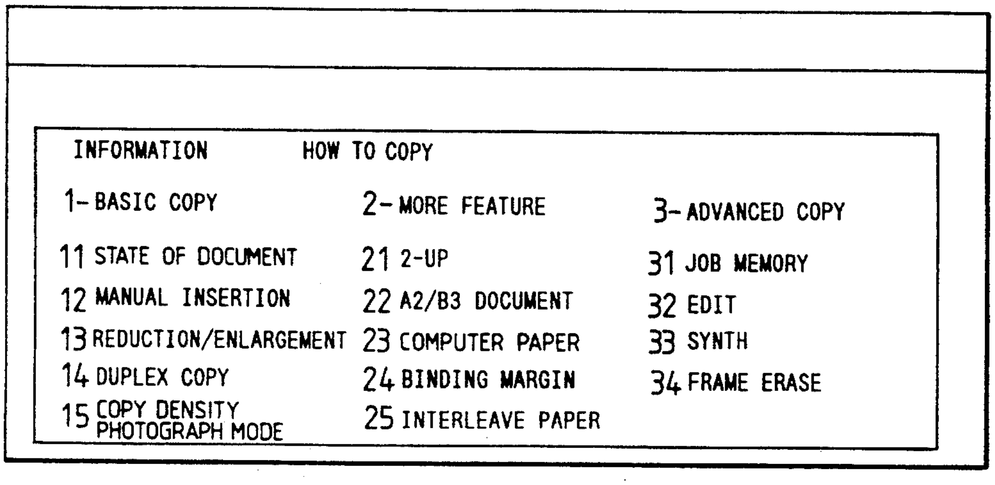
Figure 35D:
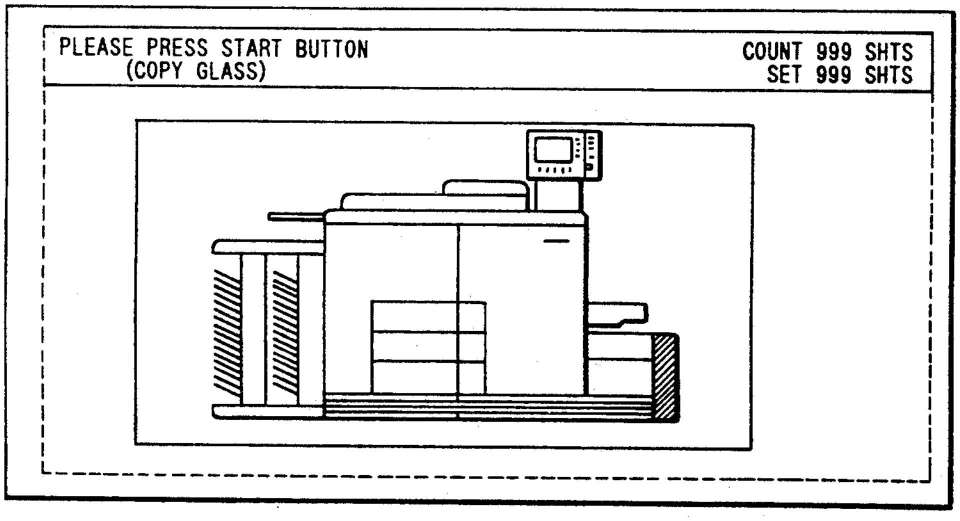

FIGS. 34(*a*)–(*c*) are diagrams illustrating the selection mode picture.

The selection mode picture includes three pictures, i.e., the basic copy, the more feature copy, and the advanced copy as shown in FIG. 34(*a*) to FIG. 34(*c*) and are selectively displayed. Of these three pictures, the basic picture is a picture in which the most commonly used functions are categorized into groups. The advanced copy picture is a picture in which the remaining non-common specialized functions are categorized into groups.

The respective selection mode is basically divided into a message area A formed of 2 lines, a setting-state display area B formed of 3 lines, and a selection area C formed of 9 liens. The message area A displays a J code message when the copy execution conditions are in conflict with each other, a U code message when a hardware malfunction requires a service by a service representative, and a C code message for alerting the operator to various problems.

The J code message is provided with a combination check table for copy execution condition in accordance with settings of the respective cascades. When start key 318 is operated, the table is interrogated and, if there is any conflict, the J code is output. The setting-state display area B displays the selection state of the other modes. For example, the setting-state display area B may display the selection state of the more feature copy and the advanced copy with respect to the basic copy picture. When the cascade state of the selection area C is non-default (lowest most), the selection state display displays that cascade. The selection area C displays the cascade names on the upper area, the lowest stage of which is the default area, an above the default area is an area for cascade names other than the default, thus enabling individual selection in the five cascade areas through cascade key operation. Thus, if selection operation is not perform, the duplicator will default to full auto copy mode. Setting of selection is effected by cascade keys 319-1 to 319-5 disposed below the cascade area divided into five columns. On the right side of the message area A is a count unit for displaying a set count and a made count while the lower one line of the setting state display area B is used as a maintenance information unit indicating a toner full-up and a toner replenish. The contents of the cascade area of the respective selection mode pictures will be described as follows.

a) Basic copy

The basic copy picture consists of cascades of "paper tray", "reduction/enlargement", "duplex copy", "copy density", and "sorter", as shown in FIG. 34(*a*).

"Paper tray" defaults to Auto, in which case the tray containing the same size of paper as the document copy is automatically selected. A region other than default can be specified by pressing the cascade key to select any one of the manual insertion tray, the large capacity tray, the upper tray, the middle tray, and the lower tray. Also, each tray's section displays an icon (pictorial symbol) representing the size and type of paper for easy recognition of the paper contained in the tray. The paper is set to be delivered either in a longitudinal direction or in a direction perpendicular to the longitudinal direction.

"Reduction/enlargement" default to no reduction/enlargement, which is further specified as auto or fixed/arbitrary mode. In auto mode, the copy operation is carried out with the magnifying factor being automatically set in accordance with the size of the paper selected. The magnifying factor may be set arbitrarily from 50 to 200% with an increment of 1%. In fixed/arbitrary mode, the specific contents to be set may be displayed on the pop-up picture by pressing the cascade key to enable selection of the fixed magnifying factors of 50.7%, 70%, 81%, 100%, 121%, 141%, and 200%, as well as selection of arbitrary magnifying factors varying successively with an increment of 1%.

"Duplex copy" defaults to single side copy and, in non-default modes, the double side to-single side, double side-to-double side, or single side-to-double side modes can be selected. For example, both the double side-to-single side document an the single side-to-double side modes represent that a double sided copy is made from a single sided document. When a double sided copy is to be made, a paper, one side of which has already been copied, is first received in the duplex tray and then discharged from the duplex tray for copy operation of the other side.

"Copy density" defaults to Auto. Seven different levels of density can be set in non-default modes. The seven different levels of density also are available in the photograph mode. The setting of these levels is effected through the pop-up picture.

"Sorter" defaults to Copy receive. Non-default modes include page collation mode and stack mode. Page collation mode sorts the copied paper into the respective bins of the sorter. Stacker mode stacks the copied paper one over the other in order.

b) More feature copy

The more feature copy picture consists of the cascades such as "special document", "binding margin", "color", "interleaving paper" and "take-up surface", as shown in FIG. 34(*b*).

The "special document" cascade can select a function (LDC) of copying a large-sized document such as A2/B3 size, a function (CFF) of copying each page of a continuous computer printout document by counting holes, and a double page function (2-up) for copying two sheets of original copies on a single sheet of paper.

The "binding margin" cascade sets a binding space in the range of 1 to 16 mm on the right or left end of the copied paper. Left binding, right binding, and the size of the binding margin can be set in non-default mode.

The "color" cascade defaults to black, although red can also be selected.

The "interleaving paper" cascade inserts a sheet of white paper between the respective OHP copy (over head projector), which can be selected in non-default mode.

The "take up surface" cascade causes the copied paper to be discharged with a specified surface of the paper, the front or rear surface, up or down.

c) Advanced copy

The specialized copy picture consists of "job memory", "edit/synthesis", fine adjustment of equal-enlargement", and "frame erasure" as shown in FIG. 34(*c*).

"Job memory" indicates a program stored on cards, in which a plurality of jobs are registered and are recalled to perform the auto copy operation when the start key is pressed. The recall and register of the program can be selected in non-default modes.

"Edit/synthesis" enables selection of the edit function and the synthesis function in non-default modes. The "edit" function inputs editing data using an editor. The functions of "partial color", "partial photograph", "partial deletion", and "marking color" are selected as subchoices of the "edit/synthesis" function. In the "partial color" function, only a specified area of the copy paper is copied in one color and the remainder is copied in black. The "partial photograph" allows photograph copy in a specified area. The "partial deletion" prevents a specified area of the copy paper from being copied. The marking color enables, for example, light color print over a specified part to produce an effect as if the part is marked with that color. The "synthesis" function uses the duplex tray to make a single copy from two documents, which includes sheet synthesis and parallel synthesis. The sheet synthesis copies both a first and a second document, with one document being placed entirely over the other, thus allowing the two documents to be copied in different colors. On the other hand, the parallel synthesis is a function in which the first and second original copies are copied side by side on a single paper, one copy touching the other.

The "equal enlargement fine adjustment" function sets enlargement factors from 99 to 101% with increments of 0.15%, and is selected in non-default modes.

The "frame erasure" function does not copy the peripheral area of the document, as if a "frame" is set to the periphery of the picture information. The standard default "frame" is 2.5 mm. An entire-surface copy, in which the arbitrary dimensions are set and the frame erasure is selected, is selected in non-default modes.

(B) Other Pictures

FIGS. 35(*a*)–(*d*) show examples of a picture other than selection mode pictures.

a) The review picture

The review picture displays the state of the copy mode that is selected through the aforementioned selection mode picture and displays the cascade settings of the respective selection modes as shown in FIG. 35(*b*). review picture displays a selected item or cascade name and the mode selected at that time. For example, if the selected mode is the default, the display has a gray background. On the other hand, if the selected mode is in non-default, the display has an inverted display on a background of normal intensity. Such an indication of default/non-default mode makes the selection conspicuous, particularly when the duplicator is switched from the full auto mode. The picture is arranged to display the basic copy, the more feature copy, and the advanced copy in three columns, which are disposed corresponding to the position of the mode selection keys to facilitate switching to the respective pictures from the review picture. This review display permits the operator to confirm the setting condition of the respective cascades, thereby improving operability and reducing miscopy.

b) The full auto picture

The full auto picture, shown in FIG. 35(*a*), is displayed when power is switched on, when preheat key 306 is pressed (cancelled), or when all-clear key 316 is pressed. FIG. 35(*a*) shows all the cascades of the respective selection mode pictures set to default. In this picture, setting the document on the platen, inputting the number of copies to make through the ten key switch, and then operating start key 318 enables selection of the same size of paper as the document, and copying of the present number of sheets is carried out.

c) The information picture

The information picture provides an example of how to make a copy in the respective copy modes shown in FIG. 35(*c*), and is displayed upon operation of information key 302. Inputting the information codes shown in the picture through the ten key switch causes display of the illustration picture.

d) The jam picture

The jam picture, shown in FIG. 35(*d*), is superimposed over the picture that has been displayed while the copy operation is carried out. The intensity of the previous picture is lowered by a unit level to make a clear jam display.

(C) Evolution of the Pictures

Figure 36:
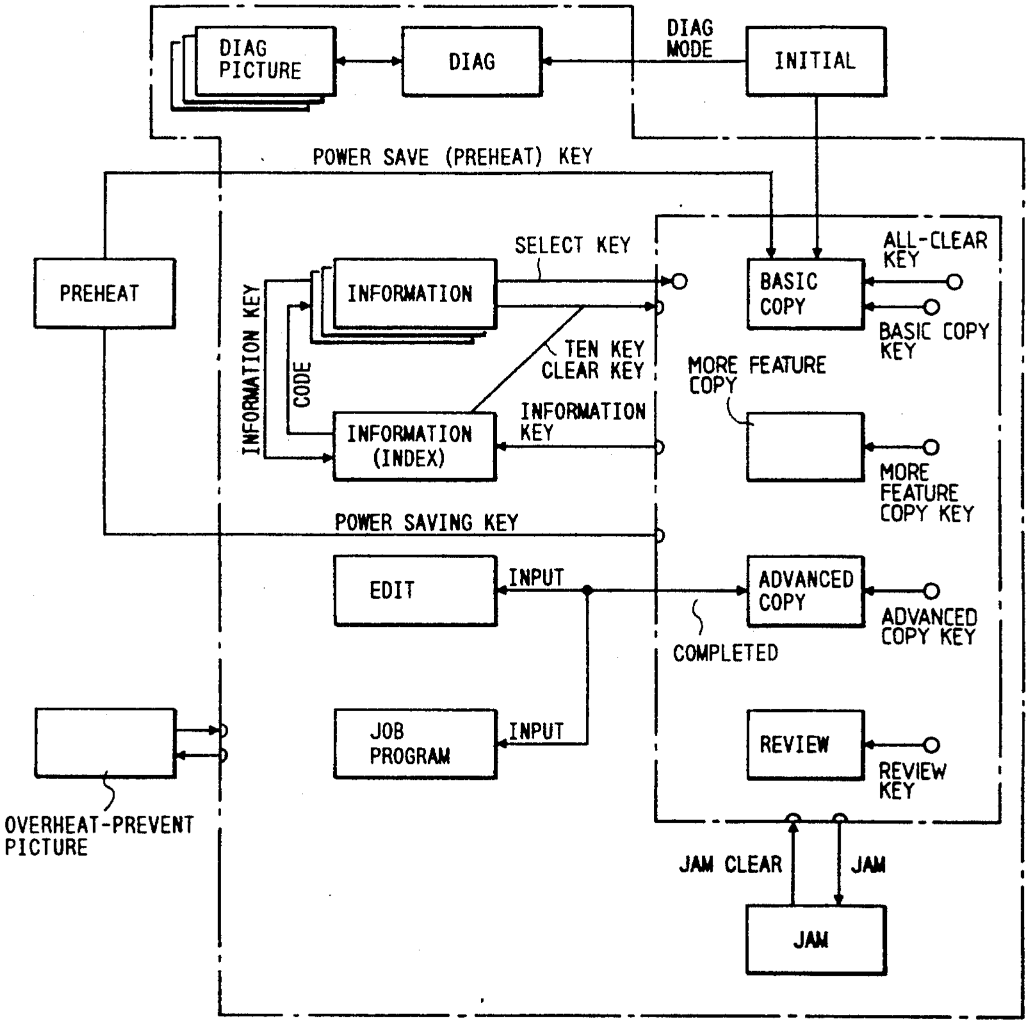
FIG. 36 is a diagram illustrating switching control of the pictures.

Evolution of the pictures occurs during the conditions shown in FIG. 36. When initialization is completed after the duplicator is powered on, the basic copy picture is displayed unless a command is outputted for shifting to the diagnostic mode. The basic copy picture is displayed when the all-clear key, the mode selection key of the basic copy, and the preheat key in the preheat picture are pressed. The more feature copy picture, the advanced copy picture, and the review picture are selectively displayed by the respective mode selection keys. The start key is accepted only in these pictures for carrying out the copy operation. In the advanced copy picture, when editing and job programs are selected, the advanced copy picture evolves to input the selected programs and then returns to the previous advanced copy picture when the input is completed. Pressing an information key and then inputting a code for the information causes the picture to shift to the information picture from the above mentioned pictures. Pressing a preheat key (power-saving key) causes the picture. When a jam occurs, the jam picture is superimposed over the selection mode picture. The overheat-prevent picture is activated by a timer if there is no key input for a predetermined period of time in any one of the above mentioned pictures, and then is shifted to the previous picture upon key operation.

(D) Display Manner

Figure 37A:
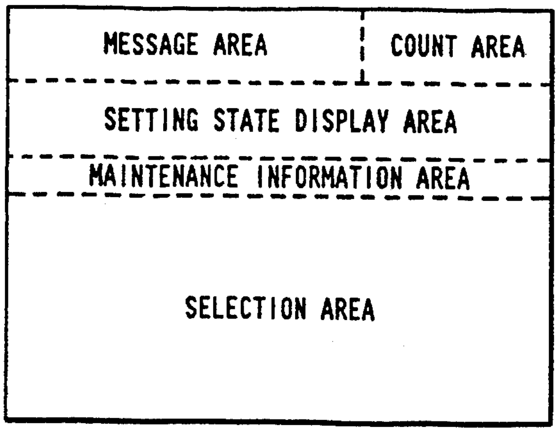
FIG. 37(*a*)–(*c*) are diagrams showing grouping of the picture layout.
Figure 37B:
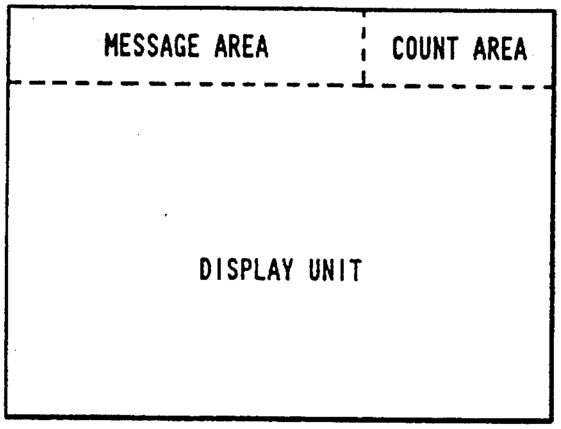
Figure 37C:
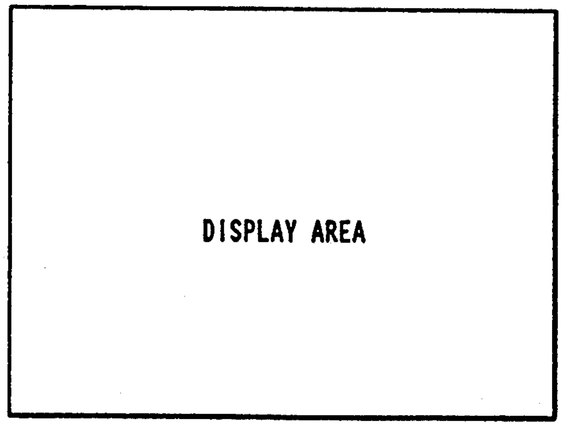

FIGS. 37(*a*)-(*c*) illustrate examples of grouping the picture layout. In the present invention, as discussed in connection with FIGS. 34(*a*)-(*c*) and FIGS. 35(*a*)-(*d*), the display picture is divided into a plurality of pictures, each of which is selectively displayed, thereby simplifying the information in one picture with the least amount of unnecessary information in each case. The display pictures are grouped as shown in FIGS. 37(*a*)-(*c*), for example. FIG. 37(*a*) illustrates the layout of the selection mode picture. FIG. 37(*b*) illustrates the layout of the review picture, the full auto picture, edit input picture and the job program picture. FIG. 37(*c*) illustrates the layout of the preheat picture, the overheat-prevent picture, the information picture and the diagnostic picture.

In the present invention, the display manner is changed in accordance with the display area of a layout and input setting state, etc., thereby forming easy-to-see and easy-to-grasp pictures. For example, the selection mode picture according to the layout in FIG. 37(*a*) is divided into the message area (including the count area), the setting state display area (including the maintenance information area), and the selection area, each area being displayed in a different manner. For example, the message area including the count area displays the message characters in high intensity on a black background, similar to the display of a console panel of the backlit type. In the setting state display area, the cascade names are displayed in the inverted mode (characters are dark, background is bright) with "a net-like" background in which dots are displayed with a predetermined density. That is, the respective cascade is represented in a card image. Below the setting state display area is a single line maintenance information area for indicating when the toner bottle is full, when the toner bottle needs replenishing, etc. The maintenance information and the setting state information are of a different nature and thus are easy to distinguish. Therefore, a display manner similar to that in the message area is employed without confusion. In the selection area, the entire cascade display area is displayed in low intensity gray and the selections and cascade names are displayed with an inverted background of the "net-like" periphery. In addition to this display, the background of the area of selection that has been set is displayed with high intensity (inverted display). Also, a message indicating that the selected paper tray is out of paper is displayed in characters of high intensity on a black background.

The full auto picture shown in FIG. 35(*a*) has a layout shown in FIG. 37(*b*), in which the display area is arranged in such a way that the background is displayed in the dark "net-like" display, and the area for displaying the operator instructions, such as "document setting", is displayed with a bright "net-like" display. At the same time the border therebetween is edged for improving the display clarity. Thus, the display can be implemented in a wide variety of combinations by suitably modifying it at will.

Particularly, the boundary between the display with high intensity background (normal intensity according to paper white), the gray gradation display with lower intensity, and the display with a predetermined density of bright-and-dark dots, are trimmed as shown for visual three-dimensional effect, thereby providing a "card-like" image. The background of the respective areas are displayed in different manners with trimming and the invention provides the operator with easy-to-see and clearly distinguished display content in each area. The characters displayed in the inverted display or blinking display are immediately noticed by the operator. In addition to arranging intensity of the character string and background thereof, the present invention also has icons (pictorial characters) added to the selections, cascade names, and character strings for helping the user remember the various functions. For example, in the basic copy picture, an icon is located before the cascade names "reduction/enlargement", "duplex copy", "copy density", and "sorter", as well as at the end of the paper size in lower, middle, and upper sections in the selection of "paper tray". An icon visually conveys information to the user that would be less obvious if displayed only as a simple character string. Icons can convey some information more accurately and intuitively than simple character strings.

(III-5) Key/LED Board and Display-Displaying Circuit

(A) Key/LED Board

The user interface includes the CRT display and the key/LED board, as shown in FIG. 26. The CRT display s used in the present invention for displaying the selections and settings thereof, thereby minimizing parts count of the keys and the LEDs on the key/LED board.

As stated previously, to effectively use the CRT, the pictures to be displayed are divided into groups and each picture is further divided into areas for organizing the display contents to form an easy-to-see picture. For example, the selection mode picture is selectively displayed in three pictures, i.e., the basic copy, the more feature copy, and the advanced copy. The respective selection areas of these functions are divided into five cascade areas for selecting and setting of the functions, which can be effected with eight keys, i.e., selection keys 308 to 310 for switching the pictures and cascade keys 319-1 to 319-5 for selecting the respective cascade areas. Thus, once any one of the basic copy picture, the more feature copy picture, and the advanced copy picture has been selected by pressing mode keys 308 to 310, all the functions can be selected by pressing cascade key 319-1 to 319-5 and by inputting a number using ten-key switch 307. Cascade keys 319-1 to 319-5 are arranged in pairs so that keys for upward movement and keys for downward movement of the cascade are used for moving the setting-cursor up and down within the cascade area to select and set the desired function. The selection mode pictures are selected through mode selection keys 308 to 310 and only one of the three is displayed. Thus, LEDs 311 to 313 are used to indicate which of selection mode keys 308 to 310 the picture on display was selected by. That is, pressing mode selection keys 308 to 310 to display the selection mode picture causes illumination of LEDs 311 to 313 corresponding to mode selection keys 308 to 310.

It is difficult for the operator to learn and make full use of many functions provided. Therefore, information key 302 is used to provide the users with an illustrative picture of how to make a copy in each mode of copy operation. The information function is carried out as follow. First, when information key 302 is operated, a list of information codes is displayed in an information index picture as shown in FIG. 35(*c*). Selecting and inputting the information code specified by the picture through ten-key switch 307 cause the information pop-up picture corresponding to the code to appear. The pop-up picture displays the illustrative picture of the copy mode.

Dividing the selection mode pictures into three groups of pictures defining various functions for proper selection and setting requires confirmation of the overall setting states, including other pictures. Review key 303 is used to confirm the setting states of all the pictures. Review key 303 causes display of the review picture, as shown in FIG. 35(*b*), which indicates setting states of all of the pictures of the basic copy, the more feature copy, and the advanced copy.

Dual language key 304 is a key for switching the language on the display picture. With increasing international commerce, people who communicate in a variety of languages will often share the same apparatus. To overcome language barriers in such circumstances, display data and font memory are available in two languages, e.g., Japanese and English, and operating dual language key 304 permits selective display of the picture in either Japanese or English. A plurality of languages, not restricted to only two languages, may be provided so that dual language key 304 allows a user to select the languages in a predetermined sequence. Dual language key 304 may also allow several Japanese dialects to be employed for "plural Japanese language."

Preheat key 306 allows a duplicator to quickly enter the preheat mode for power-saving in the standby state of the duplicator and for transition from the standby state to the copy operation. Operating preheat key 306 enables selection of either the preheat mode or the full auto mode. Thus, LED 305 is used to indicate which of these two modes has been selected. All-clear key 316 clears the duplicator, i.e., sets the full auto mode in which the respective selection modes are set to default and permits display of the full auto picture, which tells the operator that the currently selected copy mode is the full auto mode.

Interrupt key 315 is used to interrupt a preceding consecutive copy operation in progress when another copy has to be made urgently. Upon completion of the interrupt, the interrupt is removed and the duplicator returns to the previous copy operation. LED 314 indicates whether interrupt key 315 is valid or has been removed.

Stop key 317 is used for stopping the copy operation, for setting the number of copies to make, or for setting the bins of the sorter.

Start key 318 initiates the copy operation when a function has been selected and sets the execution condition of the function selected.

FIG. 38(*a*) is a diagram showing an example of a setting-map of a keyboard scan. FIG. 38(*b*) is a diagram showing an example of a setting-map of an LED scan.

The key/LED is processed with a scan time of 4.98 ms, which is obtained by keyboard/display controller 336 on the basis of a clock of 102 kHz, as mentioned previously. As shown in FIG. 38(*a*), one cycle is formed of eight scans of "0" to "7", each scan being formed of one-byte data, thereby forming the physical table described previously. The LED is also turned ON or OFF by the scan map as shown in FIG. 38(*b*).

(B) Display

Figure 39A:
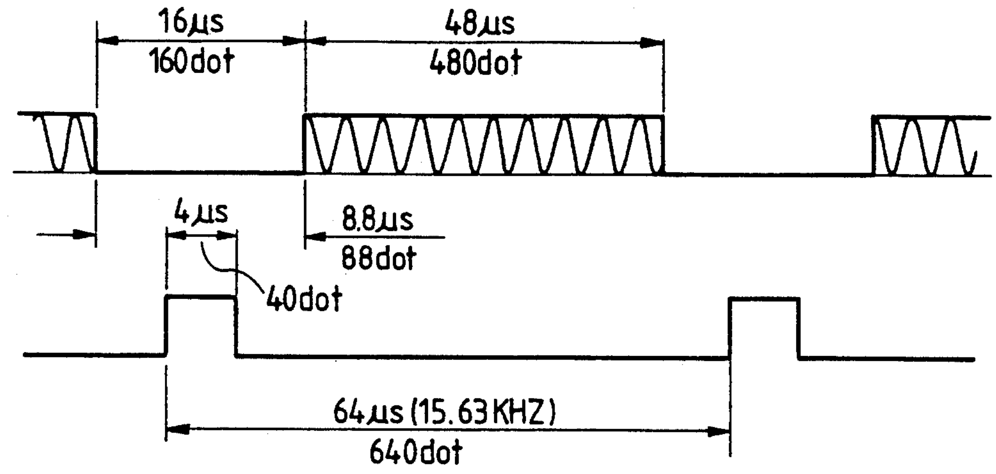
FIGS. 39*a* and 39*b* are diagrams showing display timing.
Figure 39B:
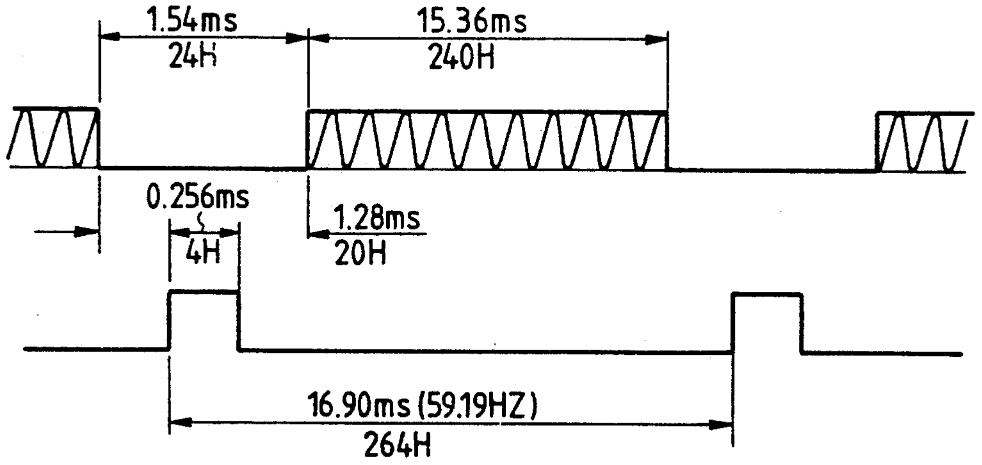
Figure 41:
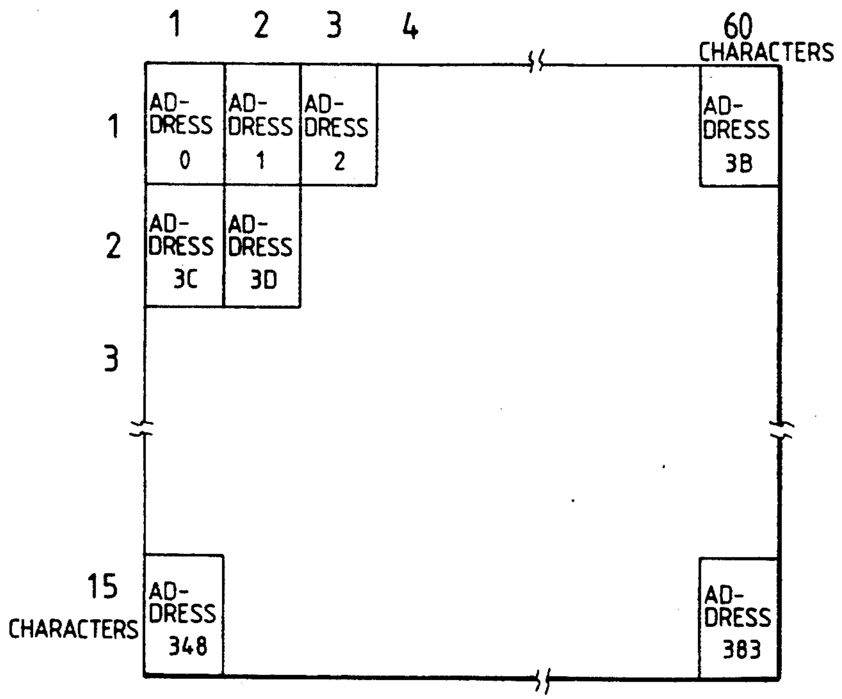
FIG. 41 is a diagram showing an example of the addresses of a first V-RAM corresponding to the display position on a CRT.
Figure 42:
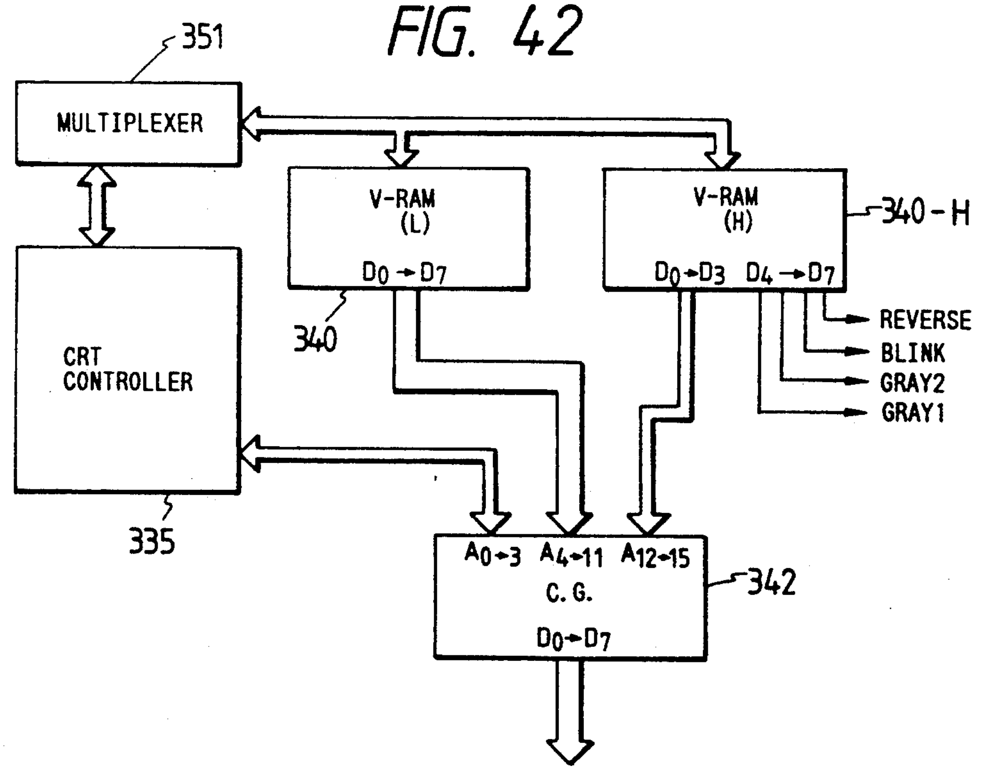
FIG. 42 is a diagram illustrating a character read circuit.
Figure 43:
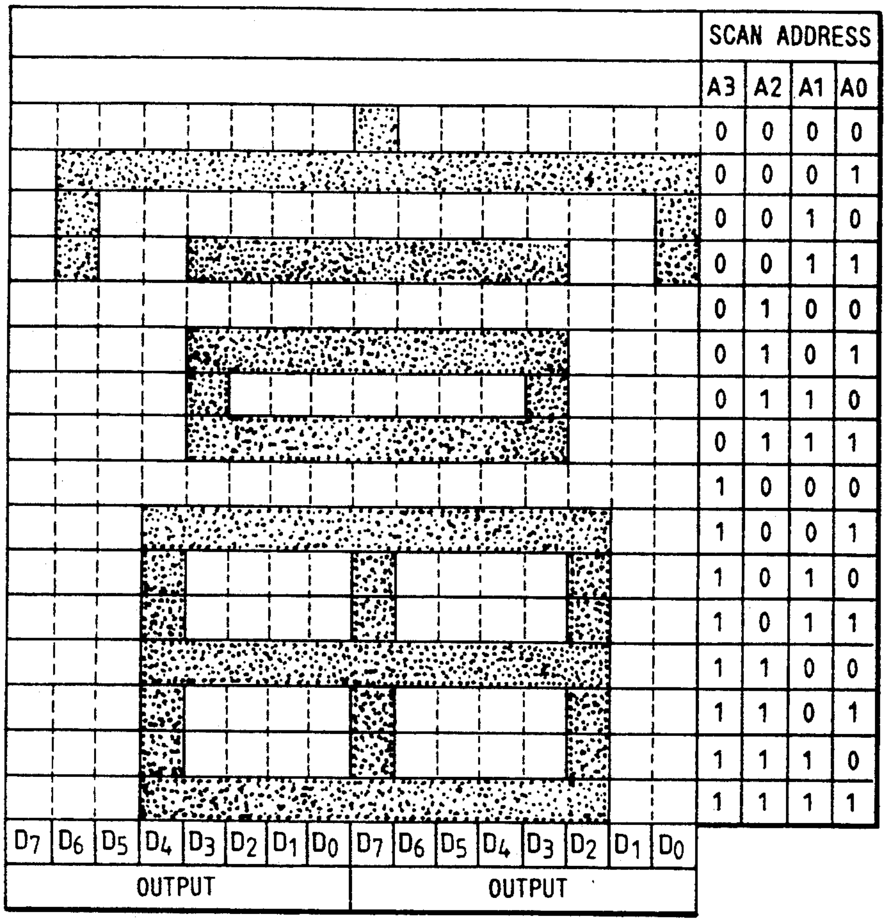
FIG. 43 is a diagram showing an example of dot patterns and corresponding data and scan addresses.

FIGS. 39*a* and 39*b* are diagrams illustrating display timing. FIG. 40 is a diagram illustrating an example of various correspondent addresses in the V-RAM. FIG. 41 is a diagram showing the address of the V-RAM and corresponding display positions on the CRT. FIG. 42 is a diagram illustrating a circuit for reading the character generator. FIG. 43 is a diagram showing the dot-pattern and corresponding data and scan address.

CRT display 301 is, for example, 9 inches in size. CRT display 301 has a display-color of paper white, and has a non-glare surface. Using this size of picture, as many as $60\times15$ tiles (characters) are formed, where the total number of dots is $480\times240$ within a display area of 160 mm (H)$\times$110 mm (V), dot pitch is 0.33 mm$\times$0.46 mm, and dot structure of the tile of 8×16. Thus, Chinese characters and "kana" (phonetic symbols in the Japanese language) can be formed in an area of 16 dots×16 dots and alphanumerics and marks can be formed in an area of 8 dots×16 dots. Thus, Chinese characters and "kana" can occupy up to 30 dots×15 dots if each character is formed of two tiles. Additionally, the display has four levels of gradation, i.e., normal brightness, gray 1, gray 2, and black level on a tile basis. Reverse and blinking, etc. are also effected. The input signal timing is used as shown in FIG. 39 in such a way that the video data is processed for 48 microseconds out of 64 microseconds of the period of a horizontal synchronization signal and for 15.36 ms out of 16.9 ms of the period of a vertical synchronization signal, where the dot frequency ($f_d$) is 10 MHz and the dot structure is 480×240.

Clock generating circuit 353 of FIG. 28 generates a clock of the frequency of the dots to be outputted by parallel/serial conversion circuit 355. Counter 354 divides the clock down to the "dot data read period" for reading the parallel dot-data from character generator 342. Thus the output clock from counter 354 causes the dot data of a plurality of bits from character generator 342 to be inputted to parallel/serial conversion circuit 355, where the dot data is converted into serial data and then is outputted to attribute adding circuit 356. Attribute adding circuit 356 receives a blanking signal from CRT controller 335 to control the video signal in accordance with the attribute data only for the display period. Also, one shot circuit 348 produces an interrupt signal for U/I CPU 1046 on the basis of a blanking signal of the vertical synchronization blanking signals that are output from CRT controller 335. The video data that is written into the V-RAM 340 is formed of 16 bits per tile, of which 12 bits are used for representing codes in the character generator and the remaining 4 bits are used for representing the attribute. For this purpose, the V-RAM 340 stores the lower 8 significant bits of the character bits and the 4 attribute bits into RAM-H in accordance with the address of the CRT picture. The V-RAM 340 has memory capacity enough for two pictures.

The address of the V-RAM 340 is supervised by the CPU 1046 and CRT controller 335, independently of the other, as shown in FIG. 40. CPU 1046 performs video data write into V-RAM 340 while CRT controller 335 supervises display of the data on CRT display 301. For example, FIG. 41 shows the addresses of V-RAM 340 when the CRT controller looks into V-RAM 340. The addresses "0", "1", . . . contain the codes and attributes of the character. Thus, CRT controller 335 reads out the corresponding address data "D0→D7" (L side) and "D0→D4" (H side) in synchronism with the display timing through a circuit shown in FIG. 42, while also producing the raster address "RA" by accessing the character generator to output the scan line data "D0→D7" of the respective tiles to parallel/serial conversion circuit 355. For example, the dot pattern of a Chinese character "fu" is represented as shown in FIG. 43. Since a Chinese character is formed of two tiles, as mentioned previously, character generator 341 provides the tile "D0→"D7" for the left half first, then subsequently the tile "D0→"D7" for the right half in accordance with the scan address "A0→A3".

Figure 44:
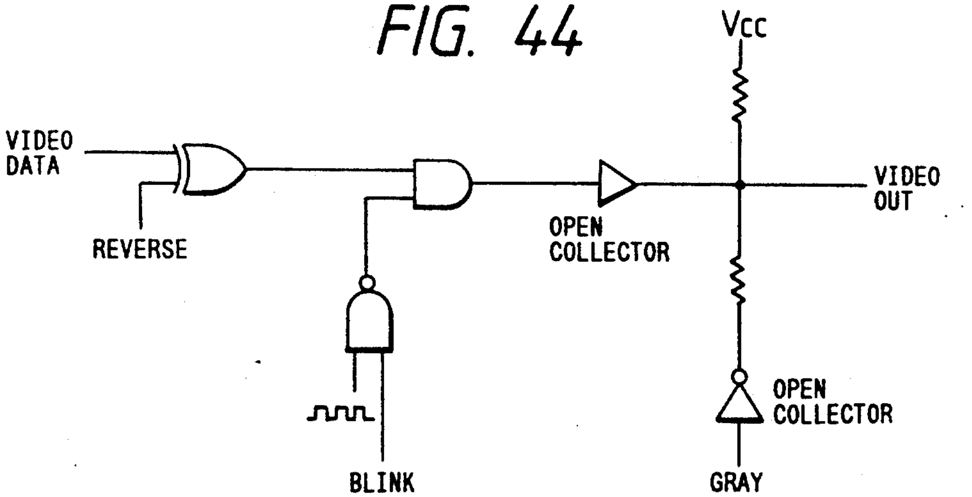
FIG. 44 is a diagram showing an arrangement of a video signal control circuit operated in accordance with attribute data.
Figure 45:
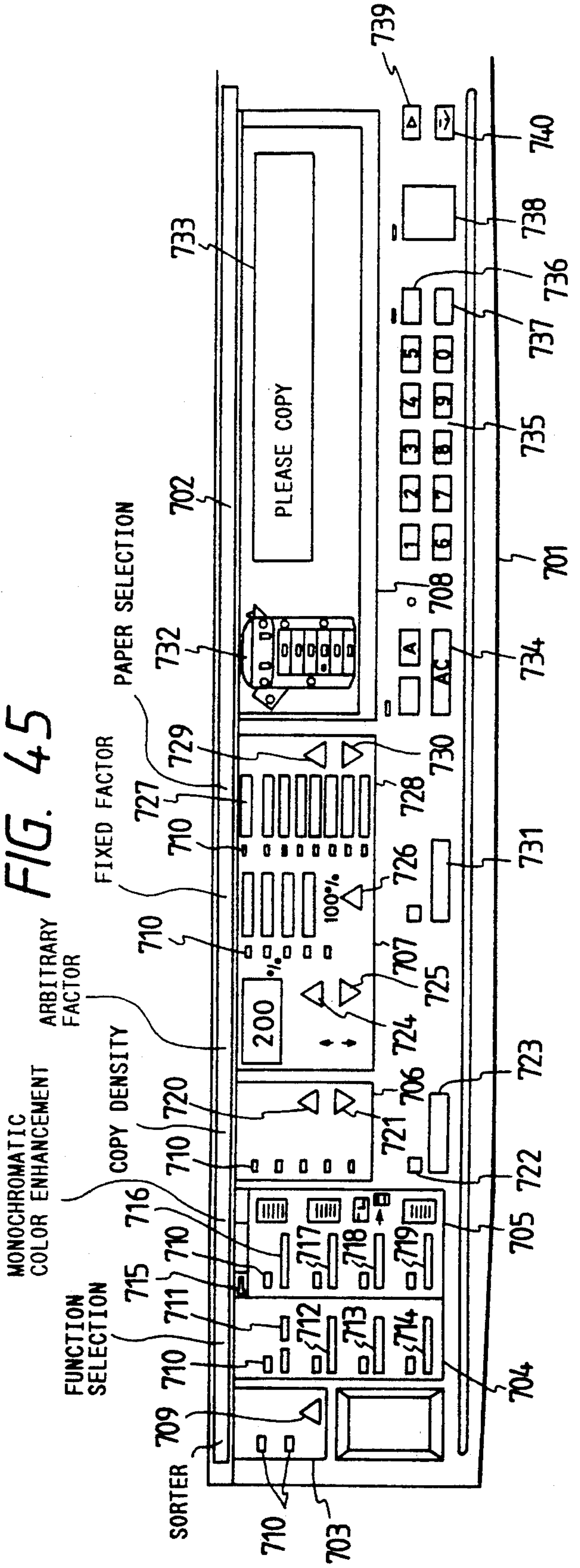
FIG. 45 is a diagram showing a prior art user interface having a console panel.

In response to the tile output, the 4-bit attribute is also read out. FIG. 44 shows an example of a control circuit for the video signal in accordance with this attribute data. The attribute data of the video data and the reverse signal are logically processed through an EXOR circuit in which the video data is inverted when the reverse signal is ON (high level), and then the output of the EXOR circuit is fed to a AND circuit. When the blink signal is ON (high level), the clock is supplied to the AND circuit, thereby changing the signal level of the AND gate ON and OFF in correspondence with the clock signal. The signal level of the AND gate is then varied by the gray signal. As mentioned previously in connection with the selection mode picture, the background is altered for clearly displaying the divided areas or for clearly displaying area such as a position of the cascade that require a particular attention. The gray display and reverse display effected by controlling the attribute are utilized for clear display of the above areas. Further, for example, as shown in FIG. 35(*a*), control of the display manner using dots is effected by the dot pattern of the tile. That is, the background of the display area of "document setting", "setting of the number of copy", and "start" in FIG. 35(*a*) are displayed in a manner different from the background thereof, i.e., varying the dot density of the tile.

The start address of CRT controller 335 is dynamically modified to selectively read from either the first V-RAM or the second V-RAM to display the video signal on the CRT picture in a manner described above. For this purpose, U/I CPU 1046 has a port for inputting a blanking-initiating signal and a display interval signal and a port for outputting a display permitting signal. U/I CPU 1046 is interrupted by the blanking-initiating signal at the falling edge of the blanking interval when the blanking interval begins, thereby recognizing the CRT display state by means of the display interval signal. CPU 1046 also provides the display permitting signal to enable and inhibit the display.

The embodiment described above is only exemplary and a variety of modifications may be made. For example, although the embodiment mentioned above has been described with respect to the sorter and the paper tray, the invention can also be applied to other optional devices and optional functions.

As is apparent from the description above, according to the present invention, even if optional devices or optional functions are substituted for other devices or functions, the information indicative of devices equipped is automatically set by signals indicative of that device or function upon power-up. Thus, the users do not have to input the information when optional devices are changed. The display content and conversion into logic keys are adapted to automatically represent the new optional equipment, and thus, misoperations and unnecessary operations do not occur. Further, the picture data is supervised by means of a hierarchically structured database in which data area supervised as variable display-data, thereby requiring less memory capacity for display data.

What is claimed is:

1. A device for controlling functions to be selected in a user device, wherein the user device may have at least one of a plurality of functional optional devices attached thereto, the device comprising:

display means for selectively displaying a plurality of pictures, respective ones of said functions being represented in corresponding ones of said pictures;

keyboard means for selecting ones of said functions represented in the pictures and for inputting execution conditions for carrying out the selected functions;

information generating means for generating information signals indicating whether or not one of the plurality of functional devices is attached to the user device;

display control means for controlling the display of the functions corresponding to said plurality of functional devices in accordance with said information signals;

key control means for controlling the input of key codes; and a cascade key for selecting a cascade of said functions to be selected, said cascade being displayed on one of said pictures.

2. A device as recited in claim 1, wherein said functions to be selected are controlled when a power supply is switched on.

3. A device as recited in claim 2, wherein said cascade is displayed in accordance with said information signals.

4. A device as recited in claim 3, further comprising setting means for setting said cascade corresponding to said attached functional devices, said setting means being renewed in accordance with said information signals when said power supply is switched on.

5. A device as recited in claim 4, wherein setting of said functions are renewed in accordance with said information signals.

6. A device as recited in claim 2, wherein the input of said cascade key is controlled in accordance with said cascade displayed on the one of said pictures.

7. A device as recited in claim 6, further comprising cascade key conversion means for each of said pictures, said cascade key conversion means being renewed in accordance with said information signals when said power supply is turned on.

8. A method for controlling functions to be selected in a user interface employing a display, the method comprising the steps of:

controlling said functions in accordance with a presence of optional devices performing said functions;

selectively displaying a plurality of pictures indicating said functions, wherein the picture displaying step includes the steps of displaying, in one picture, a cascade including said functions, and selecting a function of said cascade with a cascade key; and selecting one of the plurality of pictures indicating said functions.

9. A method as recited in claim 8, wherein said function controlling step further includes the step of controlling said functions when a power supply is switched on.

10. A method as recited in claim 9, wherein said cascade displaying step further includes the step of selectively displaying said cascade in accordance with the presence of said optical device.

11. A method as recited in claim 10, wherein the cascade displaying step further includes the steps of:

renewing a setting table when the power is switched on; and displaying said cascade corresponding to one of said optional devices in accordance with said setting table.

12. A method as recited in claim 11, wherein said function renewing step further includes the step of renewing said functions of said setting table in accordance with the presence of said optional devices.

13. A method as recited in claims 9, wherein said step of selecting a function of said cascade with a cascade key further includes the step of determining the selected function in accordance with the plurality of functions indicated by the displayed picture.

14. A method as recited in claim 13, wherein said step of selecting a function of said cascade further includes the step of:

renewing a cascade key conversion table for each picture in accordance with the presence of said optional devices when said power is switched on.

15. A method as recited in claim 8, further including the step of inputting execution conditions of said selected function.

* * * * *